United States Patent
Hashimoto et al.

(10) Patent No.: US 6,804,016 B2
(45) Date of Patent: *Oct. 12, 2004

(54) CONTROL APPARATUS FOR A SCANNER/PRINTER

(75) Inventors: Yasuhiko Hashimoto, Tokyo (JP); Susumu Sugiura, Atsugi (JP); Yoshikazu Yokomizo, Yokohama (JP); Yoshinobu Mita, Kawasaki (JP); Makoto Takaoka, Yokohama (JP); Mitsumasa Sugiyama, Kawasaki (JP); Shigetada Kobayashi, Tokyo (JP); Junichi Shishizuka, Kawasaki (JP); Tsutomu Negishi, Tokyo (JP); Osamu Yamada, Yokohama (JP); Yukari Toda, Yokohama (JP); Kazuhiro Saito, Yokohama (JP); Masanari Toda, Yokohama (JP); Yasuo Fukuda, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/878,580
(22) Filed: Jun. 19, 1997
(65) Prior Publication Data
US 2002/0012453 A1 Jan. 31, 2002

Related U.S. Application Data

(63) Continuation of application No. 08/182,560, filed on Jan. 18, 1994.

(30) Foreign Application Priority Data

Jan. 18, 1993 (JP) ............................................. 5-021702
Jan. 18, 1993 (JP) ............................................. 5-021706

(51) Int. Cl.$^7$ ................................................ G06F 15/00
(52) U.S. Cl. ........................................ 358/1.13; 358/1.1
(58) Field of Search ..................................... 395/101, 109, 395/112, 114, 200.3, 200.31, 200.32, 200.33, 200.47, 200.5, 680; 358/400, 401, 537, 409, 408, 443, 452, 462, 474; 382/303, 305, 318, 319, 270

(56) References Cited

U.S. PATENT DOCUMENTS

| | | | | |
|---|---|---|---|---|
| 4,760,458 A | * | 7/1988 | Watanabe et al. | 358/537 |
| 4,893,179 A | * | 1/1990 | Ito | 558/529 |
| 4,949,188 A | | 8/1990 | Sato | 358/448 |
| 4,985,759 A | * | 1/1991 | Ito | 358/529 |
| 4,991,108 A | * | 2/1991 | Hamilton | 395/114 |
| 5,025,497 A | * | 6/1991 | Yoshiura | 358/425 |
| 5,058,185 A | * | 10/1991 | Morris et al. | 382/305 |
| 5,073,868 A | * | 12/1991 | Tada | 345/112 |
| 5,123,063 A | * | 6/1992 | Ohkubo | 382/318 |
| 5,187,592 A | | 2/1993 | Sugiyama et al. | 358/426 |
| 5,226,112 A | * | 7/1993 | Mensing et al. | 395/114 |
| 5,245,368 A | * | 9/1993 | Farrell et al. | 358/468 |
| 5,251,020 A | | 10/1993 | Sugiyama | 358/500 |
| 5,359,425 A | * | 10/1994 | Maehara et al. | 358/300 |
| 5,436,733 A | * | 7/1995 | Terada et al. | 358/448 |
| 5,438,648 A | * | 8/1995 | Takaoka et al. | 345/106 |
| 5,521,990 A | * | 5/1996 | Ishizawa et al. | 382/270 |
| 5,933,580 A | * | 8/1999 | Uda et al. | 358/1.13 |

* cited by examiner

Primary Examiner—Gabriel I. Garcia
(74) Attorney, Agent, or Firm—Fitzpatrick, Cella, Harper & Scinto

(57) ABSTRACT

There is disclosed a control apparatus for a scanner/printer including a unit for generating print data described in a page description language, a unit for generating a command regarding a scanner for scanning an original image, and a unit for producing the print data and the command regarding the scanner to a common device through a network.

20 Claims, 44 Drawing Sheets

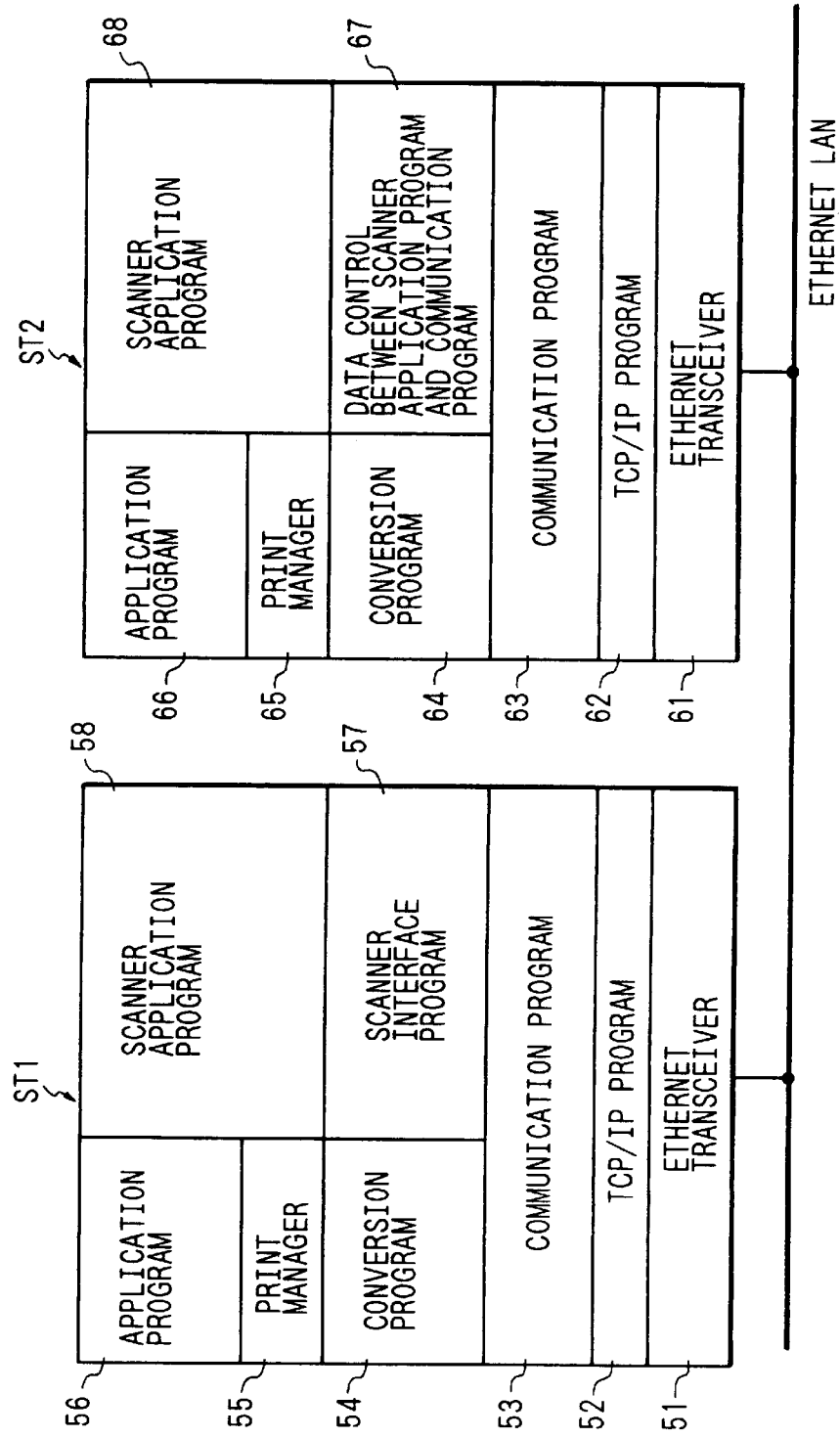

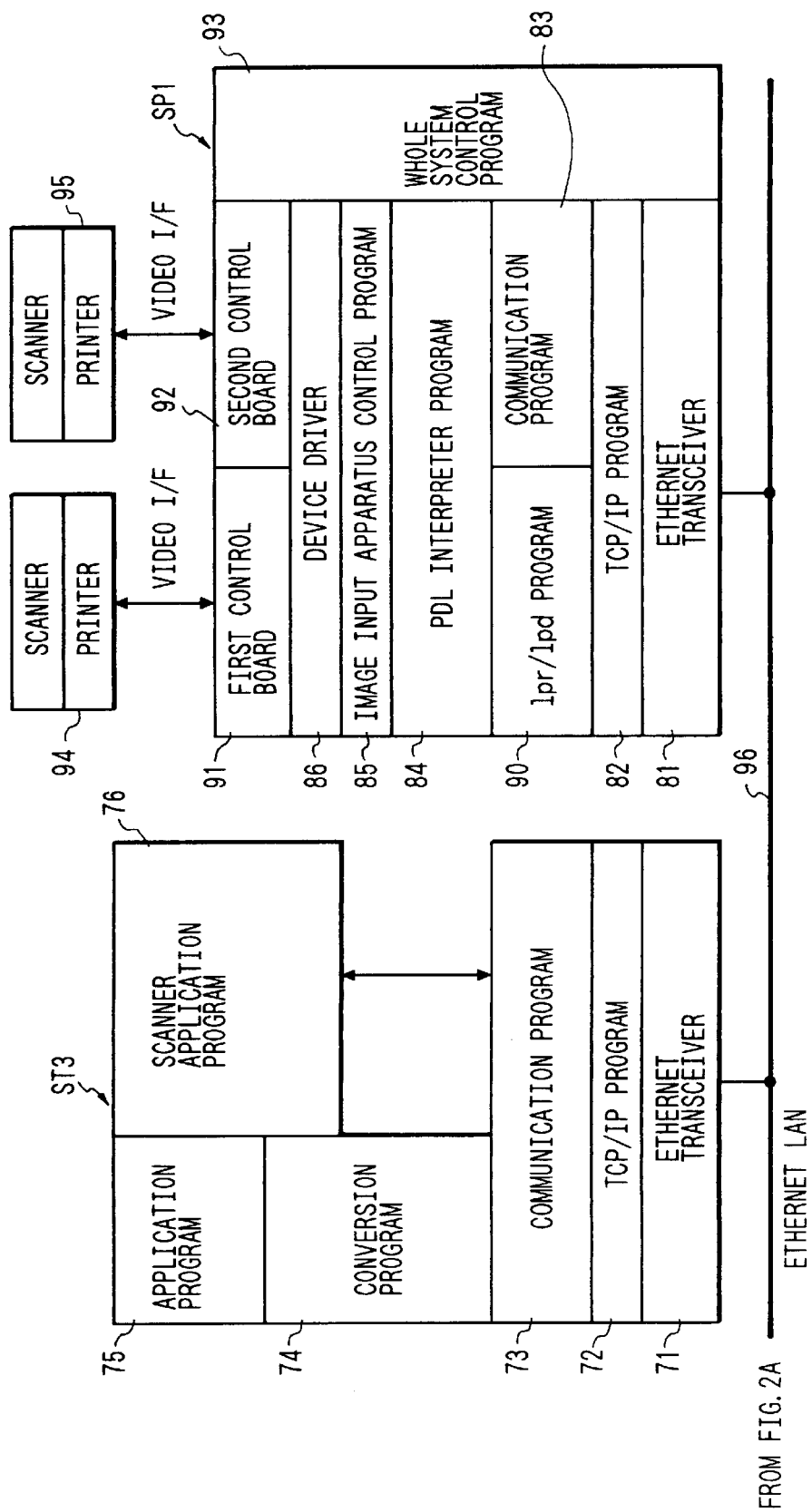

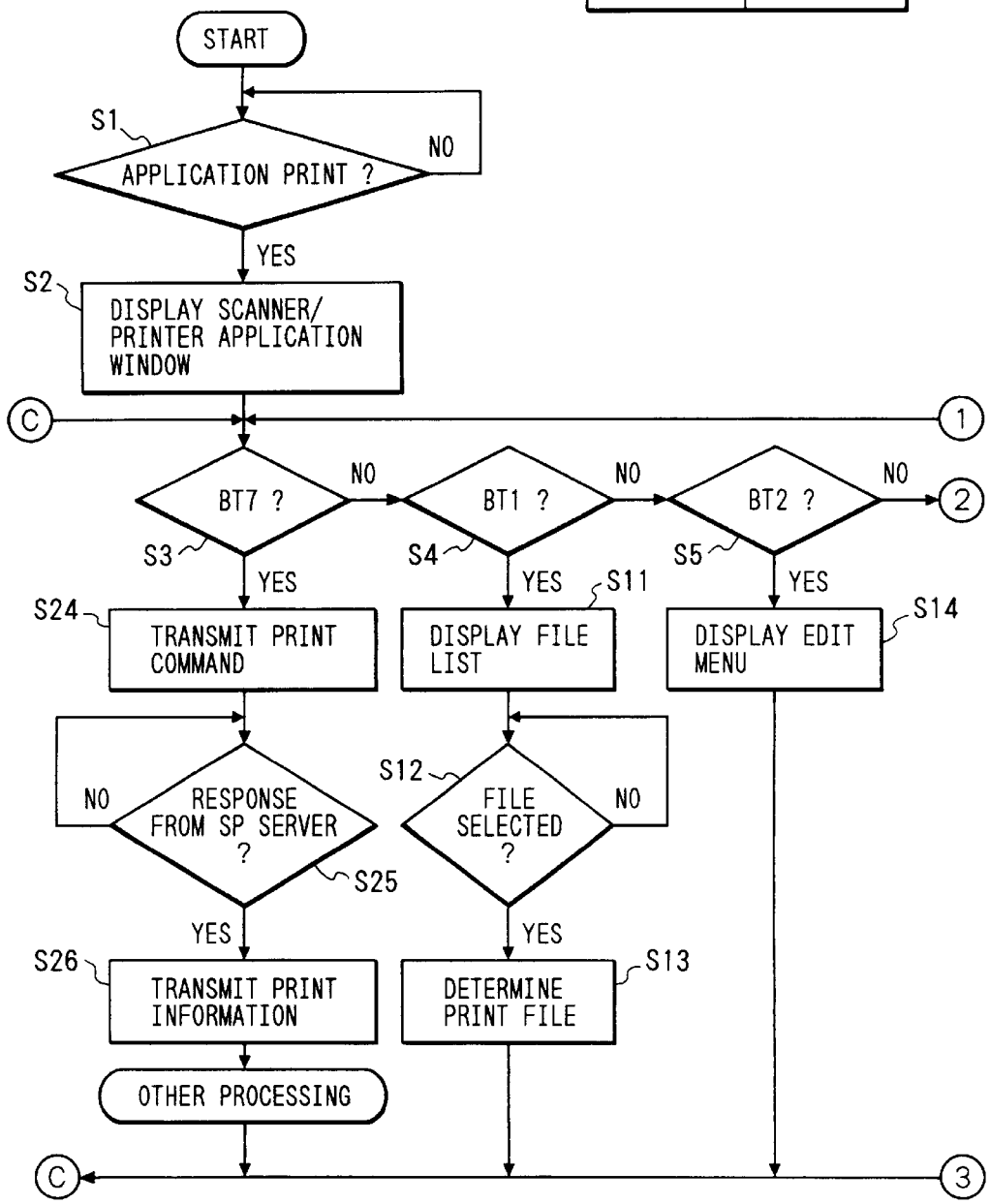

FIG. 11

COLOR DESIGNATION COMMAND (LINE)

| COMMAND NO. 1 | R VALUE | G VALUE | B VALUE | ~2601

COLOR DESIGNATION COMMAND (PLANE)

| COMMAND NO. 2 | R VALUE | G VALUE | B VALUE | ~2602

COLOR DESIGNATION COMMAND (CHARACTER)

| COMMAND NO. 3 | R VALUE | G VALUE | B VALUE | ~2603

LINE TYPE DESIGNATION COMMAND

| COMMAND NO. 4 | NO. | ~2604

LINE WIDTH DESIGNATION COMMAND

| COMMAND NO. 5 | WIDTH | ~2605

PLANE TYPE DESIGNATION COMMAND

| COMMAND NO. 6 | NO. | ~2606

FIG. 12

CHARACTER SIZE DESIGNATION COMMAND

| COMMAND NO. 7 | NO. | ~3701

CHARACTER STYLE DESIGNATION COMMAND

| COMMAND NO. 8 | NO. | ~3702

CHARACTER TYPE DESIGNATION COMMAND

| COMMAND NO. 9 | NO. | ~3703

CIRCLE PLOT COMMAND

| COMMAND NO. 10 | R | X | Y | ~3704

RECTANGLE PLOT COMMAND

| COMMAND NO. 11 | Xs | Ys | Xe | Ye | ~3705

CHARACTER PLOT COMMAND

| COMMAND NO. 12 | X | Y | NUM | CODE | CODE | ~3706

FIG. 14

| | | | | |
|---|---|---|---|---|
| 1 | 255 | 0 | 0 | ~2901 |
| 2 | 0 | 0 | 255 | ~2902 |

| | | |
|---|---|---|
| 4 | 1 | ~2903 |
| 5 | 2.5 | ~2904 |
| 6 | 5 | ~2905 |

| | | | | |
|---|---|---|---|---|
| 10 | 15 | 40 | 45 | ~2906 |
| 1 | 0 | 0 | 0 | ~2907 |
| 2 | 255 | 255 | 0 | ~2908 |

| | | |
|---|---|---|
| 4 | 1 | ~2909 |
| 5 | 3 | ~2910 |
| 6 | 7 | ~2911 |

| | | | | |
|---|---|---|---|---|
| 11 | 65 | 50 | 105 | 85 | ~2912 |
| 3 | 0 | 255 | 0 | ~2913 |

| | | |
|---|---|---|
| 7 | 20 | ~2914 |
| 8 | 1 | ~2915 |
| 9 | 5 | ~2916 |

| 12 | 38 | 107 | 5 | 0×53 | 0×54 | 0×52 | 0×49 |
| 0×4e | 0×47 | ~2917 |

| SB | EB | COM | TNUM |
|---|---|---|---|
| 1 | 2 | CIRCLE | 1 |
| 2 | 4 | RECTANGLE | 2 |
| 4 | 5 | STRING | 3 |

2922

| TNUM | LCOLOR | FCOLOR | LT | LW | FT | DR | DX | DY |
|---|---|---|---|---|---|---|---|---|
| 1 | 255,0,0 | 0,0,255 | 1 | 40 | 5 | 240 | 640 | 720 |

2923

| TNUM | LCOLOR | FCOLOR | LT | LW | FT | DSX | DSY | DEX | DEY |
|---|---|---|---|---|---|---|---|---|---|
| 1 | 0,0,0 | 255,255,0 | 1 | 48 | 7 | 1048 | 800 | 1680 | 1360 |

2924

| TNUM | TCOLOR | DTX | DTY | ADR |
|---|---|---|---|---|
| 1 | 0,0,255 | 608 | 1712 | 0×100000 |

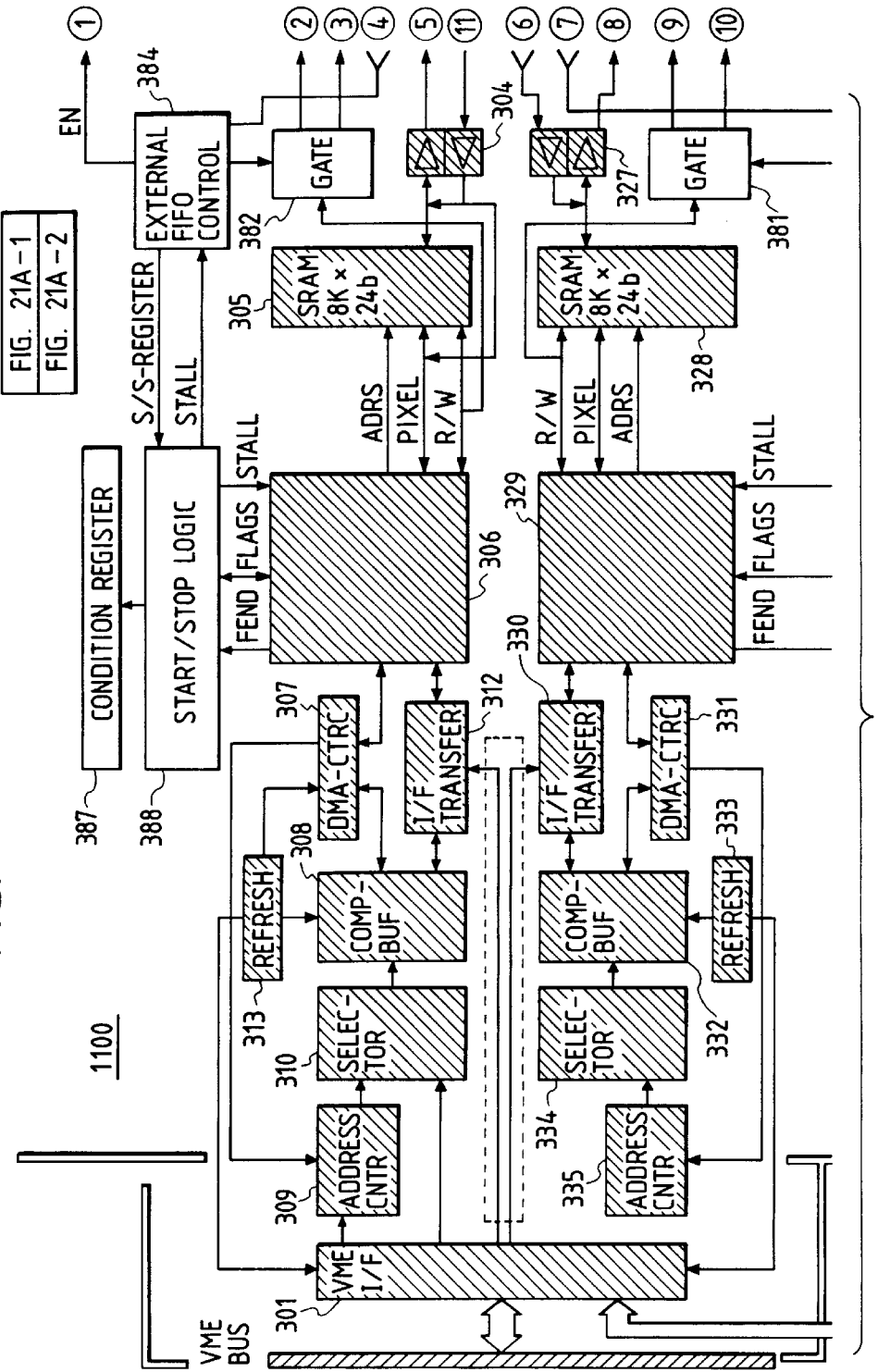

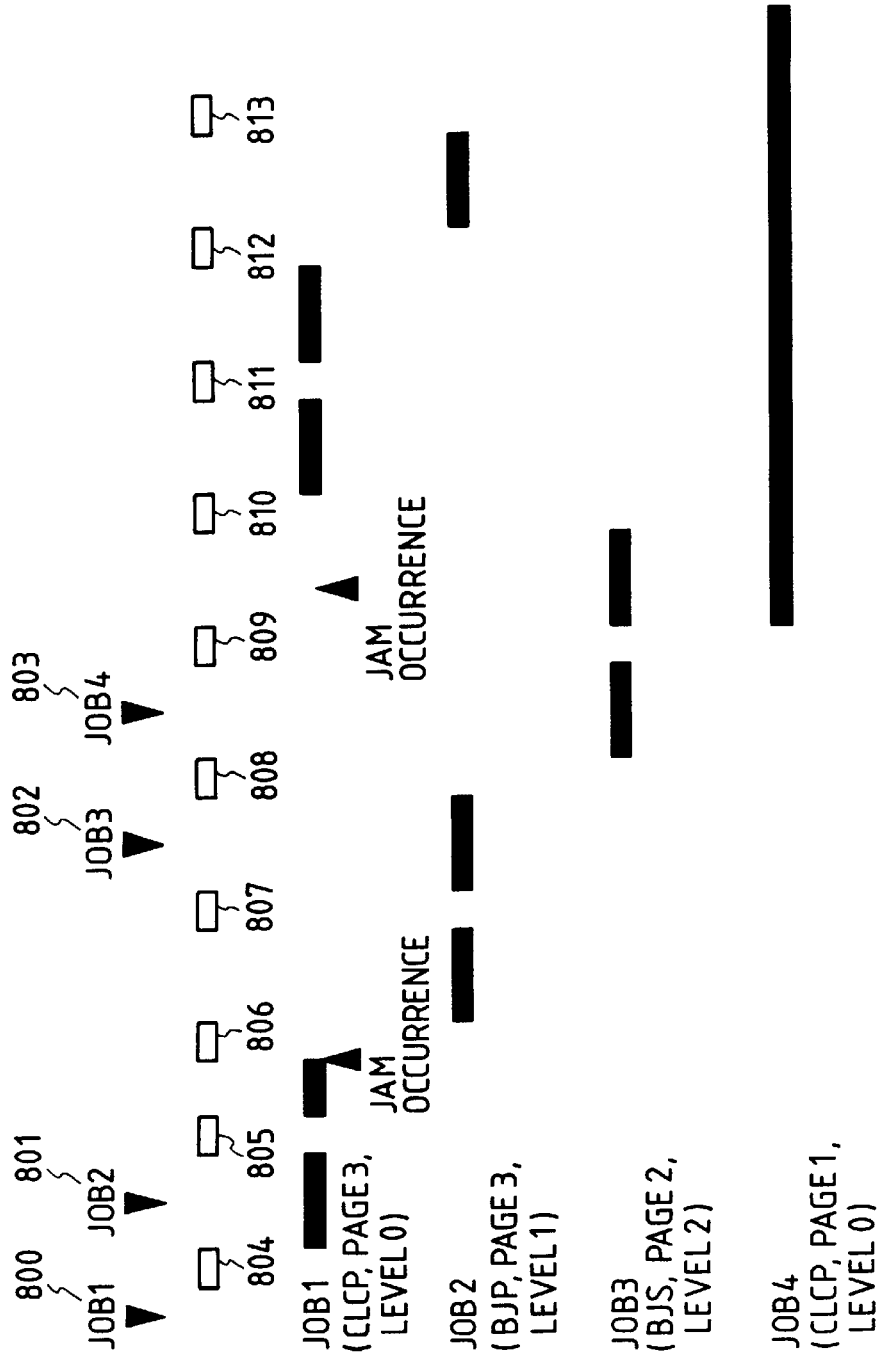

FIG. 33A

| ID | STATUS | PRIORITY | INTERFACE | JOB | END PAGE | INTERRUPTED JOB ID |
|---|---|---|---|---|---|---|
| 25 | WAIT | LEVEL 0 | BMEM | CLCP | 0 | |
| | | | | | | |
| | | | | | | |
| | | | | | | |
| | | | | | | |

FIG. 33B

| ID | STATUS | PRIORITY | INTERFACE | JOB | END PAGE | INTERRUPTED JOB ID |
|---|---|---|---|---|---|---|
| 25 | RUN | LEVEL 0 | BMEM | CLCP | 1 | |
| 26 | WAIT | LEVEL 1 | BMEM | BJP | 0 | |
| | | | | | | |
| | | | | | | |
| | | | | | | |

FIG. 33C

| ID | STATUS | PRIORITY | INTERFACE | JOB | END PAGE | INTERRUPTED JOB ID |
|---|---|---|---|---|---|---|
| 25 | ESTOP | LEVEL 2 | BMEM | CLCP | 1 | |
| 26 | WAIT | LEVEL 1 | BMEM | BJP | 0 | |
| | | | | | | |
| | | | | | | |
| | | | | | | |

FIG. 33D

| ID | STATUS | PRIORITY | INTERFACE | JOB | END PAGE | INTERRUPTED JOB ID |
|----|--------|----------|-----------|-----|----------|--------------------|
| 25 | ESTOP  | LEVEL 2  | BMEM      | CLCP| 1        |                    |
| 26 | RUN    | LEVEL 1  | BMEM      | BJP | 1        |                    |
|    |        |          |           |     |          |                    |
|    |        |          |           |     |          |                    |
|    |        |          |           |     |          |                    |

FIG. 33E

| ID | STATUS | PRIORITY | INTERFACE | JOB | END PAGE | INTERRUPTED JOB ID |
|----|--------|----------|-----------|-----|----------|--------------------|
| 25 | ESTOP  | LEVEL 2  | BMEM      | CLCP| 1        |                    |
| 26 | RUN    | LEVEL 1  | BMEM      | BJP | 2        |                    |
| 27 | WAIT   | LEVEL 2  | BMEM      | BJS | 0        |                    |
|    |        |          |           |     |          |                    |
|    |        |          |           |     |          |                    |

FIG. 33F

| ID | STATUS | PRIORITY | INTERFACE | JOB | END PAGE | INTERRUPTED JOB ID |
|----|--------|----------|-----------|-----|----------|--------------------|
| 25 | ESTOP  | LEVEL 2  | BMEM      | CLCP| 1        |                    |
| 26 | STOP   | LEVEL 2  | BMEM      | BJP | 2        | 27                 |
| 27 | RUN    | LEVEL 2  | BMEM      | BJS | 1        |                    |
| 28 | WAIT   | LEVEL 0  | CNTR      | PDLP| 0        |                    |
|    |        |          |           |     |          |                    |

FIG. 33G

| ID | STATUS | PRIORITY | INTERFACE | JOB | END PAGE | INTERRUPTED JOB ID |
|----|--------|----------|-----------|------|----------|---------------------|
| 25 | WAIT   | LEVEL 2  | BMEM      | CLCP | 1        |                     |
| 26 | WAIT   | LEVEL 2  | BMEM      | BJP  | 2        |                     |
| 28 | RUN    | LEVEL 0  | CNTR      | PDLP | 0        |                     |
|    |        |          |           |      |          |                     |
|    |        |          |           |      |          |                     |

FIG. 33H

| ID | STATUS | PRIORITY | INTERFACE | JOB | END PAGE | INTERRUPTED JOB ID |
|----|--------|----------|-----------|------|----------|---------------------|
| 25 | RUN    | LEVEL 2  | BMEM      | CLCP | 2        |                     |
| 26 | WAIT   | LEVEL 2  | BMEM      | BJP  | 2        |                     |
| 28 | RUN    | LEVEL 0  | CNTR      | PDLP | 0        |                     |
|    |        |          |           |      |          |                     |
|    |        |          |           |      |          |                     |

FIG. 33I

| ID | STATUS | PRIORITY | INTERFACE | JOB | END PAGE | INTERRUPTED JOB ID |
|----|--------|----------|-----------|------|----------|---------------------|
| 26 | WAIT   | LEVEL 2  | BMEM      | BJP  | 2        |                     |
| 28 | RUN    | LEVEL 0  | CNTR      | PDLP | 0        |                     |
|    |        |          |           |      |          |                     |
|    |        |          |           |      |          |                     |
|    |        |          |           |      |          |                     |

| ID | STATUS | PRIORITY | INTERFACE | JOB | END PAGE | INTERRUPTED JOB ID |
|----|--------|----------|-----------|-----|----------|--------------------|
| 28 | RUN | LEVEL 0 | CNTR | PDLP | 0 | |
| | | | | | | |
| | | | | | | |
| | | | | | | |
| | | | | | | |

PRINTED MATTER SYNTHESIZED ON SP SERVER APPARATUS

911 — CHARACTER·FIGURE INFORMATION SUPPLIED FROM CLIENT HOST — 912

913 — IMAGE INFORMATION READ BY SCANNER

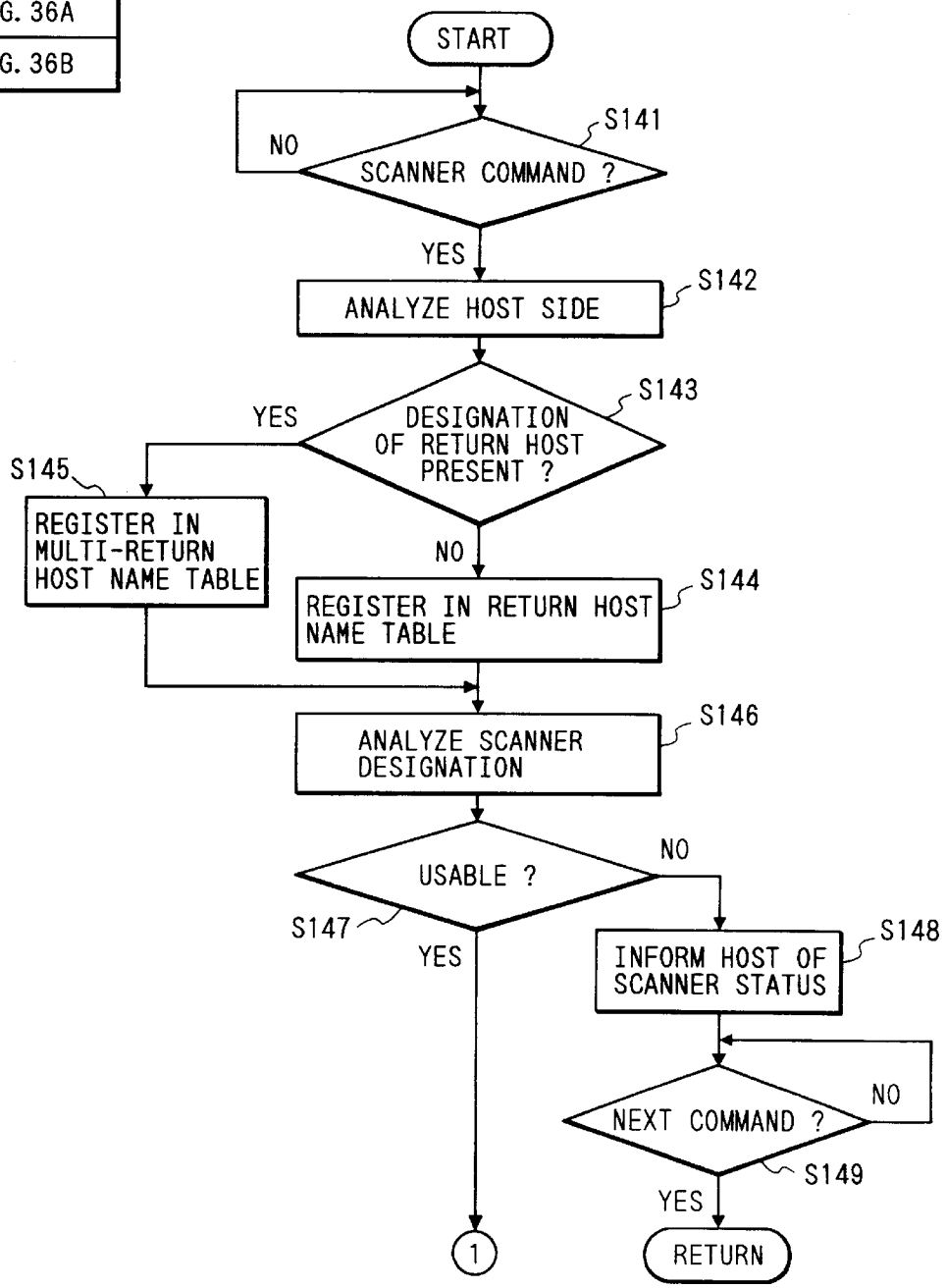

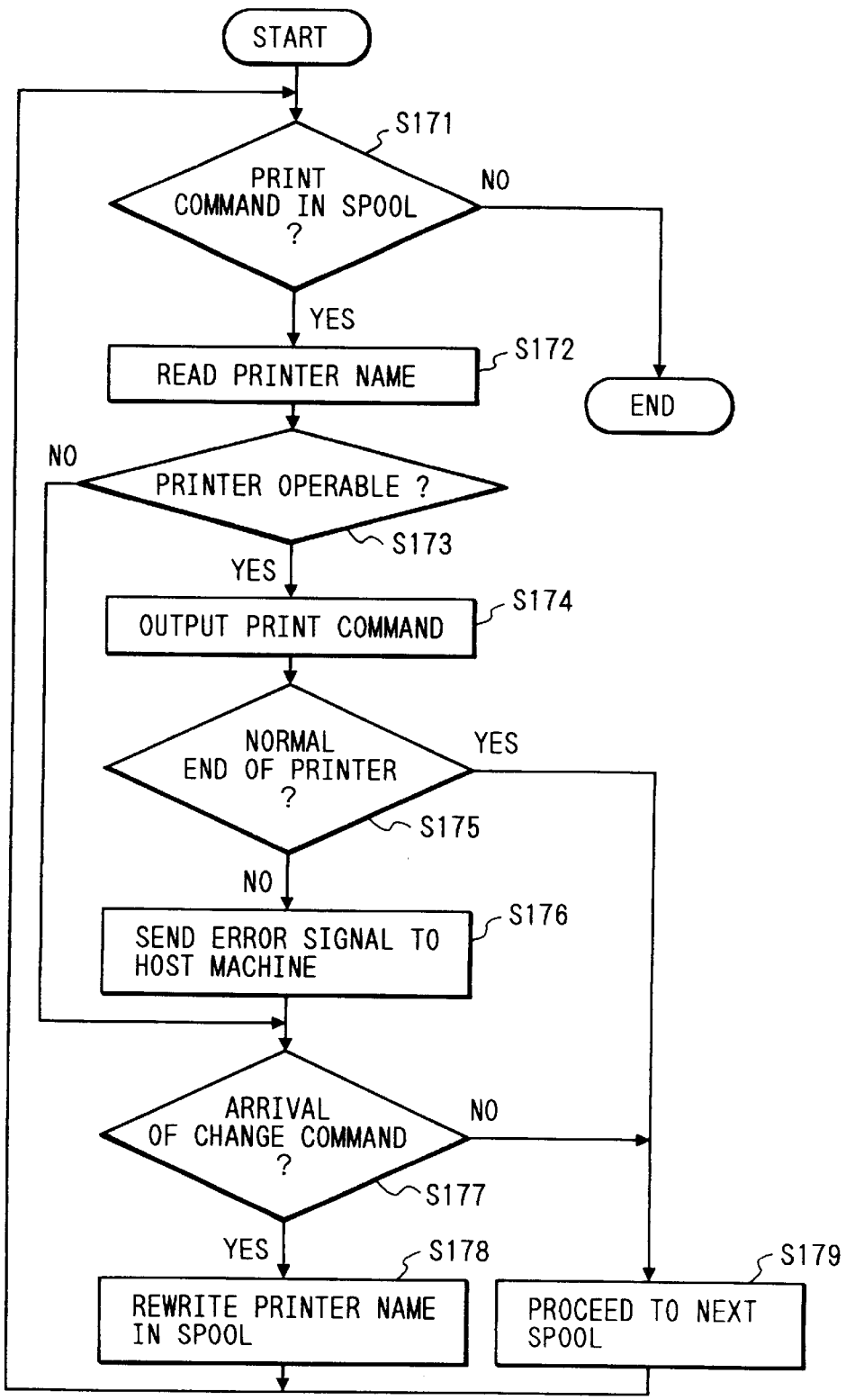

CONTROL APPARATUS FOR A SCANNER/PRINTER

This application is a continuation of application Ser. No. 08/182,560 filed Jan. 18, 1994.

BACKGROUND OF THE INVENTION

1. Field of the Invention

This invention relates to a control apparatus for a scanner/printer having functions of interpreting page description languages supplied from a host and of controlling a scanner for scanning original images.

In addition, this invention relates to a server for a scanner/printer connected to a host through a network.

2. Related Background Art

It is common to interconnect computers and other peripherals as a network, allowing users to share the same software, printers and other devices. There is, however, no idea of a "network scanner" of which the scanning operation is controlled by a remote host in a network. A host needing to received an image could read the image through a scanner connected to the host itself. Alternatively, the image may be transferred, through the network, from another scanner to the host issuing a request.

Thus, to print the image scanned by the scanner after being synthesized with other characters and graphic information, the image scanned by the scanner connected to the host or supplied from another host is generally stored in a memory as a file. The file is then supplied to a printer or a server directly or through the network together with characters and a page description language indicating the graphic information, i.e., describing how an image will be printed on a page.

Recently, a digital scanner/printer may sometimes be connected to the host. In the system architecture of the type described, the scanned image is communicated between the digital scanner/printer and the host, which results in unnecessary transmission of data. In this respect, a processor for synthesizing images may be provided between the host and the digital scanner/printer. However, it is necessary in any case to store the scanned image in a memory of the host or the processor in addition to the synthesized image disadvantageously using a memory having a large capacity. In addition, the host is required to produce commands for controlling the scanner apart from commands for controlling the printer with the respective command languages, which degrades the operability of the host.

Further, there has been no device for transferring to the host the image produced by synthesizing an image scanned by the scanner with an image described in the page description language, thereby allowing the host to process the synthesized image. In this respect, the host may comprise means (an interpreter) for interpreting the page description language to obtain the image produced by synthesizing the image scanned by the scanner with the image described by the page description language. The host comprising such an interpreter could synthesize the image described in the page description language with the image scanned by the scanner. However, this method requires a memory for storing image data supplied from the scanner in addition to the memories required for the interpreter and a work-area thereof. It is especially serious when a full-colored image is directed to synthesis because a memory having an extremely large capacity should be used. In addition, an interpreter should be implemented in the printer side to ensure a normal printing operation. In other words, an interpreter for the language being resident in a printer makes it possible to send short programs, instead of huge volumes of pixel data, to the printer. As a result, the host and the associated printer have similar interpreters, making the construction for the image synthesizing operation wasted or useless.

To meet an image input/output request supplied from host computers managed by different operating systems, the server should have a plurality of interpreters for carrying out data communication processing matched to the respective operating systems. This imposes on the server the serious burden of data processing, making the device expensive.

A plurality of host computers may be connected to each other in the network to drive and control a plurality of input/output devices. In this event, each host computer independently produces an image input/output processing request irregularly, so that two or more input/output devices may produce the requests at the same time. It is, however, impossible to carry out a succeeding printing or scanning job in preference to, if any, a preceding printing or scanning job in a wait state. As a result, the efficiency of the image input/output processing will be degraded.

Color input/output devices of the type described are relatively expensive as compared with a monochrome one. In addition, an interface device for interfacing the color input/output device with the host costs much more than the one for interfacing the monochrome device with the same host. The major cause of this is that processing of a color image results in a huge amount of data. Further, the data should be abstracted in a certain method to transmit the color image. More particularly, image and character data should be coded while graphic data should be vectorized, which contributes to abstract the data as much as possible to reduce the amount of data and the coded or vectorized data can be described in a form independent of the device where it is used.

On the other hand, a device that receives the data described in the above mentioned form is required to have an interface to convert the received data into a bit image that is optimum for the receiving device itself. To provide such an interface is disadvantageous in that the cost of the entire system will be increased. It is especially true when a color input/output device is used because a host computer having a color interface and a color input/output device becomes extremely expensive.

A network may comprise a plurality of personal computers and one scanner/printer. If the scanner/printer is free to be accessed from these personal computers, it becomes impossible to meet the demand of a user who wants to use specifically the scanner/printer connected thereto in the network. A particular user may have to wait for a long period before his request of access to the scanner/printer is finally accepted.

The scanner/printer may comprise means for memorizing image input/output commands supplied from a plurality of users. When the scanner/printer is in a ready state and no processing is carried out with commands designating a particular printer or image input/output device (scanner) being stored in the memorizing means of the scanner/printer, the designated printer or scanner may be disabled due to paper jam in the printer or burning out of an exposure lamp of the scanner. Conventional image input/output devices having a communication function carry out scanning and printing operation according to the order of accepting the multiple accesses supplied from the hosts. Accordingly, the input/output processing is not restarted until the designated device is rest from the trouble even if there is one or more enabled input/output devices the waiting state. The only reason any other enabled devices are not operated is that they are not the destination at that time. Such "first-access first-execution" degrades the operational efficiency of the input/output devices.

Various other problems of the conventional input/output devices lie in printers. More particularly, a printer is a device that merely produces images on paper or film according to the received data described in the page description language. This means that it is not necessarily possible to obtain a fine and satisfactory result. For example, the image data generated by an image generating unit may first be compressed and stored in an image memory. In this event, the image memory stores the data of one page that is extended later upon printing. In some cases, it may be worth providing the image memory in the printer and trying to compress the data. However, the capacity of the memory is limited and the image data is thus compressed at a higher compression rate than required. This causes degradation of the image. The degradation could be minimized when the image is compressed at the compression rate optimum for the memory. It is, however, difficult for the Joint Photographic Experts Group (JPEG) or the most popular and comprehensive continuous tone, still-frame color compression standard to estimate the amount of compressed data before compression of it when there is no information regarding the color image. Accordingly, the data is compressed at the excessively high compression rate to ensure positive storage of the compressed data, which degrades the quality of the resultant image.

Many printers available in the current marketplace are bilevel and able to produce image information generated by the image generating unit. Such printers produce just two intensity levels, so that it is not necessarily possible to obtain a satisfactory result of printing at a high speed. For example, an error diffusion algorithm can be used advantageously for printing a document containing relatively many characters and graphic patterns. With the error diffusion algorithm, boundaries and lines are contrasted relatively clearly. On the other hand, a dither matrix is sometimes preferable to represent a continuous-tone image because the time required for digitization becomes relatively shorter with this method. However, a conventional image processing unit merely produces the image data and thus the associated printer produces the image according to a single digitization method regardless of the type of the image.

It is not necessarily possible to obtain a satisfactory result of printing even when using a printer that comprises an image output unit capable of color conversion on the image generated by the image generating unit. It is preferable to apply color conversion allowing sharp edges and configurations of the black regions for a document containing many characters and graphic patterns. On the other hand, it is preferable to use color conversion to reduce the black regions for a document containing relatively many images. However, the image output unit of a conventional printer merely produces the image according to a single digitization method regardless of the type of the image.

The conventional image output devices are thus disadvantageous in terms of flexibility.

SUMMARY OF THE INVENTION

The present invention is directed to overcome the above mentioned problems and an object thereof is to synthesize on a server bitmap data obtained according to the data described in a page description language and transferred from a host through a network with image data scanned by a scanner.

Another object of the present invention is to provide a server capable of using readily synthesized image data that is memorized only in such a memory that could not be achieved by memory resources in a host.

It is yet another object of the present invention to provide a server whose function can be performed without using an expensive extended memory in each host in the network and without using means for interpreting the page description languages.

According to the present invention, a server is connected to at least one host and a scanner in a network, the server comprising interface means for connecting the server to a scanner and a printer; processing means for converting data supplied from the host into bitmap data, the data being described in a page description language; and synthesizing means for synthesizing, as synthesized image data, the bitmap data with scanned data supplied from a scanner through the interface means, whereby the synthesized image data is allowed to be transmitted to the host through the network.

In addition, according to the present invention, a server further comprises compression means for compressing, as compressed image data, the synthesized image data, whereby the compressed image data is allowed to be transmitted to the host through the network.

When it is instructed to synthesize the data described in the page description language and supplied from the host through the network with the scanned data supplied from the scanner, the synthesizing means synthesizes the bitmap data converted by the processing means with the scanned data supplied from the scanner, whereby the synthesized image data is allowed to be transmitted to the host. As a result, it becomes possible to use readily the synthesized image data obtained by synthesizing the data described in the page description language and supplied from the host through the network with the scanned data supplied from the scanner without imposing on the host the serious burden of memory extension.

Further, it is possible to compress by the compression means the image data synthesized by the synthesizing means and to transmit the compressed image data to the host in the network, which allows the host to obtain during a short period the synthesized image data of large capacity synthesized in the server and to use readily the same data.

According to a preferred aspect of the present invention, the server comprises first image output controlling means for controlling the output of first, second and third image information to each input/output device. The first image information is supplied from the host to the first image output controlling means through the network. The second image information is read through the input/output device according to the commands supplied from the host. The third image information is a combination of the first and second image information combined according to the commands supplied from the host. As a result, it becomes possible to produce directly from each input/output device any one of first through third image information according to the commands supplied from the host. In addition, the server comprises a second image output controlling means for controlling output of the second image information to a first host designated through the network or to a second host designated by the first host. This makes it possible to transfer directly the second image information to other hosts including the transmitting host itself. In this event, the second image information is taken in the server from each input/output device according to the commands supplied from the host.

According to another aspect of the present invention, a first password previously registered in the server is compared with a second password supplied from the host connected thereto in the network. Execution of a scanning operation and a printing operation will be allowed or prohibited, based on the comparison result, in the input/output device designated by the host. The scanning operation and the printing operation issued by a particular group of users can thus be executed in preference to other operations.

According to yet another aspect of the present invention, the server further comprises data memorizing means, notifying means and changing means. When the notifying means notifies the destined input/output device of the server of scanning and printing states with the data supplied from the host being memorized in the data memorizing means for the destined input/output device(s) and an input/output device changing command is returned from the host and received by the server, the changing means analyzes the input/output device changing command returned from the host to change the destined input/output device designated by the host into a desired input/output device. As a result, it becomes possible to compensate the input/output processing directed to the input/output device in a disable state with the data processing carried out by the desired input/output device.

According to still another aspect of the present invention, the server analyzes image data and additional information supplied from the image generating means to carry out data processing optimized for the image data received by image processing means. The input/output device supplies the image to a recording medium according to processed data supplied from the image processing means. Thus, it becomes possible to produce image data that will be satisfactorily produced from the input/output device.

According to a further aspect of the present invention, the server comprises data analyzing means, pixel data generating means, memorizing means, data extraction means, an additional information memory and image output means. The analyzing means analyzes color image information in response to reception of the color image information supplied from the host through the network. The pixel data generating means generates pixel data for each color according to the result of analysis. The pixel data are memorized in the memorizing means. The data extraction means then analyzes the pixel data for each color memorized in the memorizing means to extract black regions of the color image. An additional information corresponding to the black regions extracted by the data extraction means is memorized in the additional information memory. The image output means produces an image while looking up the pixel data and the additional information corresponding to the pixel data memorized. As a result, it becomes possible to make a contrast between black and other colors in characters or graphic patterns contained in the color image.

In describing the gist of an aspect of this invention, the server is provided with a band memory where a memory area required for plotting an image of one page can be divided into a plurality of band areas. Analyzed are commands of a predetermined page description language for one page as a unit that are successively received from the hosts connected to the server in a predetermined network. Output band information is derived for each object to plot successively the objects in the corresponding band according to the output band information. A complex object can thus be produced effectively even when a memory capacity is relatively small.

In addition, according to the present invention, first color information is edited or read according to an image input/output command supplied from the host into second color image information based on predetermined commands in the page description language. The converted second color image information is used for communication between the input/output device(s) and the host(s) through the predetermined network. The second color image information received during the communication is analyzed and match-converted into inherent first image information suitable for the input/output device or the host. One interpreter can thus be commonly used among the users even when color image processing formats of the hosts differ from each other and data formats of the input/output devices are different from each other.

Further, the order of processing of a printing job or a scanning job of the input/output device is controlled based on a given priority according to the image input/output command supplied from the host. As a result, it becomes possible to manage arbitrarily the order of image input/output processing from the host.

These and other objects and features of the present invention will become more fully apparent from the following description and appended claims taken in conjunction with the accompanying drawings.

BRIEF DESCRIPTION OF THE DRAWINGS

FIGS. 11 and 12 are views for use in describing commands of the page description language supplied from a host computer;

FIGS. 14 and 15 are views for use in describing how to analyze the commands of the page description language;

FIG. 32 is a timing chart indicating transitions of job processing states in the S/P server according to the present invention;

FIGS. 33A through 33J are views illustrating contents of job tables generated during job processing carried out by the S/P server according to the present invention;

FIG. 34 is a graphical representation of a layout on a printed matter in which information regarding to characters, graphic patterns and images are synthesized together by the S/P server;

FIG. 39 is a flow chart showing an example of print task processing procedures carried out, using spooling, by the S/P server according to the present invention.

DETAILED DESCRIPTION OF THE PREFERRED EMBODIMENTS

Preferred embodiments of the present invention are now described with reference to the attached drawing as follows:

Contents

1. Entire structure of a system and an S/P server (FIGS. 1 through 3)
2. Exemplified settings associated with the S/P server determined at a host computer (FIGS. 4 through 8)
3. A main board of the S/P server
   3-1 Structure (FIG. 9)
   3-2 Operation upon printing processing (FIGS. 10 through 16)
   3-3 Operation upon scanning processing
   3-4 Others (FIGS. 17 and 18)
4. A first S/P interface circuit of the S/P server (FIGS. 19 through 21)
5. A second S/P interface circuit of the S/P server (FIG. 22)
6. Entire operation of the S/P server
   6-1 Entire operational flow (FIGS. 23 through 29)
   6-2 Printing operation (FIG. 30)
   6-3 Scanning operation (FIG. 31)
   6-4 An example of print job execution (FIGS. 32 and 33)
7. Operation upon image synthesis (FIG. 34)
8. Others (FIGS. 35A through 39)

1. Entire Structure of a System and an S/P Server

Figure 1:
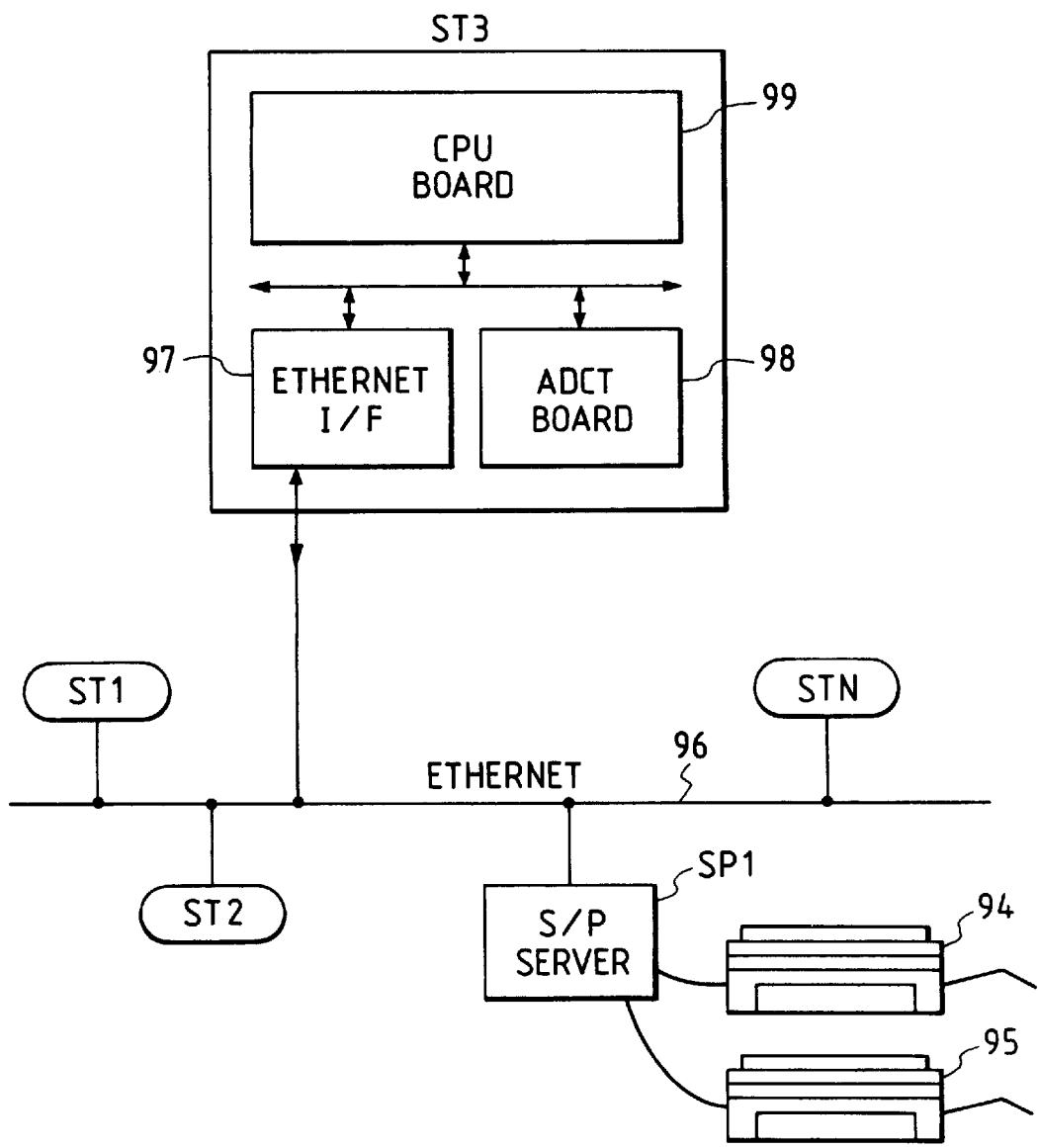
FIG. 1 is a system block diagram illustrating a network comprising a server according to a first embodiment of the present invention.

FIG. 1 is a view showing a network system where host computers are connected to a server according to the present invention.

As is apparent from the figure, host computers ST1 through STN are computers commonly available in the marketplace. For example, the host computer may be any one of a Macintosh® (Apple Computer Inc., U.S.A.), IBM-PC® (IBM Co., U.S.A.) and SUN® (Sun Microsystems Inc., U.S.A.). Data processing in these host computers is controlled by the respective operating systems. The host computers ST1 through STN are connected to each other through a local area network (LAN) 96, each of which comprises an Ethernet interface (I/F) board 97, an image compression/extension board 98 and a central processing unit (CPU) board 99. The Ethernet INTERFACE board 97 is for communicating with other computers and the server through the LAN 96 while the image compression/extension board 98 is for transmitting and receiving compressed image data. The image compression/extension board 98 may be realized by software processing on a memory. The image compression/extension board 98 can be eliminated if compression and extension of images is not used upon input or output of image data. While Ethernet or a standard set of specifications for a particular type of local area network is used as the LAN 96 in this embodiment, any one of suitable specifications is equally applicable to the present invention. For example, AppleTalk® (Apple Computer Inc.) or TakenRing™ may used for constructing a network. In addition, while the Transmission Control Protocol/Internet Protocol (TCP/IP) is used as a communication program in this embodiment, Open Systems Interconnection (OSI) or IPX® (Ideographix Inc., U.S.A.) can be adopted in place of the TCP/IP.

A scanner/printer server (S/P server) SP1 according to the present invention is connected to a plurality of color digital scanner/printers 94 and 95 in the LAN 96. The S/P server SP1 mainly serves to control scanners of the scanner/printers 94 and 95, respectively, in response to commands supplied from the host computers ST1 through STN; to deliver the received image data to the host computers ST1 through STN; and to interpret image data described in a page description language and supplied from the host computers ST1 through STN to print the data using printers of the scanner/printers 94 and 95, respectively. Hereinafter, the image data described in the page description language is referred to as a described data merely for the purpose of avoiding a term including many modifiers. Page description languages are particularly well suited to describe the appearance of a bitmap image, especially in client-server window managers, where downloading a page description language program to the server can reduce network traffic and overhead on the client (host). One of the features of the present invention achieved by using this advantage of the page description language more effectively is synthesis of an image represented by the described data with an image read by the scanners of the scanner/printers 94 and 95.

FIGS. 2A and 2B are system block diagrams schematically showing the network system in FIG. 1 in view of a software structure thereof.

The network system in this embodiment is one allowing application software implemented in the host computers ST1 through STN to commonly use or share a few scanners or printers connected thereto through the network. In this embodiment, the host computers ST1, ST2 and ST3 are a Macintosh workstation, an IBM-PC workstation and a SUN workstation, respectively. The Macintosh workstation ST1, the IBM-PC workstation ST2 and the SUN workstation ST3 are host computers available in the marketplace. Each of the Macintosh workstation ST1, the IBM-PC workstation ST2, the SUN workstation ST3 and the color S/P server SP1 has the same interface for intercommunication. Reference numerals 51, 61, 71 and 81 represent Ethernet transceivers for use in communicating with each other through the LAN 96. Reference numerals 52, 62, 72 and 82 represent the TCP/IP established on the LAN 96, which the TCP/IP was first developed to link the research center of the United State's Government's Defense Advanced Research Projects Agency.

This TCP/IP contributes to provide communication services (functions) without data error in an end-to-end operation. Reference numerals 53, 63, 73 and 83 represent communication programs designed for a specific purpose (function) of sharing the first and the second color scanner/printers 84 and 95 with the Macintosh workstation ST1, the IBM-PC workstation ST2, the SUN workstation ST3. Among them, the communication programs 53, 63 and 73 are allocated the task of client-based servicing as an S/P client program while the communication program 83 is allocated the task of server-based servicing as an S/P server program.

Described now is the operation for printing an image using the first color scanner/printer 94 by means of controlling it by the Macintosh workstation ST1. It is assumed that an original is generated using a commercially available application program 56. The control is passed to a part of Print Manager 55 or an operating system (OS) to start control for printing. In this event, the data format is normalized for the Macintosh according to a QuickDraw™ (Apple Computer Inc.) drawing package. The Print Manager calls a set of plot functions of a conversion program 54. The conversion program 54 serves to convert, one by one, the QuickDraw during the call into page description language (PDL) data such as Canon Printing System Language (CaPSL) codes. The CaPSL codes are stored in a memory which is not shown. Thus, the conversion program 54 mainly functions as a QuickDraw/CaPSL conversion program.

The communication program 53 is for transferring, according to the TCP/IP program 52, the CaPSL codes to the color S/P server SP1 through the Ethernet transceiver 51, the LAN 96, the Ethernet transceiver 81, the TCP/IP program 82 and the communication program 83. The conversion programs 54, 64 and 74, the communication programs 53, 63 and 73, scanner INTERFACE programs 57 and 67, and the TCP/IP programs 52, 62 and 72 may be supplied to the host computer using an external storing medium such as a floppy disk. Alternatively, they may be provided in the host computer ST1 as the Ethernet transceiver such as a board circuit.

The operation of the color S/P server SP1 is controlled by a whole system control program 93. The whole system control program 93 is notified of reception of the CaPSL codes. In addition, the whole system control program 93 requests a PDL interpreter program (described below) to raster the original coded by the CaPSL codes into a bitmap image. The rastered image data is then passed to a device driver 86 and transferred to, for example, the first color scanner/printer 94 through a first printer control board 91 and a video interface.

Operation for printing an image using the first color scanner/printer 94 by means of controlling it by the IBM-PC workstation ST2 is similar to those described above except that the data format is normalized according to a GDI® (Graphic Direct, Inc., U.S.A.) drawing package. In this event, the conversion program 64 mainly functions as a GDI/CaPSL conversion program.

When it is intended to print an image with the SUN workstation ST3, the application program 75 communicates with the scanner/printer directly through the communication program 73 because a function corresponding to the conversion programs 54 and 64 is not normalized. It is noted that an MIF/CaPSL conversion program 74 is incorporated to allow print using a commonly available application program such as FrameMaker® (Frame Technology Co., U.S.A.).

To scan an original through the Macintosh workstation ST1 for example, a request for scanning is supplied from a scanner application program 58 to the communication program 53 through a scanner INTERFACE program 57. The communication program 53 ensures a communication path of end-to-end between the communication program 83 through the Ethernet transceiver 51, the LAN 96, the Ethernet transceiver 81 and the TCP/IP program 82 to transfer the scanning request to the communication program 83. This command is transmitted to the whole system control program 93 which in turn requests the scanner control program to scan the original through, for example, the first color scanner/printer 94.

The scanned data representing the original image is transmitted in order of the first control board 91, the device driver 86, the communication program 83, the TCP/IP program 82, the Ethernet transceiver 81, the LAN 96, the Ethernet transceiver 51, the TCP/IP program 52, the communication program 53, the scanner INTERFACE program 57 and the scanner application program 58.

The steps to scan an image with the IBM-PC workstation ST2 is similar to that described above but when it is intended to scan the image with the SUN workstation ST3 the scanner application program 76 communicates with the scanner/printer directly through the communication program 73 because a function corresponding to the scanner INTERFACE programs 57 and 67 is not normalized. It is noted that the scanner interface programs 57 and 67 control data of the scanner application and the communication program.

The color S/P server SP1 is connected to the other scanner printer, the second color scanner/printer 95. The second color scanner/printer 95 is controlled by the color S/P server SP1 through a second control board 92.

All programs including the whole system control program 93 implemented in the color S/P server SP1 are operable under control of a system program such as VxWorks® (Wind River Systems, Inc.).

The color S/P server SP1 is also provided with a low-probability-of-intercept/detection (lpi/lpd) communication program 90 along with the communication program 83 to accept requests of a common UNIX workstation having no specific programs designed for this service (e.g.; the communication program 73 and the conversion program 74).

Figure 3:
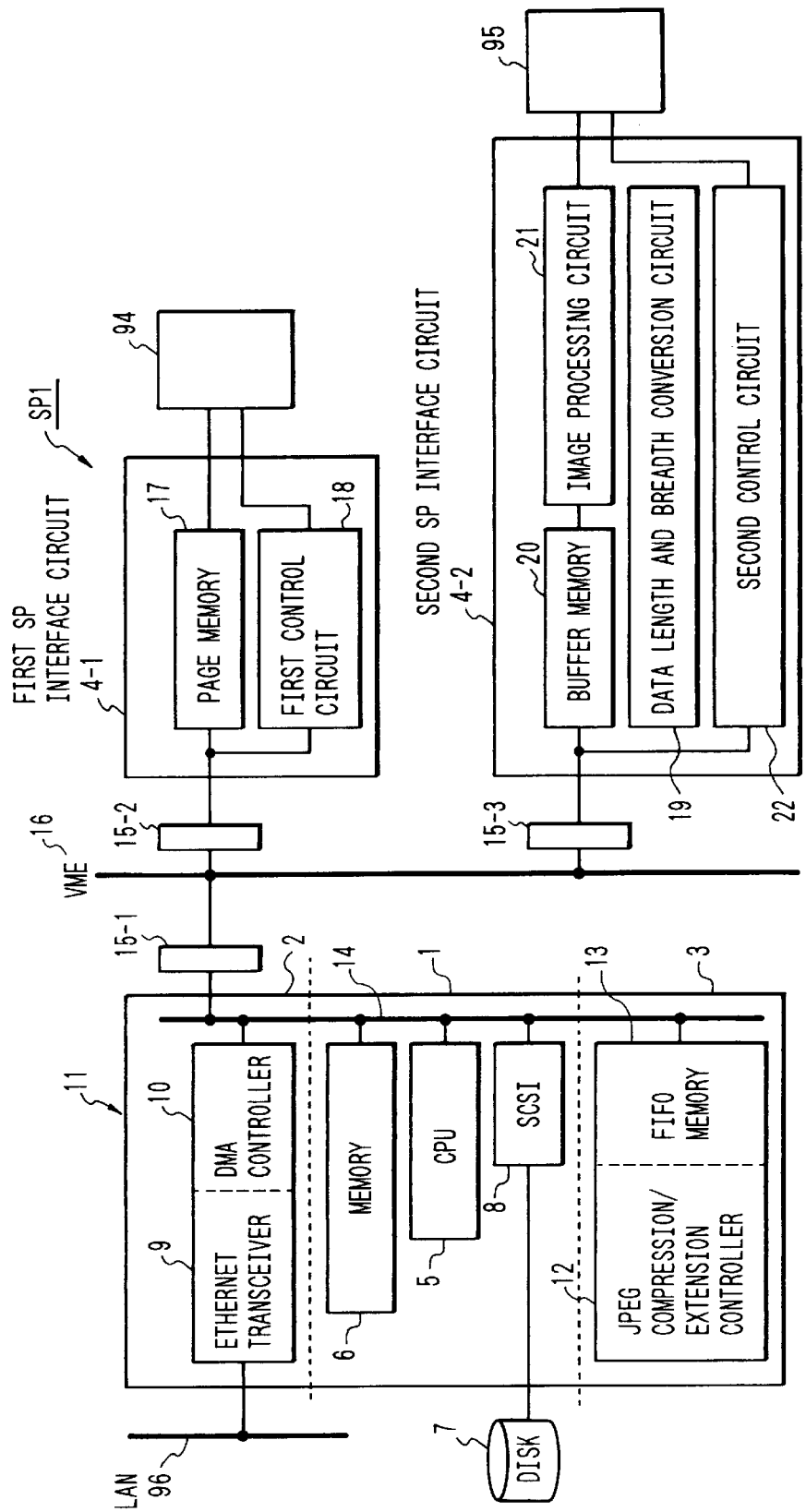
FIG. 3 is a view showing a server according to the present invention.

FIG. 3 is a system block diagram illustrating the color S/P server SP1 according to the present invention. More detailed structure thereof will be illustrated later.

Figures 2, 21A:
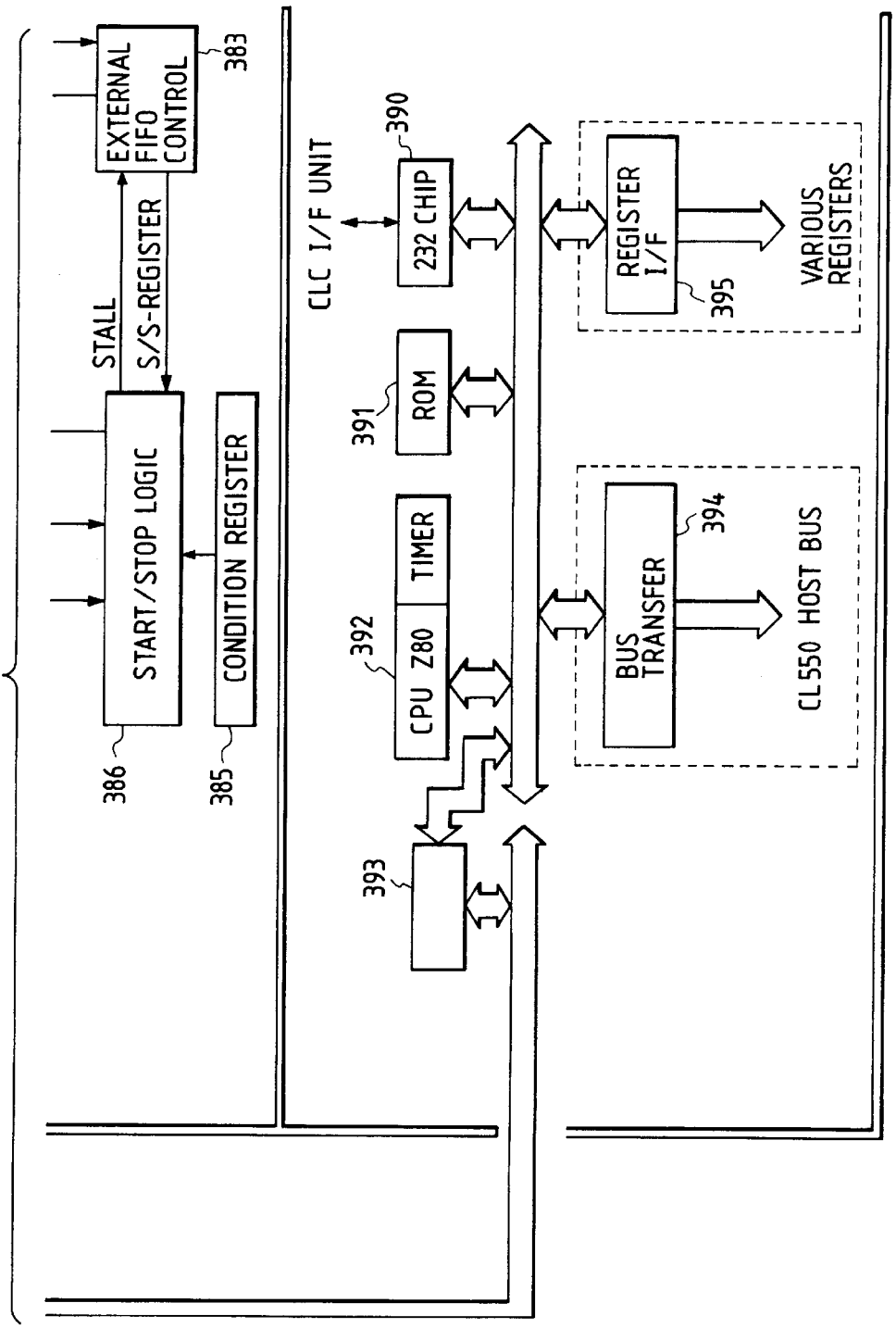
FIG. 2 is comprised of FIGS. 2A and 2B showing system block diagrams of a schematical design of a network system to which the server shown in FIG. 1 is applied.
FIG. 21A, comprised of FIGS. 21A-1 and 21A-2, through 21C are circuit block diagrams illustrating a detailed structure of the first S/P interface circuit shown in FIG. 19.

In FIG. 3, the S/P server SP1 comprises a main board 11 and scanner/printer interface circuits 4-1 and 4-2 (corresponding to the first and the second control boards 91 and 92, respectively, in FIG. 2). The main board 11 comprises a main CPU circuit 1, an Ethernet circuit 2 and a JPEG compression circuit 3. As apparent from the figure, the scanner/printers are equal in number to the interface circuits (4-1 and 4-2 in FIG. 3) when a plurality of scanner/printers are connected to the S/P server SP1. To facilitate addition and removal of the interface circuit, it is implemented in a separate board from the main board 11. The interface circuits 4-1 and 4-2 are connected to the main board 11 through a Versa Module Europe (VME) bus 16 described below. The main CPU circuit 1, the Ethernet circuit 2 and the JPEG compression circuit 3 are implemented in a single board 11 and connected to each other through a local bus 14.

The first scanner/printer interface circuit 41 interfaces input/output between the digital color scanner/printer (a laser beam color scanner/printer) 94 and the VME bus 16. The color scanner/printer 94 such as CLC-500™ (Optical Networks International Inc.) may be a device for producing image data obtained by means of raster scan. On the contrary, the second scanner/printer interface circuit 4-2 interfaces input/output between the digital color scanner/printer (an ink-jet color scanner/printer) 94 and the VME bus 16. The color scanner/printer 95 such as Pixel Jet™ (Canon Co., Japan) may be a device for producing image data obtained by means of shuttle scan.

The main CPU circuit 1 comprises a central processing unit (CPU) 5 and a memory 6 and all programs are carried out under control of, for example, Vxworks® (Wind River Systems Inc.). The CPU 5 may be achieved by any one of suitable microprocessor chips such as R3000® (Mips Computer Systems Inc., U.S.A.). A hard disk 7 is provided as an auxiliary storing device for the memory 6. A reference numeral 8 represents a small computer system interface (SCSI).

The Ethernet circuit 2 comprises an Ethernet transceiver 9 and a direct memory access (DMA) controller 10 for DMA transferring data to the memory 6. The Ethernet transceiver 9 is provided for connecting the main board 11 to Ethernet (a standard set of specifications for a particular type of local area network, originally developed by Xerox Co.) or the LAN 96.

The JPEG compression circuit 3 comprises a JPEG compression/extension controller 12 and a first-in first-out (FIFO) memory 13. The local bus 14 for interconnecting the main CPU circuit 1, the Ethernet circuit 2 and the JPEG compression circuit 3 is connected to the VME bus 16 through a VME bus transceiver 15-1.

The first S/P interface circuit 4-1 comprises a page memory 17 and a first control circuit 18. In this event, a memory capable of memorizing one page as a unit is required because the digital color scanner/printer 94 cannot be interrupted by a flow control once the printing/scanning operation is started. The page memory 17 is so constructed as to memorize compressed data to reduce the capacity of the memory itself. In other words, the image data written in the page memory 17 is the image data rastered in the memory 6. Accordingly, it is compressed according to the adaptive discrete cosine transform (ADCT) compression technique that allows a non-reversible high compression rate. While an ADCT compression chip is not shown in the figure, it is similar to a chip used in the JPEG compression/extension controller 12.

When the ADCT compression technique is applied to the page memory 17, the compressed data is normally used only in this circuit and is not transferred to an external device. Accordingly, the compression technique is not limited to a standard one. An effective technique is used in this embodiment that is obtained by means of improving the JPEG. (As the case may be, a standard compression/extension is applied depending on a mode described below.) The first control circuit 18 is composed of a CPU such as Z-80® (Zilog Inc., U.S.A.) to send to and receive from the scanner/printer 94 control signals except for the images. To reduce the number of the interfaces used for this purpose, control commands are transmitted in serial. The first S/P interface circuit 4-1 is connected to the VME bus 16 through a VME bus transceiver 15-2.

The second S/P interface circuit 4-2 comprises a data length and breadth conversion circuit 19, a buffer memory 20, an image processing circuit 21 and a second control circuit 22 and is connected to the VME bus 16 through a VME bus transceiver 15-3. The data length and breadth conversion circuit 19 is for converting shuttle-scanned image data into raster scan data or vice versa. The data length and breadth conversion circuit 19 converts, upon printing images, the data format of the image in a scan direction into that at 90° relative to the scan direction and converts, upon scanning an original, the data format at 90° relative to the scan direction into that in the scan direction. The buffer memory 20 is used as a converting buffer for the conversion.

The image processing circuit 21 is provided for aiding image processing functions that cannot be achieved by the scanner/printer 95. The second control circuit 22 is similar in operation and function to the first control circuit 18 and is composed of, for example, a CPU such as the Z-80® (Zilog Inc.).

A page description language (e.g., trade name CaPSL) supplied through the LAN 96 and the Ethernet transceiver 9 is stored directly in a specific area (a reception buffer) of the memory 6 by the DMA controller 10. The page description language (hereinafter, referred to as PDL) is then converted therein into a raster image according to a PDL interpreter program described below. The JPEG compressed image may be extended using an extension program in the PDL interpreter program. However, this embodiment applies the JPEG compression/extension circuit 3 for extending the compressed image at a high speed.

The capacity of the memory 6 is not enough for rastering the entire image of one page in a manner described below. As a result, the CPU 5 uses a banding technique to process the PDL partially. In other words, the CPU 5 processes the image data of one page a plurality of times with the data being divided into two or more areas. After completion of rasterization of a given area, the image data corresponding to that area is transferred to either one of the first and the second S/P interface circuits 4-1 and 4-2 and supplied to the printer 94 or 95.

2. Exemplified Settings Associated with the S/P Server Determined at the Host Computer Described referring to FIGS. 4A and 4B are operations of determining various settings associated with the S/P server SP1 that are determined by any one of the host computers ST1 through STN shown in FIG. 1.

Figure 4B:
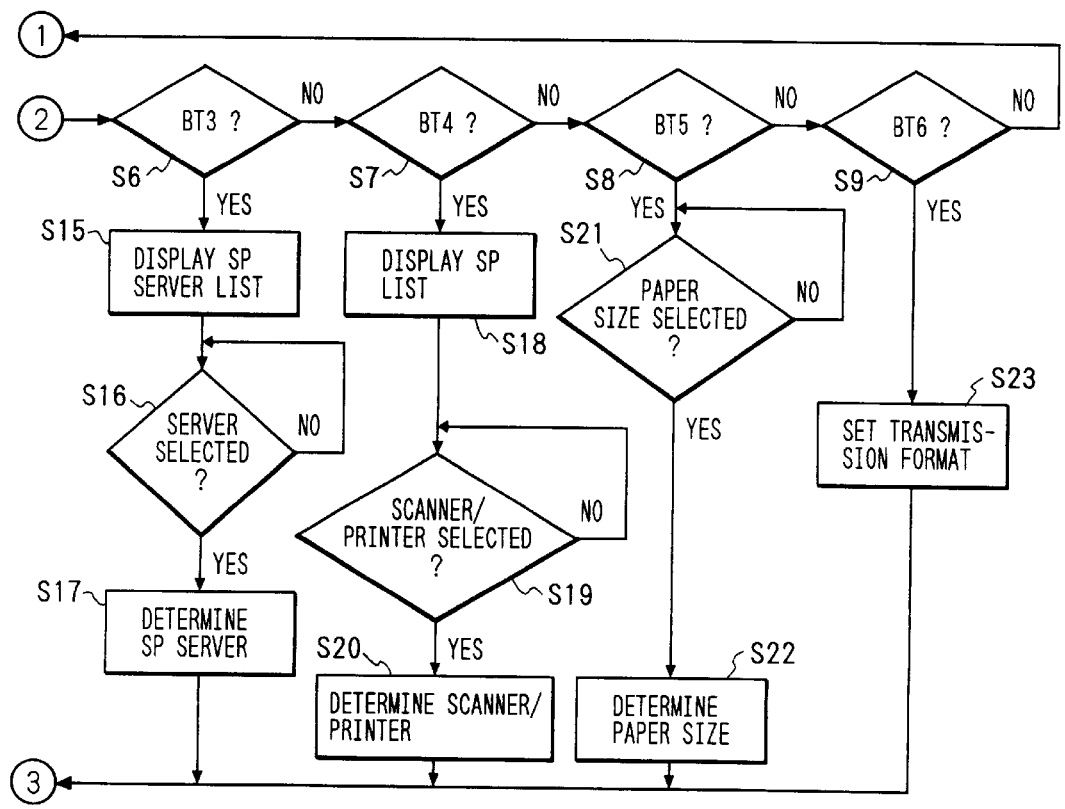
FIG. 4 is comprised of FIGS. 4A and 4B showing flow charts for use in describing procedures for determining, at a host computer, various settings regarding an S/P server.

FIGS. 4A and 4B are flow charts for use in describing procedures for determining, at a host computer, various settings regarding an S/P server. This flow chart corresponds to processing upon printing using the scanner/printer. A standard S/P server, the scanner, the printer, a paper size and transmission format are previously set as defaults.

Figure 5:
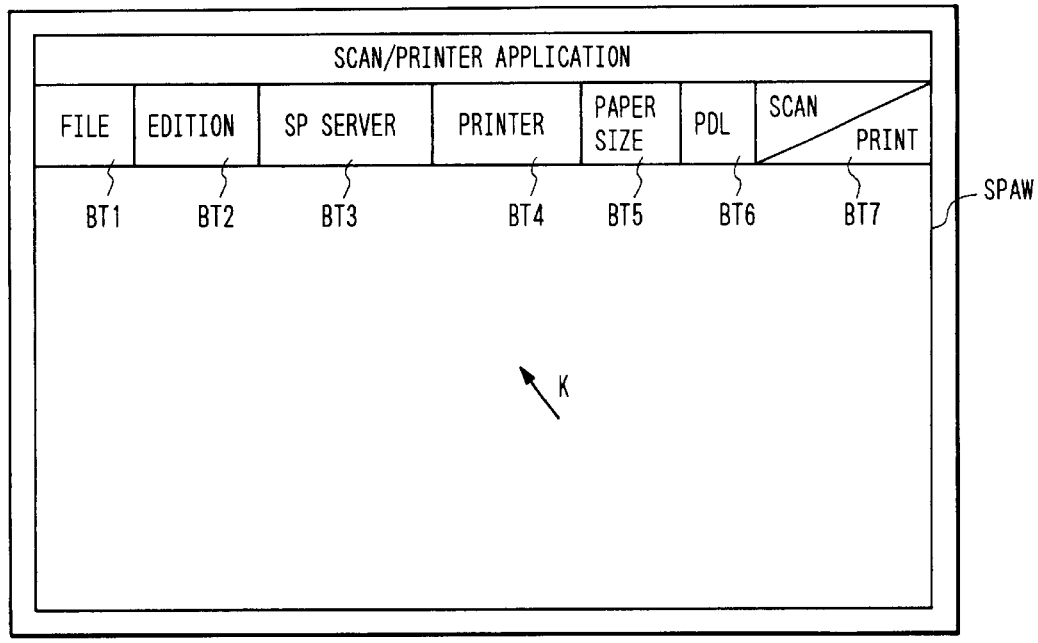
FIGS. 5 through 8 are views illustrating examples of display in the host computer upon determining the settings described in conjunction with FIGS. 4A and 4B.
Figure 6:
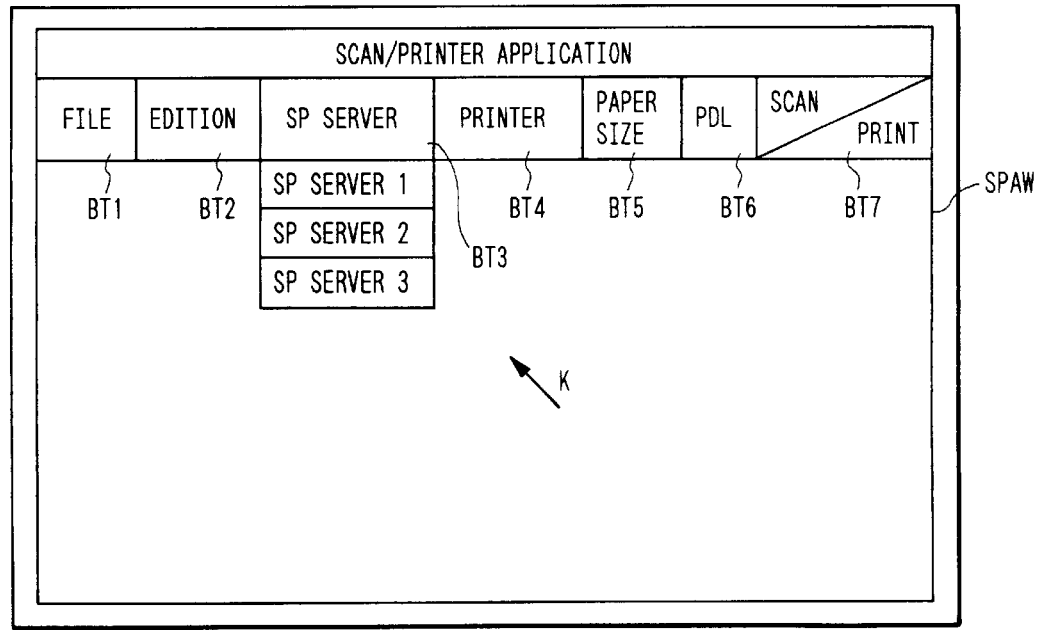

To enter the printing operation is indicated by the host computer at step S1 during execution of an application program provided in this host computer, a scanner/printer application window (hereinafter, referred to as a window SPAW) shown in FIG. 5 is displayed on a display (not shown) of the host computer at step S2. Subsequently, whether buttons BT1 through BT7 are chosen using a cursor K is determined at steps S3 to S9.

When step S4 is positive, a file list (not shown) is displayed in the window SPAW at step S11 and step S12 waits selection of a desired file using the cursor K from the file list. When a file is selected, the selected file is determined at step S13 as a print file (image data) supplied to the S/P server SP1. Then the control returns to the step S3.

When step S5 is positive, an edit menu (not shown) is displayed in the window SPAW at step S14 and edit processing (e.g., setting of a margin to allow space for binding) selected using the cursor K is set. Then the control returns to the step S3.

When step S6 is affirmative, a list (FIG. 6) of S/P servers connected in the network is displayed at step S15 in the window SPAW and step S16 waits selection of a desired S/P server using the cursor K from the S/P server list. When the S/P server is selected, the selected server is determined at step S17 as a destination S/P server and then the control returns to the step S3.

When step S7 is affirmative, displayed at step S18 in the window SPAW is a list (FIG. 7) of printers (or scanner/printers) connected to the S/P server determined as the destination. Step S19 waits selection of a desired one using the cursor K from the list. When one of the printers or scanners is selected, the selected one is determined at step S20 as a printer (scanner) candidate for carrying out the printing operation. Then the control returns to the step S3. To send back data may be chosen when it is desired to obtain a PDL expanded bitmap data without being printed from the printer. Likewise, to register data may be chosen when it is desired to register the bitmap data in the S/P server as a file.

When step S8 is positive, a list of paper sizes available with the printer being determined is displayed and step S21 waits choice of one of the paper sizes using the cursor K. Subsequently, step S22 determines the paper size being chosen as the size of paper used for printing. Then the control returns to the step S3. The paper size(s) available with the designated printer may be recognized through communication and the list thereof is displayed on the display.

When step S9 is positive, a transmission format is set at step S23. More particularly, displayed is a menu (not shown) for use in determining in which format each of a raw image data, the compressed image data and the described data described by the PDL is transmitted. One of the transmission formats is determined by means of choosing it using the cursor K. It is noted that the compressed image data is displayed only when the host computer directed to this operation has a compression function.

A positive result at the step S3 proceeds to step S24 where a print command is transmitted. Step S25 waits a normal response from the selected S/P server. Subsequent step S26 transmits, through the network, print information (the PDL, the raw image data or the compressed image data) according to the file being selected. The above mentioned printing operation is then started. After completion of this printing operation, the control passes to other processing.

While the above mentioned embodiment has thus been described in conjunction with the processing to designate a printer (or a scanner/printer) through the window SPAW by choosing a pull-down menu or displaying a sub window in the window, a user interface may be a graphical interface such as an icon.

Figure 8:
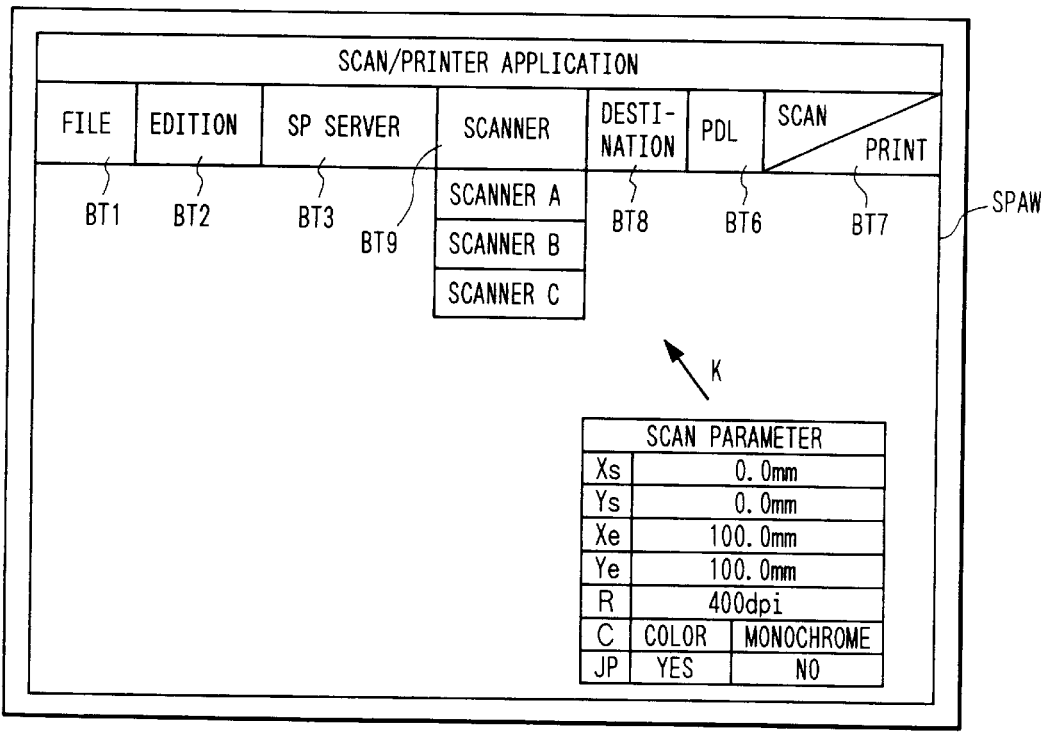

In addition, while the above mentioned embodiment has thus been described in conjunction with settings for carrying out the printing operation especially in the printer (or the scanner/printer), those for carrying out the scanning operation are similar thereto. In particular, upon carrying out the scanning operation, the S/P server is determined and then the scanner (or the scanner/printer) used on the S/P server is determined. Subsequently, as shown in FIG. 8, a desired scan parameter setting window or a setting menu is displayed in the window SPAW to choose a scanning region, a resolution, a color (colored or monochrome), a level (multilevel or bilevel), a compression method, a gamma value, a data format (in order of pages, lines or dots) and a file name to be stored. The scanning operation is started when the button BT7 is chosen using the cursor. In addition, the button BT5 is not appeared on the display while the button BT6 is for reception format rather than for the transmission format. Further, upon carrying out the scanning operation, it is possible to designate the host computer, the S/P server or the printer as a destination for the scanned image data. If the S/P server is designated as the destination for the scanned image data, this data is stored in the S/P server as a file and can be synthesized later with the described data. As described below, a series of PDL commands has a scanner control command in the present invention.

3. A Main Board of the S/P Server 3-1 Structure

The print data supplied from the host computers ST1 through STN are received and processed first by the main board 11 (FIG. 3).

Figure 9:
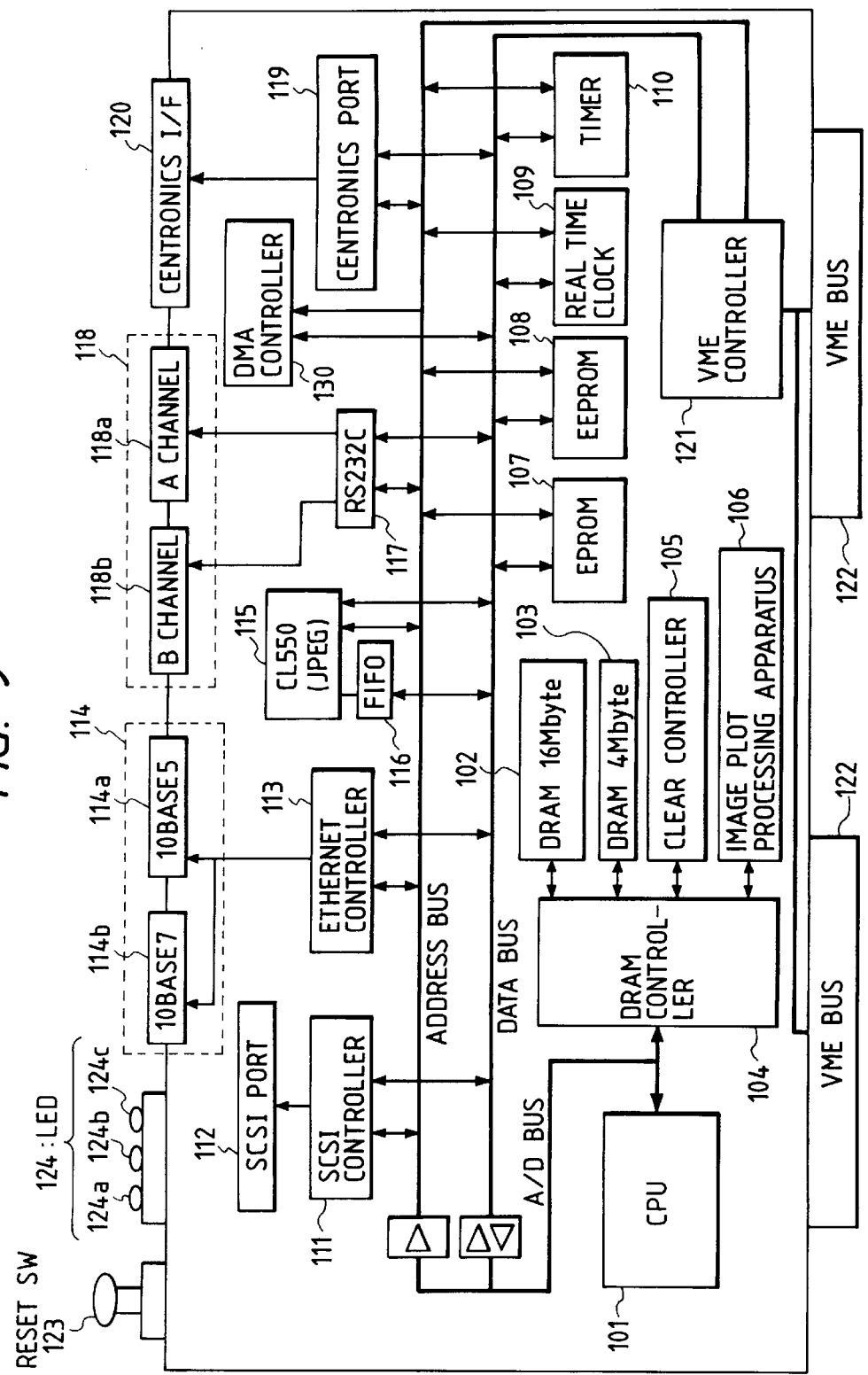
FIG. 9 is a circuit block diagram illustrating a detailed structure of a main board in FIG. 3.

FIG. 9 is a circuit block diagram illustrating a detailed structure of the main board 11 in FIG. 3 that comprises the main CPU circuit 1, the Ethernet circuit 2 and the JPEG compression circuit 3. The main board 11 comprises a CPU 101 composed of, for example, IDT79R30517™ for controlling the whole main board. The main board is provided with a real time operating system (not shown) for allowing the CPU 101 to start up and control in a multi-processed manner the communication program 83, the whole system control program 93, the scanner control program 85, the PDL interpreter program 84 and so on. The main board 11 also comprises a main memory 102, an erasable programmable read-only memory (EPROM) 107 and an SCSI port 112. The main memory 102 is composed of, in this embodiment, a 16-Mbyte DRAM chip and serves as a work memory for the CPU 101. The EPROM 107 stores the above mentioned programs while the SCSI port 112 is for connecting an auxiliary storage device such as a hard disk. When the present system is turned on, the programs stored in the EPROM 107 and the programs stored in the auxiliary storage device or the host computer in the network are down loaded to the main memory 102. As a result, these programs lie in the main memory 102 where they are operated.

A band memory 103 is for storing the data corresponding to several lines of raster scanned image. The band memory 103 is composed of, in this embodiment, a 4-Mbyte DRAM chip and can also be used for expanding the PDL data into the bitmap data. In general, the bitmap data for one page is formed before the data is transferred to a printer engine (not shown). However, the present invention applies a method of bitmap expansion with each page being divided into two or more bands. This is achieved by means of sequencing the PDL data by using the PDL interpreter program 84. The bitmap data for one band expanded in the band memory 103 is supplied to the S/P interface circuits 4-1 and 4-2. The bitmap data for the subsequent band is then expanded into the memory 103 and is also supplied to the S/P interface circuits 4-1 and 4-2. This operation is repeated to print one page. Expansion processing of the PDL data will later be described in detail.

The image data is also stored temporarily in the band memory 103 when it is scanned by the scanner. The image data stored in the band memory 103 can be read out of it by using a block transferring function of a direct memory access (DMA) controller 130 or the CPU 101. The read image data is transferred to the host computer through a hard disk connected to the SCSI port 12 or through a network connected to an Ethernet port 114. After completion of transferring the data corresponding to one band, the scanned data for the subsequent band is obtained and the above mentioned operation will be repeated. It is noted that the CPU 101 and the DMA controller 130 correspond to the CPU 5 and the DMA controller 10, respectively, in FIG. 3.

A memory access controller 104 controls access to and refresh of the dynamic random-access memories (DRAMs) implementing the main memory 102 and the band memory 103. Typical DRAMs can be accessed in three ways: access of every one word (8, 16 or 32 bits) of the DRAM; continuous access of a predetermined length of data (page READ/WRITE); and an interleaving access. In the interleaving access, memory array boards store information in two or more banks. A bank is basically a set of DRAM chips capable of producing or storing a single word unit each time they are accessed in tandem while addresses are generated in preference thereto. These techniques can be used to increase memory throughput. While the main and band memories 102 and 103 are composed of the DRAMs, either one or both of them may be composed of a static random-access memory (SRAM). In such a case, no refresh function is required.

The memory access controller 104 is connected to the CPU 101, the main memory 102 and the band memory 103. The memory access controller 104 is also connected to a clear controller 105 for clearing at a high speed the data stored in the band memory 103.

An image plot processing apparatus 106 is connected to the memory access controller 104 for overwriting the image data scanned by the scanner on the bitmap data expanded in the band memory 103 without clearing the latter. By means of this, the image plot processing apparatus 106 can serve as a synthesizing unit for synthesizing the described image (expanded on the band memory 103 according to the PDL data supplied from the host) with the scanned data. The synthesized data may be supplied to the printer as in the case of the bitmap data expanded on the band memory 103. Alternatively, the synthesized data may be transferred, under control of the CPU 101, to the host computer designated through the network 96 connected to the hard disk or the Ethernet port 114. The synthesized data may be compressed by the JPEG compression circuit 3 in FIG. 3 (corresponding to an ADCT compression/extension circuit 115 described below). A huge volume of color image information can be transmitted to the host in a short time by means of sending the compressed data to the designated host computer(s) through the network 96. As a result, the host is allowed to obtain readily the synthesized image that cannot be provided only with its own memories.

The EPROM 107 stores the above mentioned programs for use in controlling the present system and is accessed first by the CPU 101 upon turning on the system. The EPROM 107 can store data in either one of the following formats: a format executable by the program with being intact; and a format resulting from reversible compression of the whole program, whereby the stored data is rearranged into the main memory 102 while being extended after the system is turned on.

The former one can save the main memory 102 because the EPROM 107 is the memory capable of being accessed without rearranging the data into the main memory 102. This method is, however, disadvantageous in that the EPROM 107 becomes large in capacity and the access rate to EPROMs is relatively slow. On the contrary, the second method contributes to memorizing the larger volume of program in the EPROM 107 because the program is compressed. Accordingly, the relative capacity of the EPROM 107 can be reduced and the faster access can be achieved. With these respects, this embodiment applies the second method of data storage.

The main board 11 comprises an electrically erasable programmable read-only memory (EEPROM) 108 that enables the information to be retained, even after the power has been switched off. The data stored therein can be electrically changed during operation of the system. This EEPROM 108 is used herein for storing addresses on the network and set parameters for the printer. A real time clock (RTC) 109 is provided for tracking real time in hours, minutes and seconds even after the power has been switched off. Information indicating the real time is used upon printing or scanning the image. A timer 110 is an interval timer. The programs applied to this system operate in multiprogramming mode of operation, which is managed by a real time operating system. The timer 110 generates, upon the elapse of a specified time (a few milliseconds), an interval time signal that is supplied to the CPU 101. The CPU 101 is allocated to the programs using the timer 110 and a priority scheduler described below.

An SCSI controller 111 controls an interface standard for connecting peripheral devices to a computer system while an SCSI port 112 is a parallel input and output interface port for connecting the peripheral devices to the computer. An Ethernet controller 113 serves as a control unit for sending and receiving data through the LAN 96 where the present system is connected. The Ethernet controller 113 comprises a small buffer memory (not shown) to ensure a temporal matching between the asynchronous CPU and the synchronous network. The data transferred through the network is stored in this buffer memory. Likewise, the data to be transmitted is stored in the buffer memory. The Ethernet controller 113 also controls transmission and reception of the data as well as an electrical timing to do so. The TCP/IP communication program 82 (FIG. 2) is controlled by the CPU 101 by using this Ethernet controller 113.

The most common technique for physical connection of the computers and other peripheries in the LAN is using cables. These cables are usually either coaxial or twisted pair. The Ethernet port 114 uses a coaxial cable 114a and a twisted pair cable 114b formed of two pairs of wires. The interface for the cable 114a is achieved with a 15-pin connector while that for the cable 114b is achieved with an 8-pin modular jack. The main board 11 is connected in the network using these ports. The ADCT compression/extension circuit 115 is for compressing and extending a halftone data (eight bits for each of red, green and blue components) formed of red (R), green (G) and blue (B) using a JPEG algorithm standardized by CCITT (Comité Consulatatif Internationale de Télégraphique et Téléphonique). For compressing the color halftone data scanned by the scanner, the raw image data may be compressed by using the ADCT compression/extension circuit 115 to save the memory where it is stored. As a result, the transmission rate can be increased. The compressed image data, supplied to the main board 11 through the network 96 is extended by using the same ADCT compression/extension circuit 115. The extended data corresponding to the original color halftone data is written in the band memory 103 and transferred therefrom to the printer interface for being printed.

A first-in first-out (FIFO) memory 116, corresponding to the FIFO 13 in FIG. 3, is used for transmitting to and receiving from the ADCT compression/extension circuit 115 the compressed image data. More particularly, the FIFO memory 116 is used for "absorbing" a time lag caused upon transmitting the data due to the difference of the data amount between the compressed data and the extended data (raw image data) during compression and extension, respectively. An RS-232-C controller unit 117 controls a standard serial interface. As well known in the art, RS-232-C is a low-speed serial interface used to connect data communications equipment defined as a standard by the Electronic Industries Association. The RS-232-C controller unit 117 is connected to an RS-232-C port having two channels, i.e., an A channel 118a and a B channel 118b. One of these channels is used for connecting with a terminal, allowing display on a screen and entering data through a keyboard. The other of the channels is used for connecting a device having a serial interface such as a character printer (including a laser printer) and a simple scanner.

While the present invention applies the A channel for the terminal connection to receive commands or change parameters for the S/P server, it also comprises a pseudo terminal function allowing the same operation as the A channel by means of gamma-login from the host computer in the network.

A centronics interface controller unit 119 carries out an interface control for connecting to the S/P server a printer in conformity to the centronics interface. In practice, the centronics interface controller unit 119 produces data of eight bits after confirming a state (BUSY/non) of the associated device and transmits the data by means of repeating this operation. In addition, the centronics interface controller unit 119 controls other signals in conformity to the centronics interface. The centronics interface controller unit 119 is connected to a centronics interface port 120 where a cable is actually connected to electrically connect the interface 120 to the printer. A VME controller 121 is provided for carrying out control to allow the CPU 101 to access other boards in conformity to a standard of the VME bus. The VME bus is a standard bus for a 32-bit system based on the Versa bus, where a data bus is separated from an address bus in an asynchronous manner. More particularly, address buses A16, A24, A32 and data buses D8, D16, D24 and D32 are arranged with being accessed. In this event, bus arbitration occurs when more than one control of the bus is requested at the same time. In addition, other control suitable for the VME bus standard can be realized by this VME controller. VME bus ports 122 are for connecting electrically VME buses of double height to the main board 11. Each of the VME bus ports 122 is composed of two 6-pin connectors in which address and data buses are arranged.

A reset switch 123 is used for resetting the system as the last challenge when an error is caused therein. The reset switch 123 in this embodiment is formed as a switch mechanism that will be actually depressed by a user. However, the reset switch 123 may be formed as a functional reset (warm reset) to resume from where an operator left off by using a program through a terminal connected to the RS-232-C port or a terminal subjected to the gamma-login from the network.

A light emitting diode (LED) 124 comprises LEDs 124a, 124b and 124c. The LED 124a is used as an indicator light indicating that the power is turned on. The LED 124b indicates that the CPU 101 is in operation while the programs can make arbitrarily the LED 124c emit its light. These LEDs 124a, 124b and 124c allow an operator to recognize visually that the power is supplied to the system, that the CPU 101 is in operation and that the CPU 101 is in waiting state, respectively. The LED 124c emits light frequently in response to execution of a certain processing. The operator could recognize which program make the LED 124c emit light according to the time, interval or number of the lighting.

3-2 Operation upon Printing Processing

Described now is operation of the main board 11 upon processing a request of printing supplied from a host computer in the network.

As mentioned above, the host computer connected in the LAN 96 sends data and information for designating a destination scanner/printer to the S/P server when it requires to print the data. In this event, when a hard disc is connected to the SCSI port, the data is once stored (spooled) in the hard disk. The data is stored in the main memory 102 if no hard disk is connected to the SCSI port. The data transferred from the host may be:

(1) data in the PDL format,
(2) data in a format of a raw image, or
(3) data in a format of compressed image data.

The PDL interpreter program 84 is carried out when the transferred data is in the PDL format. The bitmap expansion for every one band is carried out to write the bitmap data into the band memory 103. After completion of writing the data corresponding to the band memory, the data is transferred therefrom to the printer and subsequent bitmap expansion is carried out.

When the transferred data is in the format of the raw image, the data for one band is written in the band memory 103 and transferred therefrom to the designated printer. Subsequently, the data for the next band is prepared. The raw image contains a large amount of data, so that the host computer separates it and sends to the S/P server at a few times rather than sending the same at one time. Accordingly, operation for receiving the data from the network is continued during printing.

When the transferred data is in the format of the compressed image, this compressed image data is written in the FIFO memory 116 and converted into the raw image data by using the ADCT compression/extension circuit 115. The data for one band is then written in the band memory 103 and transferred therefrom to the designated printer. The similar operation is repeated. The image data may be in a combined format of (1) and (2) or of (1) and (3) rather than in a single format. In such a case, the operation required for each of the formats is carried out.

An interface of a printer device for transmitting the image data may be connected to an interface board formed on the VME bus 16, to the RS-232-C port 118 or to the centronics interface port 120. The destination is determined depending on which interface is connected to the printer used for printing in response to the command supplied from the host computer.

The clear controller 105 clears the band memory 103 after the data for one band is transferred therefrom to the printer. The PDL expansion is again carried out, the data is transferred to the interface circuit of the designated printer, and the output processing is carried out on the printer by means of controlling the interface circuit (control board) by the device driver 86. These procedures are repeated.

Described is a rastering operation carried out in the main board 11 when it receives the PDL data from the host computer.

Figure 10:
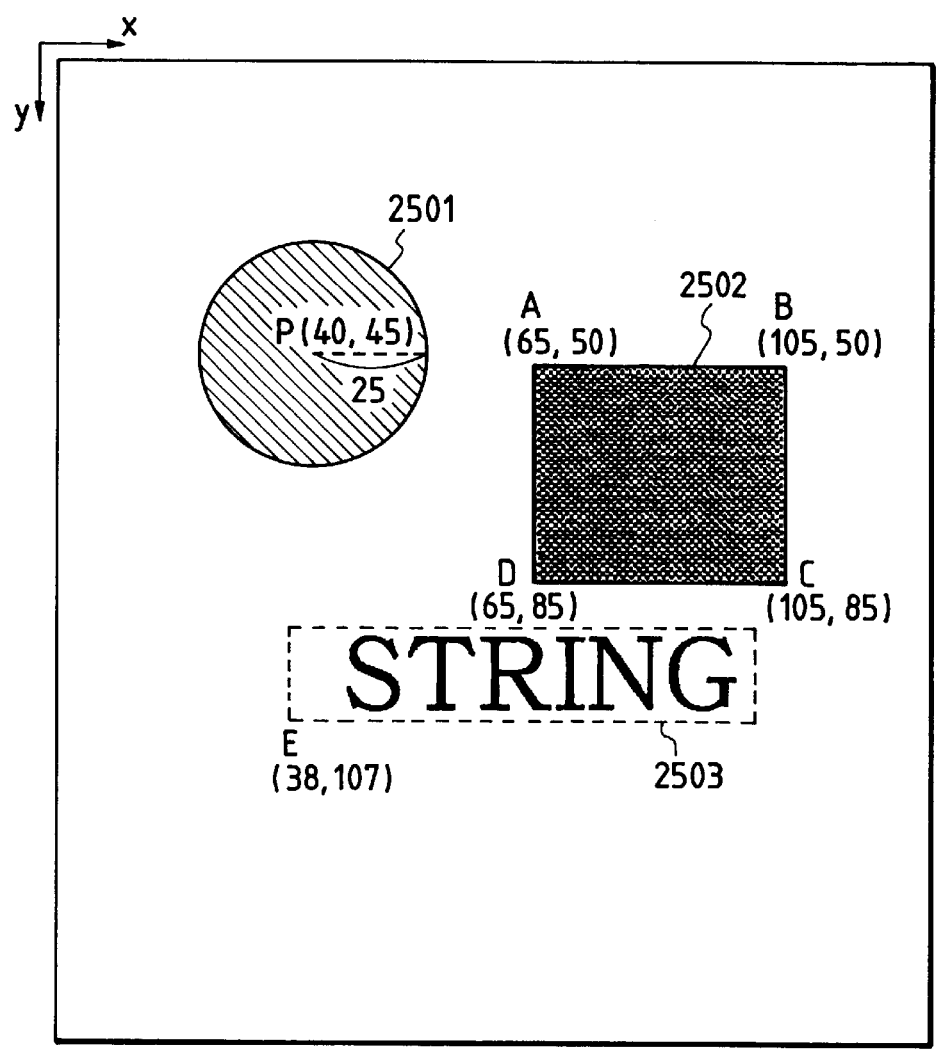
FIG. 10 is a view illustrating an exemplified sample of an output image obtained according to a raster processing on a band memory.

FIG. 10 shows an example of an output image sample obtained by mastering the image into the band memory 103. This output is produced from either one of the color scanner/printers 94 and 95 shown in FIG. 1. As shown in FIG. 10, a circle 2051 is 25 mm in radius. A center of the circle 2051 is located at a point 40 mm from the left in the x direction (horizontal direction) and 45 mm from the top in the y direction (vertical direction). This circle 2051 is formed of a boundary (configuration) line and a plane enclosed by the line. A rectangle 2502 is defined by four points A through D. More particularly, the rectangle 2502 is formed of a boundary (configuration) line and a plane enclosed by the line. A word "STRING" is appeared from the point 38 mm from the left in the x direction and 107 mm from the top in the y direction. To produce this image containing the graphic patterns and the characters, plot information is converted into, for example, the CaPSL codes by using the conversion programs of the respective host computers.

FIGS. 11 and 12 are views for use in describing the page description language with various commands to describe how the image will be printed on a paper.

In FIG. 11, a color designation command is generally indicated by a reference numeral 2061. As apparent from the figure, the color designation command has a command number and R, G and B values as elements. The command number is for identifying the command while the R, G and B values are for designating color levels. A command number "1" is assigned to this color designation command for designating color or a line. Reference numerals 2602 and 2603 are commands for designating colors of a plane and a character, respectively. Command numbers "2" and "3" are assigned for the commands 2602 and 2603, respectively. A line type designation command 2604 is a command for designating a type of the line used for plotting a graphic pattern. The lines may be a solid line, a broken line or a dotted line. A command number "4" is assigned to the line type designation command 2604. A line width designation command 2605 is a command for designating a width of the line. This width should be designated by a millimeter order. A command number "5" is assigned to the line width designation command 2605. A plane type designation command 2606 is a command for designating a filling pattern for a plane enclosed by the line. A command number "6" is assigned to the plane type designation command 2606.

In FIG. 12, commands 3701 through 3703 are for designating attributes of a character. More particularly, a character size designation command 3701 is a command for designating a size of a character. A character style designation command 3702 is a command for designating a style of a character such as bold and Italic. A character type designation command 3703 is a command for designating a font of a character. Command numbers "7", "8" and "9" are assigned to the commands 3701, 3702 and 3703, respectively.

While these three commands are related to the attribute of a character being plotted, commands 3704 through 3706 are for plotting actually a graphic pattern or a character. A circle plot command 3704 has a command number "10", a length of the radius (R) and x,y coordinates of the center (X,Y). Likewise, a rectangle plot command 3705 has a command number "11", x,y coordinates of a start point (Xs,Ys) and x,y coordinates of an end point (Xe,Ye). The end point is located at an orthogonal position relative to the start point. A character plot command 3706 has a command number "12", a position of the head of the character sequence (X,Y), and numbers of character codes.

These commands are used in combination with each other to print a document of various types. It is understood that the page description language is not limited to the above mentioned CaPSL command. PostScript, LISP(III) or ESC/P can equally be applied to the present invention.

Figure 13:
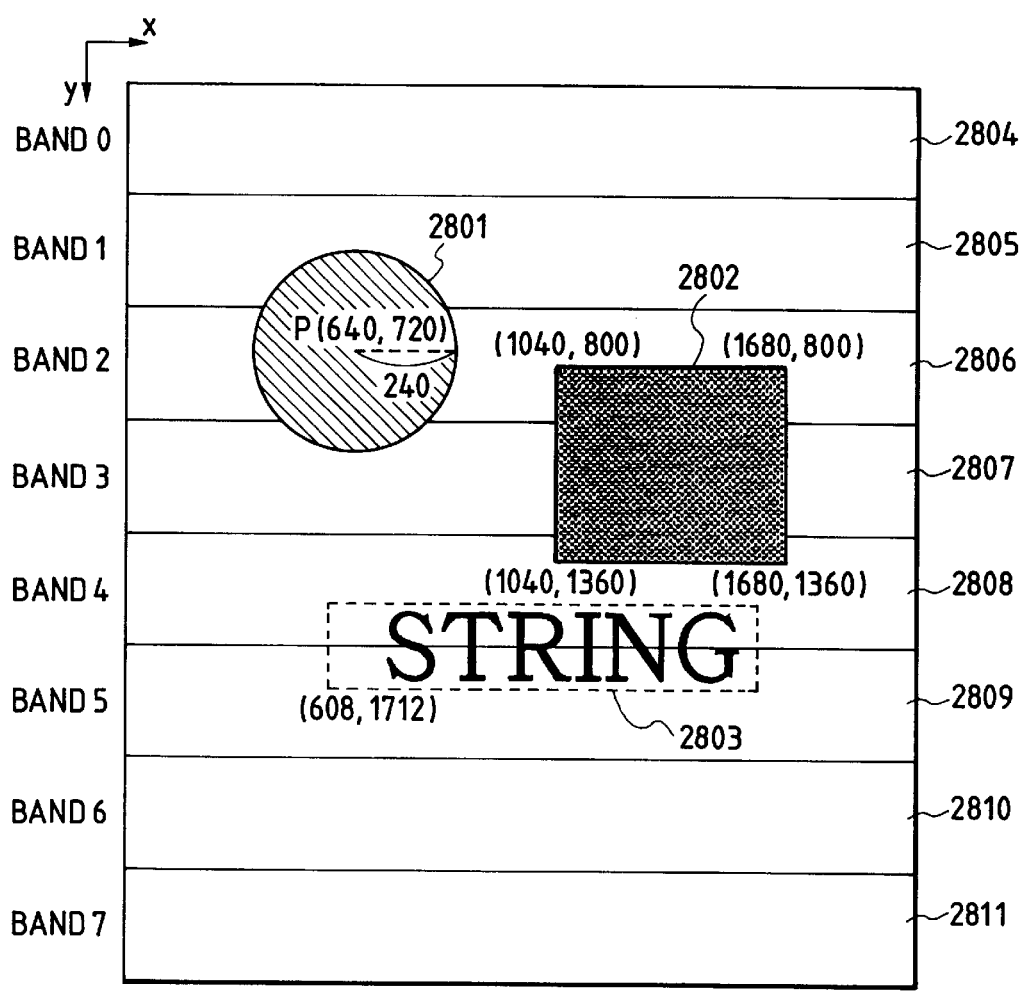
FIG. 13 is a view for use in describing a raster processing for every one band.

Referring to FIG. 13, described is a band-based raster operation carried out in the S/P server according to the present invention.

FIG. 13 is a diagrammatic representation for use in describing a band-based raster operation carried out in the S/P server according to the present invention. This operation is carried out by the CPU according to the PDL interpreter program 84 shown in FIGS. 2A and 2B. An image memory sufficient for storing data of one page has a memory capacity of approximately 20 Mbytes, provided that the page is represented by 2560 dots in column and 2000 dots in row, with 4 bites for each pixel. A DRAM having such a large capacity requires expensive large-scaled memory circuits. With this respect, the rastered image shown in FIG. 10 is represented on a coordinate array on a physical memory. This is shown in FIG. 13. For example, the resolution of the color scanner/printers 94 and 95 shown in FIGS. 2A and 2B corresponds 16 dots per millimeter (about 400 dpi). Thus, the coordinates of the center of a circle 2801 come to (640, 720) by dot. The radius corresponds to the amount of 240 dots. Likewise, physical coordinates are given for a rectangle 2802. A character sequence 2803 is located at a position started from a point of (608, 1712). The coordinate system is partitioned into bands as shown in FIG. 13. One band corresponds to the capacity of the memory used. In this embodiment, the coordinate system is partitioned into eight bands 2804 through 2811, each having 320 dots in column and 2000 dots in row. A raster program transmits the contents of the band memory 103 to the color scanner/printer when plotting of a band "0" is completed. After completion of transmission, the band memory 103 is cleared by the clear controller 105. The similar operation is repeated for all the bands "0" through "7" in the above mentioned manner.

Next, referring to FIGS. 14 and 15, description is made in conjunction with page description commands for use in producing the image shown in FIG. 10 by the color scanner/printers 94 and 95. It is assumed that commands illustrated in FIG. 14 are supplied from the host computer in each station shown in FIGS. 2A and 2B to the S/P server.

In FIG. 14, a first command 2901 has the command number "1", indicating that it is the color designation command for lines. The PDL interpreter program 84 interprets this command 2901 and determines that the subsequent three parameters are given for designating colors. The PDL interpreter program 84 reads the values for the R, G and B parameters, i.e., 255, 0 and 0, respectively, and stores them temporarily. The PDL interpreter program 84 then interprets the subsequent command 2902 and stores temporarily the designation for colors of the plane. Likewise, information regarding lines and planes is stored during interpretation of commands 2903 through 2905. A command 2906 is the circle plot command. The PDL interpreter program 84 reads the plot command and creates an intermediate table 2921 and a detailed table 2922 (referred to as an intermediate code) as shown in FIG. 15.

The PDL interpreter program 84 multiplies the values of the coordinates of the center and radius by 16 to obtain physical printing coordinates. The PDL interpreter program 84 then calculates maximum and minimum coordinates in the direction of the Y axis contained in the given graphic pattern. For example, the circle 2801 has the minimum and maximum values of coordinates, "479" and "959", respectively. The width (in the direction of the Y axis) of each band is equal to "320" and thus it is calculated that the circle 2801 lies in the bands 1 and 2.

The PDL interpreter program 84 registers "1" in a start band (SB) and "2" in an end band (EB) of the intermediate table 2921. Then the PDL interpreter program 84 registers "Circle" in an entry represented by COM (command) for identifying the command. In addition, the PDL interpreter program 84 registers identification number of the detailed table in an entry of TNUM (table number). Subsequently, the PDL interpreter program 84 registers successively detailed information regarding to circle plotting in the detailed table 1. The head TNUM represents a number of the detailed table while LCOLOR and FCOLOR represent colors of the line and the plane, respectively. An LT represents a type of the line. The information regarding to the line temporarily stored is registered in this entry LT. Likewise, an entry LW is used for registering the width of the line that is also stored temporarily. In this event, the width of the line is registered after being converted into coordinate units suitable for the printer coordinate system. For example, the line of 2.5 mm in thick corresponds to 40 dots in the printer coordinate system. Similarly, an entry FT is used for registering the type of the plane that is also stored temporarily.

The PDL interpreter program 84 obtains from the command 2906 the radius and the center coordinates after being converted into the printer coordinate system and registers them in entries DR, DX and DY. In this way, the PDL interpreter program 84 creates the intermediate table 2921 and the detailed table 2922 by means of putting in the entries of the tables the information indicated by the commands 2901 through 2906. Likewise, the PDL interpreter program 84 creates the intermediate table 2921 and a detailed table 2923 regarding to a rectangle plotting by means of putting in the entries of the tables the information indicated by the commands 2907 through 2912. In addition, the PDL interpreter program 84 creates the intermediate table 2921 and a detailed table 2924 regarding to characters by means of putting in the entry of the tables the information indicated by the commands 2913 through 2917. The PDL interpreter program 84 creates a bitmap data for the characters according to the information regarding to the style, type and size of the characters obtained from the commands 2914 through 2916. This bitmap data is also stored in the memory. As a result, the detailed table 2924 stores only a start address of the corresponding memory.

After completion of creation of the intermediate table 2921 and the detailed tables 2922 through 2924 by means of putting in the entries of the tables the information indicated by the commands 2901 through 2917, the PDL interpreter program 84 starts processing to plot the graphic patterns and the characters according to the information.

First, the PDL interpreter program 84 starts to plot the band 0. Looking up the intermediate table 2921, the PDL interpreter program 84 determines whether the band 0 contains an image. As shown in the entries SB and EB in the intermediate table 2921, no image to be plotted is contained in the band memory. Accordingly, the PDL interpreter program 84 transmits the contents of the memory to the printer without carrying out plot processing. Next, the PDL interpreter program 84 looks up the entries SB and EB of the intermediate table 2921 and recognizes that the band 1 contains a circle to be plotted. The PDL interpreter program 84 thus plots the circle on the band memory based on the information in the entry TNUM indicated by the identification number "1" of the detailed table. In this event, clipping operation should be made to plot the circle by means of removing the elements that lie outside a given band. Otherwise, an access error on the memory may be caused due to an area where no memory corresponds is used to plot the graphic pattern. Subsequently, the PDL interpreter program 84 carries out plot processing for the band 2. Looking up the intermediate table 2921, the PDL interpreter program 84 recognizes that the circle 2801 and the rectangle 2802 should be plotted on the band memory. Accordingly, the PDL interpreter program 84 carries out raster operation looking up the detailed tables 2922 and 2923.

As mentioned above, according to the image processing carried out by the first server of the present invention, the server is provided with the band memory where a memory area required for plotting an image of one page can be divided into a plurality of band areas. Analyzed are commands of a predetermined page description language for one page as a unit that are successively received from the hosts connected to the server in a predetermined network. Output band information is derived for each object to plot successively the objects in the corresponding band according to the output band information. A complex object can thus be produced effectively even when a memory capacity is relatively small.

Thus, the PDL interpreter program 84 first looks up the intermediate table for every one band to determine whether there are any graphic patterns or characters to be plotted. If any, the PDL interpreter program 84 looks up the detailed table where the detailed information for that pattern or character is stored. The PDL interpreter program 84 plots the graphic pattern and the character by means of repeating these procedures to raster the image of one page.

Figure 16:
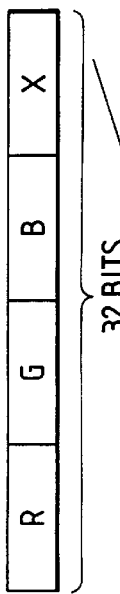
FIG. 16 is a view illustrating a structure of an image data for one pixel expanded in a main board 11.

One pixel expanded by the CaPSL is as shown in FIG. 16. As apparent from the figure, 32 bits are required per pixel having R, G, B and X components. Of the 32 bits, 24 bits are devoted to representing color, and 8 to control purpose (for additional information X). Of the additional information X, a bit 0 represents an image area determination bit. This bit is set into "ON" when the CaPSL plots the image to the band memory. In addition, a bit 2 is devoted to represent black information and is set into "ON" when all the values of R, G and B are equal to zero for characters or graphic patterns. This information is analyzed by the first interface circuit 4-1 when the given image is produced from the printer 94B, improving the quality of the produced image.

Two methods are available for supplying the image from the main board 11 to the first interface circuit 4-1 through the VME bus. These methods are similar to those in a case where the main board 11 receives the raw image data supplied from the host computer as described below. In addition, the main board 11 is capable of returning the expanded data to the host computer as mentioned above. Operation in this event is similar to the above mentioned operation until the bitmap image is expanded into the band memory. The subsequent operation is similar to the operation upon scanning processing described below.

Upon transmission of the data in the format of the raw image data, the host computer supplies to the band memory 103 the data of one band consisting of red, green and blue components in order of pixels. It is possible in this embodiment to send from the host computer the additional information X described below along with the R, G and B data. In addition, the host computer may be designed to send the data in order of the bands but it is impossible to send the same in order of the planes without extending a memory or implementing a hard disk.

The image data of one band stored in the band memory 103 can be transmitted to the first S/P interface circuit 4-1 in either one of two modes of operation. One is a mode of transmitting the raw image data as it is to the VME bus 16 and the other is a mode of transmitting the raw image data after being compressed by the ADCT compression/extension circuit 115. The former mode is the only one possible mode when the image data is supplied to the second S/P interface circuit 4-2. These modes can be selected by a user by operating utility programs in the host computers ST1 through STN or by using a keyboard connected to the S/P server. As a default, the system is in the mode of transmitting the raw image data as it is (through the VME bus 16).

To transmit from the host computer the compressed image data, the compressed image data being received is extended by the ADCT compression/extension circuit 115 and stores in the band memory 103 for every one band. The following procedures are similar to those described in conjunction with the transmission of the raw image data. If the system is in a mode to pass the compressed image data through the VME bus 16, the compressed image data being received is supplied to the first S/P interface circuit 4-1 directly through the FIFO 116.

3-3 Operation upon Scanning Processing

The present system receives designation information for operating the scanner from the host computer in the network that requires to obtain the image data through the scanner. The present system then starts image input operation. An interface of the scanner device may be connected to the interface board formed on the VME bus 122 or to the RS-232-C port 118. The destination is determined depending on which interface is connected to the printer used for printing in response to the command supplied from the host computer. The image data scanned by the scanner is supplied to the band memory 103 through the first and the second S/P interface circuits 4-1 and 4-2. As mentioned above, the band memory 103 stores the scanned data corresponding to one band of the memory. The scanned image data may be transferred from the band memory 103 to the designated host computer under the control of the scanner control program 85 in any one of the following three formats:

(1) data in the PDL format (with a tag being added thereto), (2) data in a format of a raw image, or (3) data in a format of a compressed image data.

When the transferred data is in the format of the raw image, the data stored in the band memory 103 may be transferred therefrom to the designated host computer successively through the network. Alternatively, the data may first be stored in the hard disk connected to the SCSI port 112. The host computer is allowed to select either one of these methods and sends the designation information to the present system. If the data is provided with a tag recording the image information, the transmitted data includes this tag.

When the transferred data is in the format of the compressed image, the data stored in the band memory 103 is supplied to the ADCT compression/extension circuit 115 where it is compressed. The compressed data is then stored in the FIFO memory 116. The stored data are successively read out of the memory 116 and transferred therefrom to the host computer. After completion of data reading, the similar operation is carried out to obtain the compressed data for the subsequent band. If the SCSI port 112 is connected to the hard disk, similar operation is made expect that the data stored in the band memory 103 is temporarily stored in the hard disk before being transmitted to the host computer.

The host computer may receive the data from the first S/P interface circuit 4-1 in either one of two modes of operation. One is a mode of receiving the raw image data through the VME bus 16 and the other is a mode of receiving the compressed image data. As mentioned above, the former mode is selected as the default. If the compressed image data is supplied to the host computer, the compressed image stored in the FIFO memory 116 is sent directly to the host computer.

In addition, if the S/P server is designated by the host computer as the destination, the scanned image data is stored as a file in the hard disk in any one of the above mentioned formats (1) through (3). Further, if the printer is designated as the destination, the scanned data is once stored in the hard disk in the format of the raw image data and then read out of the hard disk for one band. The read data is supplied to the S/P interface circuits 4-1 and 4-2 in the manner described above. It is noted that two or more destinations can be designated at the same time.

3-4 Others

Figure 17:
FIG. 17 is a circuit block diagram illustrating a detailed structure of a memory clear controller shown in FIG. 9.

FIG. 17 is a block diagram illustrating a detailed structure of the memory clear controller 105 shown in FIG. 9. In the figure, an address generating unit 201 supplies to an address buffer unit 203 an address to be cleared in response to a clear start signal supplied from the CPU 101. A data latch 202 produces a clear data to a data buffer unit 204.

In the so constructed main board (comprising the main CPU circuit 1, the Ethernet circuit 2 and the JPEG compression circuit 3), the CPU 101 makes the address buffer unit 203 and the data buffer unit 204 enabled in response to confirmation that the data stored in the band memory 103 is transferred to the other storage device or the interface. At the same time, the CPU 101 makes other accessing means to the band memory 103 disabled. The data latch 202 stores an initialization data upon starting up the system. For example, the data latch 202 stores the data "00". The CPU 101 supplies the clear start signal to the address generating unit 201. In response to this, the address generating unit 201 generates addresses successively to write the data latched by the data latch 202 into the band memory 103 through the memory access controller 104. After completion of writing all data in the band memory 103, the address generating unit 201 supplies a clear end signal to the CPU 101 to stop the clearing operation.

When the image data stored in the band memory 103 is transferred therefrom to the printer device, the image data contained in the subsequent band is expanded by the PDL interpreter program 84. In this event, the PDL interpreter program 84 carries out the bitmap expansion only on the desired region. For example, only the image belonging to the BAND 2 is written in the band memory 103 upon expansion of the image contained in the band 2206 shown in FIG. 13. Accordingly, the image data in the band 2805 that has already been transferred is left as the unnecessary data. The data comprising the images for both bands 2805 and 2806 would have remained in the band memory 103 if no clearing operation is carried out. To avoid this, the clearing operation is required. The memory clear controller 105 is for carrying out the above mentioned memory clearing operation, allowing a processing at a high speed.

Figure 18:
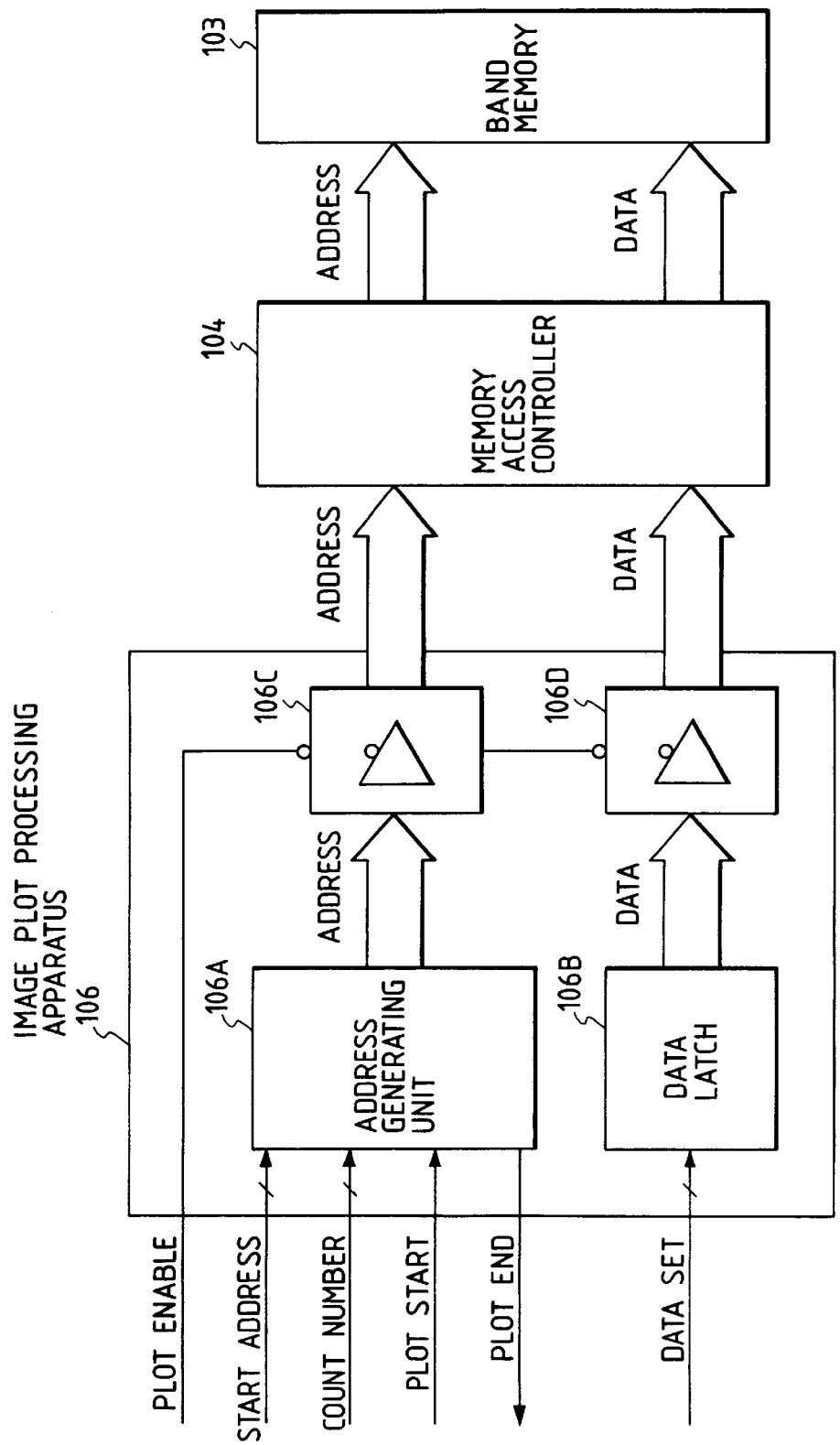
FIG. 18 is a block diagram illustrating a detailed structure of an image plot processing apparatus shown in FIG. 9.

FIG. 18 is a block diagram illustrating a detailed structure of the image plot processing circuit 106 shown in FIG. 9.

Figure 7:
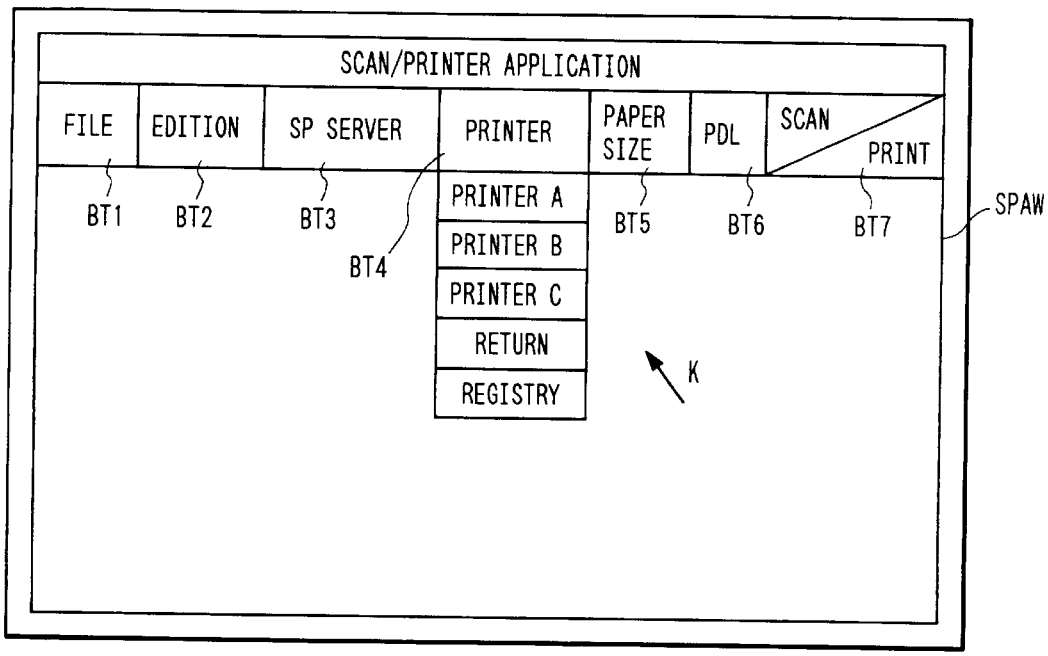

The image plot processing circuit 106 is so constructed that the plot function of the PDL interpreter program is supported by a hardware. The PDL interpreter program is often subjected to operation for drawing lines or filling graphic patterns requiring a considerable time of operation. For example, to fill the pattern enclosed by (1) through (3) in FIG. 7 is carried out during the filling operation as indicated by an arrow in the figure.

In FIG. 18, an address generating unit 106A supplies to an address buffer unit 106C an address to be cleared in response to a plot start signal supplied from the CPU 101. A data latch 106B produces a plot data to a data buffer unit 106D.

In the so constructed main board, the CPU 101 supplies a command to the image plot processing circuit 106 when it is determined that, according to the processing result obtained by the PDL interpreter program 84, the current band contains any lines or patterns to be plotted. The CPU 101 first makes the data latch 106B latch the plot data. Subsequently, the CPU 101 sets in the address generating unit 106A a start address and the number of counts (the amount of plotting for one line). An end address may be set rather than setting the number of counts. The CPU 101 makes the address buffer unit 106C and the data buffer unit 106D enabled and makes other accessing means to the band memory 103 disabled. The CPU 101 supplies the plot start signal to the address generating unit 106A. In response to this, the address generating unit 106A generates addresses successively to write the data latched by the data latch 106B into the band memory 103 through the memory access controller 104. Upon reached to the counted region (the end address) to write the data into the band memory 103 is stopped and the address generating unit 106A then supplies a plot end signal to the CPU 101 to set the next start address and the number of counts, following which writing data in the memory is restarted. After completion of the plotting for one band, the plotting for one band is terminated.

While the plotting operation is directed to increase an operation speed using a hardware as in the case of the clearing operation, an exclusive LSI may be provided for being allocated the task of all plotting operation to reduce the burden imposed on the CPU.

4. A First S/P Interface Circuit of the S/P Server

Figure 19:
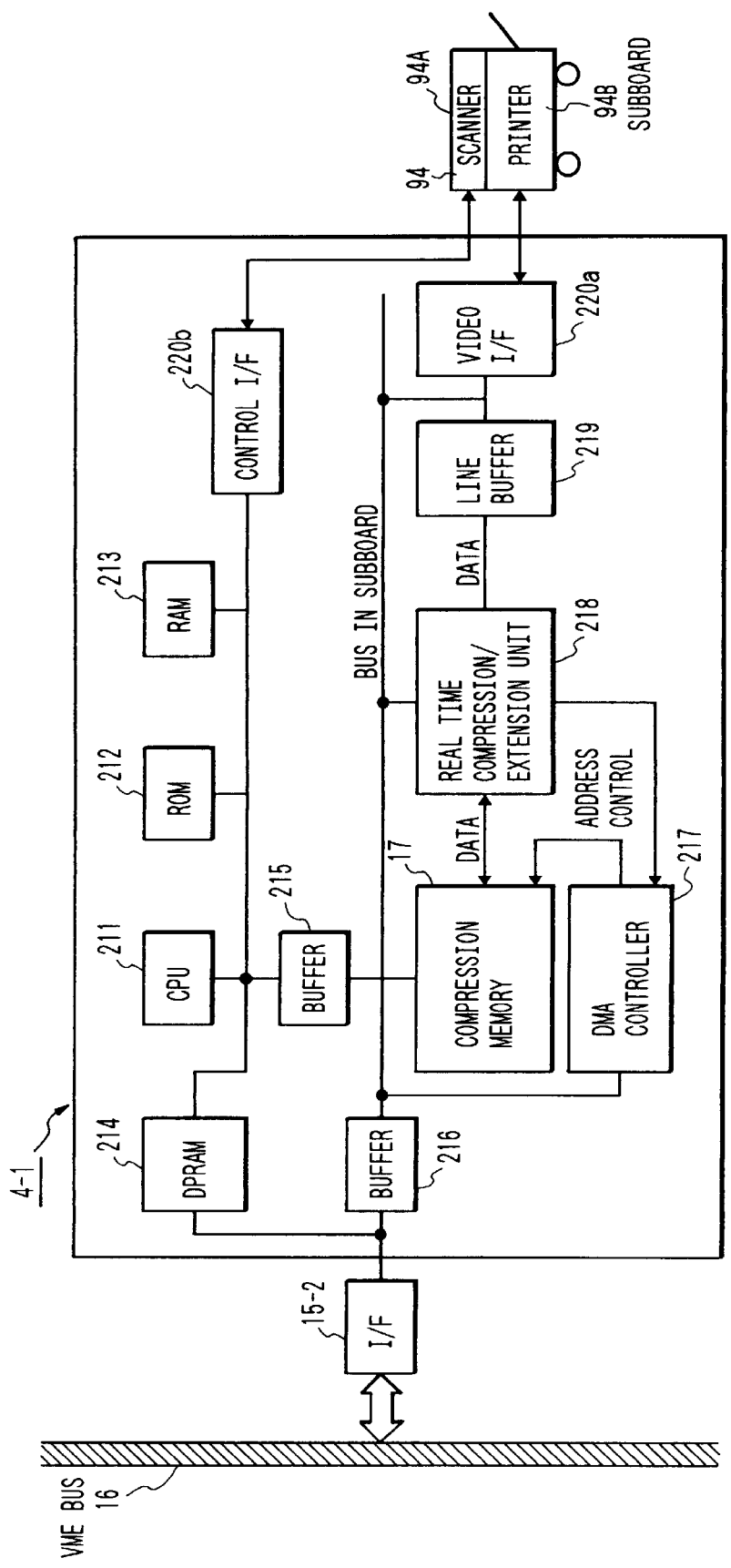
FIG. 19 is a block diagram showing an internal structure of a first S/P interface circuit shown in FIG. 3.

Referring to FIG. 19, described now is a detailed structure of the first S/P interface circuit 4-1 shown in FIG. 3. FIG. 19 is a block diagram showing an internal structure of the first S/P interface circuit 4-1 shown in FIG. 3. Throughout the following description in conjunction with FIG. 18, similar reference numerals refer to similar elements to those shown in FIG. 3.

A CPU 211 generally controls the first S/P interface circuit 4-1. More particularly, the CPU 211 controls each devices connected to a bus in subboard according to a control program (a program for supporting the device driver 86) stored in a read-only memory (ROM) 212. In addition, the CPU 211 initializes each unit and transmits and receives commands to and from the scanner and the printer. A dual-ported random-access memory (DPRAM) 214 is provided for transmitting to and receiving commands between the first S/P interface circuit 4-1 and the main board 11. The CPU 101 of the main board 11 can access to the DPRAM 214 through the VME bus 16 in dependent of access of the CPU 211 to the DPRAM 214. Buffer memories 215 and 216 are provided to avoid interference between the CPUs 211 and 101.

A real time compression/extension unit 218 compresses and extends a multilevel image data in a real time. The term "real time" used herein is meant to processing carried out at the same speed as the speed of for example, about 15 MHz (32 bits) at which the image data is provided through a video interface 220. The compression memory 17 stores the data compressed by the real time compression/extension unit 218. A line buffer 219 functions as a memory for storing data for eight lines in the raster direction. The line buffer can be randomly accessed by the real time compression/extension unit 218 according to the ADCT compression with an eight-by-eight matrix. A DMA controller 217 is for transferring the data between the compression memory 17 and the real time compression/extension unit 218 without passing through the CPU 211.

A video interface 220a interfaces the scanner 94A and the printer 94B. A reference numeral 220b represents a control interface.

The first S/P interface circuit 4-1 carries out following first through fourth modes of processing in association with the modes of transmitting the raw image data to the VME bus 16 and of transmitting the compressed image data. Each mode of processing is described with reference to FIG. 19. It is noted that these modes can be carried out by means of executing the device driver 86 stored in the ROM 212 as well as the image input apparatus control program 85 stored in the main memory 6.

First Mode Processing

In a first mode processing (image printing mode processing), the raw image data stored in the band memory 103 of the main CPU circuit 1 is received through the VME bus 16. The received data is compressed by the real time compression/extension unit 218 and stored in the compression memory 17 in the form of the compressed image. This operation is carried out for the data of one page. After completion of compressing the data of one page, the printer 94B is operated. Subsequently, the compressed image data stored in the compression memory 17 in the form of the compressed image is read out of it by the DMA controller 217 and supplied to the real time compression/extension unit 218. The compressed data is extended into the raw image data by using an extension circuit of the real time compression/extension unit 218. The extended raw image data are successively transferred to the printer 94B through the video interface 220a. The image extension is carried out in synchronism with the data processing operation of the printer 94B at a high speed. As a case may be, the printer 94B is provided with the data after being subjected to a certain image processing and the processed data is used for printing.

Second Mode Processing

In a second mode processing (image scanning mode processing), the image data scanned by the scanner 94A is supplied to the first S/P interface circuit 4-1 through the video interface 220a. The supplied data is compressed by using a compression function of the real time compression/extension unit 218 in synchronism with data transmission at a high speed. The compressed image data is stored in the compression memory 17 by means of the DMA controller 217. After completion of scanning the image corresponding to one screen, the CPU 101 of the main board 11 again extends the data stored in the compression memory 17 by using an extension function of the read time compression/extension circuit 218. Thus, the compressed data is converted into the original raw image data. The raw image data is supplied to the main board 11 through the VME bus 16. The main board 11 transfers the received data with being intact to the designated host computer when the host computer in question requests to receive the raw image data. Alternatively, the main board 11 compresses the received data by using the compression function thereof and transfers the resultant data to the host computer when the host computer in question requests to receive the compressed image data.

Third Mode Processing

In a third mode processing (a normal compressed image printing mode processing), the main board 11 receives the compressed image data from the host computer in the network. The main board 11 does not extend the compressed data at that time and transmits the same as the compressed image data to the designated first S/P interface circuit 4-1. Alternatively, the main board 11 may compress the raw image data and transmits the resultant data to the designated first S/P interface circuit 4-1. The first S/P interface circuit 4-1 stores the compressed image data in the compression memory 17, following which it drives the designated printer 94B. The compressed image data is then extended by using the extension function of the real time compression/extension unit 218 in synchronism with the printing speed of the printer 94B. The extended image data is thus produced from the printer 94B.

Fourth Mode Processing

In a fourth mode processing (a normal compressed image scanning mode processing), the scanned image is compressed by using the compression function of the real time compression/extension unit 218 at a high speed in synchronism with the scanning speed of the scanner 94A. The compressed data is stored in the compression memory 17. After completion of the scanning of the data of one screen, the CPU 211 transmits the compressed image data as it is through the VME bus 16.

The first S/P interface circuit 4-1 is interfaced using the raw image data in the first and second modes of operation. Accordingly, it is not necessarily required for the first S/P interface circuit 4-1 to carry out normal compression and extension required for image communication. Instead, a unique compression and extension can be made depending on the demands for increasing operating speed or other objects.

While the above mentioned second and fourth modes of operation have thus been described in conjunction with a case where the data scanned by the scanner 94A is directly compressed by the real time compression/extension unit 218, the real time compression/extension unit 218 may compress, but not limited to, the scanned image data after being subjected to image processing including a linear density conversion and a color space conversion. In addition, the image processing function may be provided between the image compression/extension unit 218 and the scanner 94A or the printer 94B. Further, the image compression/extension unit 218 may be provided within the scanner 94A or the printer 94B.

Figure 20:
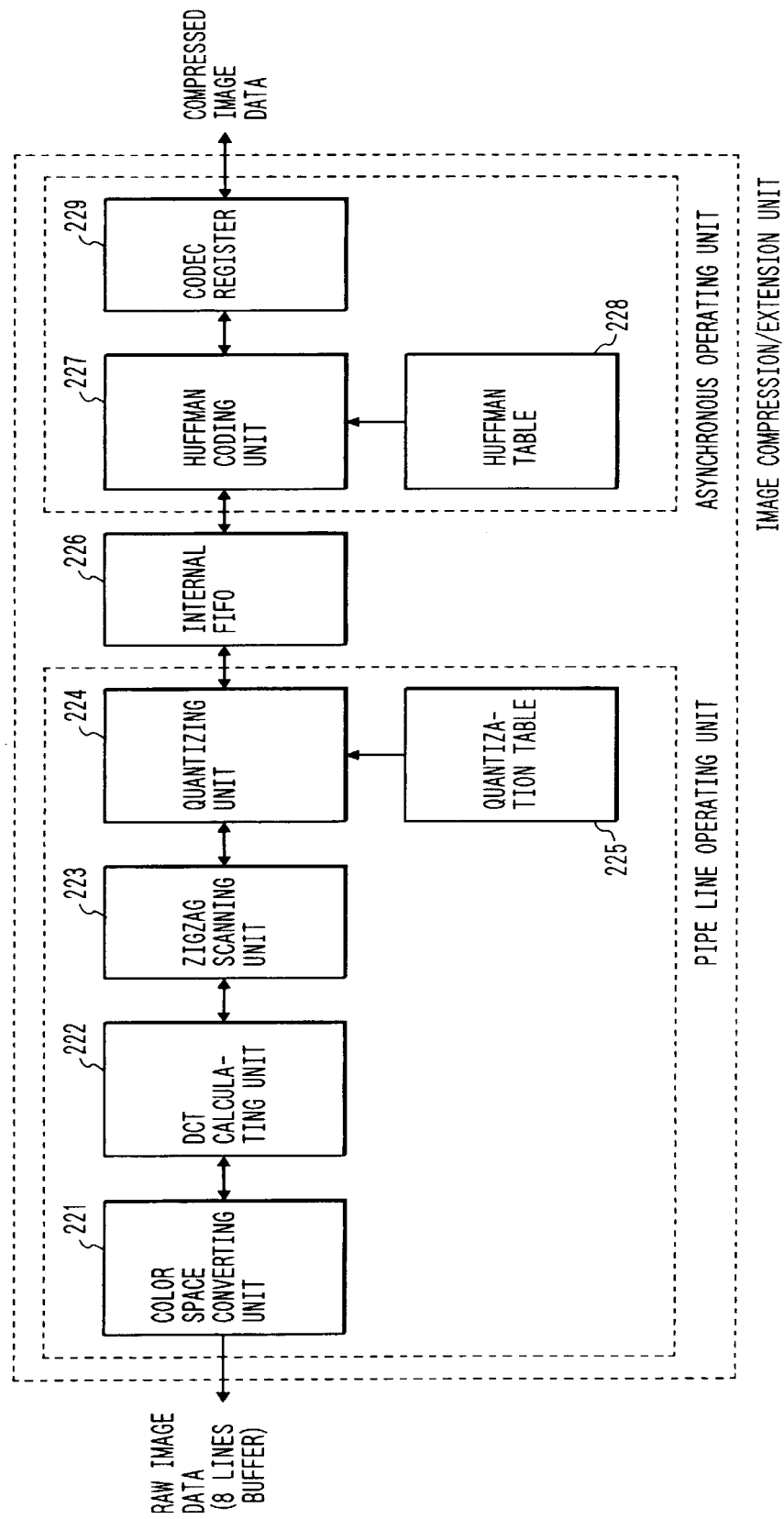
FIG. 20 is a block diagram showing an exemplified structure of a real time compression/extension unit shown in FIG. 19.
Figure 21B:
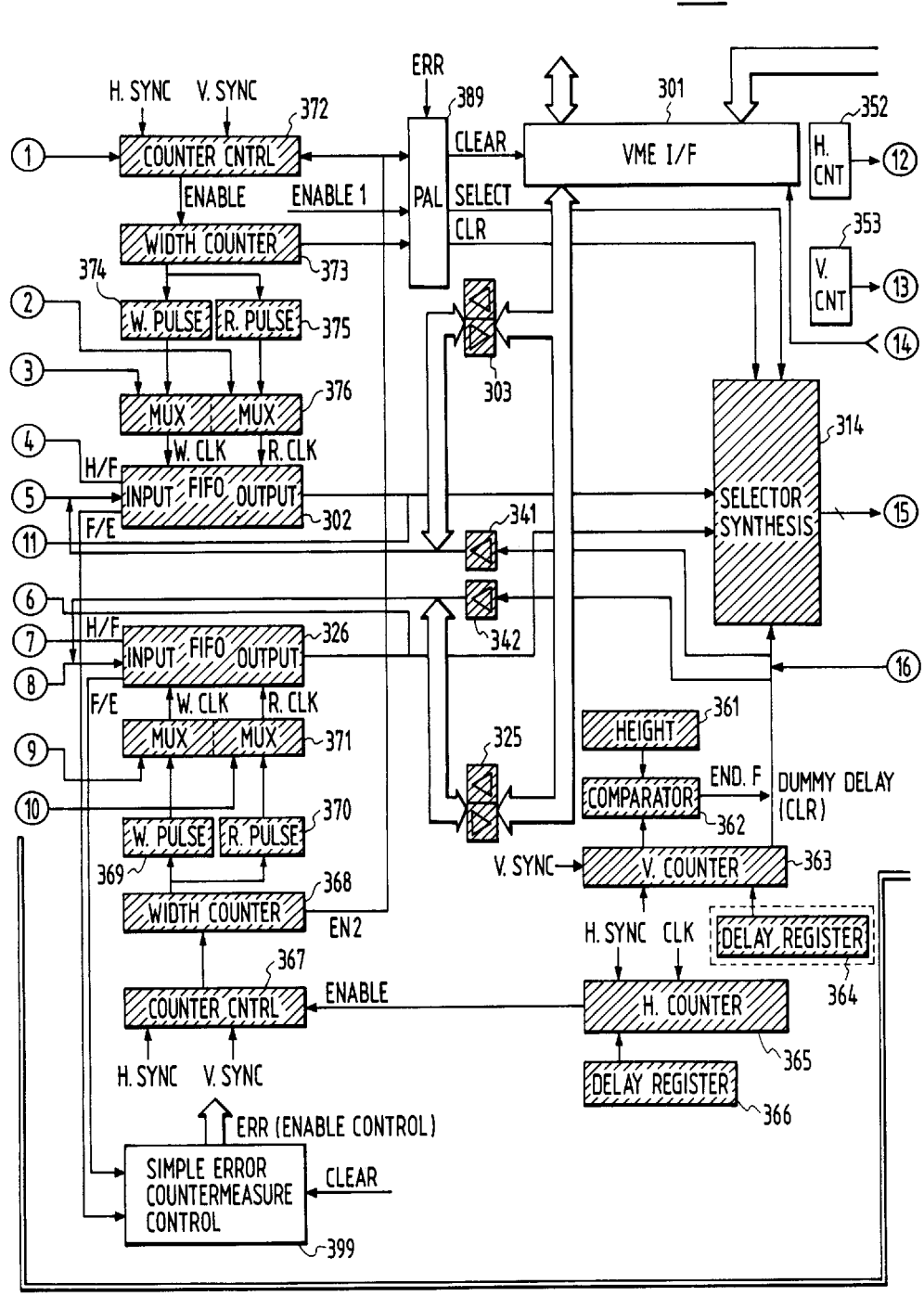

Referring to FIG. 20, the real time compression/extension unit 218 is described in detail regarding to the structure and operation thereof.

FIG. 20 is a block diagram showing an exemplified detailed structure of the real time compression/extension unit 218 shown in FIG. 19. In this embodiment, the ADCT compression technique is used as the method of compression and extension.

Upon compressing the data, the raw image data is first stored in the external line buffer 219 and then supplied to a color space converting unit 221. The color space converting unit 221 converts the RGB image into a color space consisting of a luminance component (Y) and chrominance components (Cr and Cb) are obtained. As a case may be, the chrominance components Cr and Cb are subjected to subsampling to reduce redundancy of the image. Subsequently, a discrete cosine transform (DCT) calculating unit 222 converts the color space into a frequency space by each 8×8 pixels. A DCT factor is scanned by a zigzag scanning unit 223 and is quantized by a quantizing unit 224. A factor of quantization is stored in a quantization table 225. This factor corresponds to 8×8 of the DCT factor. The compressed image data is then stored temporarily in an internal FIFO memory 226 and is coded at a desired timing by a Huffman coding unit 227 looking up a Huffman table 228. The resultant compressed data is stored in values into a CODEC register 229 that can be accessed from an external host computer or the like.

The color space converting unit 221, the DCT calculating unit 222, the zigzag scanning unit 223, the quantizing unit 224 and the quantization table 225 serve as a pipeline operating unit. The pipeline operating unit operates at a high speed in synchronism with a clock for generating a timing. In addition, the Huffman coding unit 227, the Huffman table 228 and the CODEC register 229 act as an asynchronous operating unit. The asynchronous operating unit is so constructed as to operate in synchronism with access to the CODEC register 229 by an external CPU. The asynchronous operating unit is compatible with the CPU and the DMA in operating speed though the asynchronous operating unit is operated at a relatively slow speed. The pipeline operating unit is so constructed as to be operated at a high speed, following or synchronizing with an image transferring clock of the scanner 94A and the printer 94B. The internal FIFO memory 226 is thus provided for "buffering" the difference in speed between the synchronous pipeline operating unit and the asynchronous operating unit.

Reduction of the compression rate for improving the quality of the resultant image increases the amount of compressed data and increases the amount of operation to be carried out by the asynchronous operating unit. As a result, the processing speed of the asynchronous operating unit becomes slower than that of the pipeline operating unit. The interface of the color space converting unit 221 for the raw image data can be connected to a periphery other than the scanner 94A and the printer 94B. An asynchronous access may be accepted from the CPU with another FIFO memory provided externally. In such a case, the pipeline operating unit may be operated at a low speed or even stopped temporarily, which will be a solution to the problem of the speed.

In this embodiment, two or more image compression/extension units may be provided for dividing the raw image data into a plurality of data units. The data units are supplied to the respective image compression/extension units. This makes it possible to connect the image compression/extension units to the printer or the scanner operable at a high speed. The divided image data being compressed cause no problem of the speed upon being extended.

The sequence of compression procedures is basically reversed on extension. As shown in FIG. 20, the compressed image data is first passed to the CODEC register 229 and then reverse Huffman coded (i.e., decoded) in the Huffman coding unit 227 by looking up the Huffman table 228. The decoded data is temporarily stored in the internal FIFO memory 226 and supplied therefrom to the quantizing unit 224. The quantizing unit 224 dequantizing the received data. This is achieved by means of multiplying an eight-by-eight quantization factor stored in the quantization table 225. The quantized data is subjected to zigzag scan in the zigzag scanning unit 223 and then supplied to the DCT calculating unit 222 as the DCT factor. The color space converting unit 221 converts the Y, Cr and Cb components into the original R, G and B components.

The DCT calculating unit 222 can be used both for the DCT calculation and the reverse DCT calculation only by means of changing parameters for calculation. Likewise, the color space converting unit 221 may be used for the two purposes by means of changing the parameters when the conversion is based on a one-dimensional linear conversion.

In addition, the quantizing unit 224 can be used commonly for the quantization and the dequantization. The quantization is based on a multiplication while the dequantization is based on a division. However, the division can be considered as the multiplication because to multiply an inverse number of the divisor is equivalent to divide by the divisor. Thus, the quantization and the dequantization can be achieved in the single quantizing unit 224.

Figure 21C:
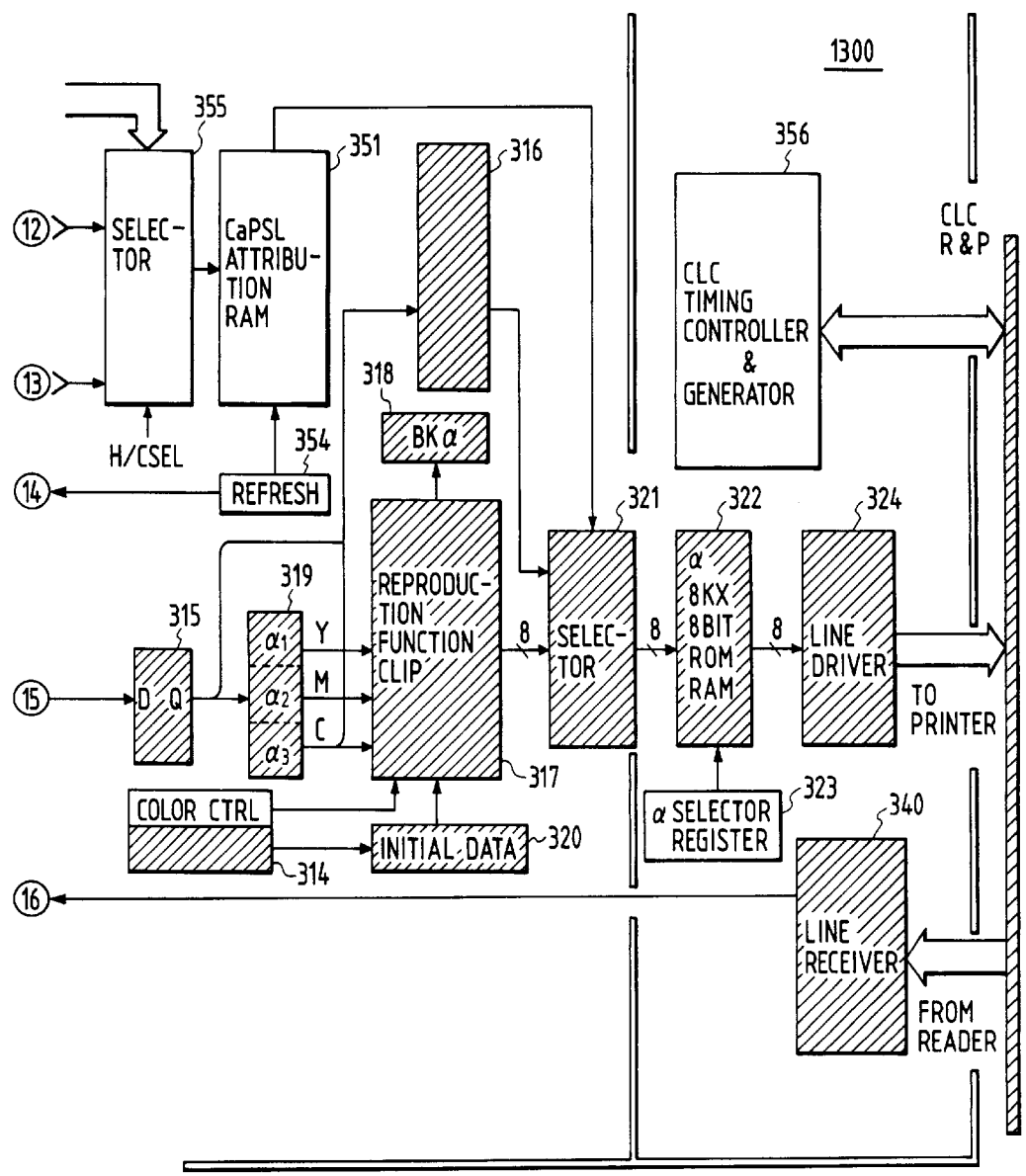

Each mode of operation of the first S/P interface circuit 4-1 is described with reference to FIGS. 21A-1 through 21C together with the detailed structure thereof.

The scanner/printer 94 can be adapted to scan and print images on an original of A3 size at maximum. However, the first S/P interface circuit 4-1 divides the image data of A3 size into two data units of A4 size and processes these data units separately. This improves the throughput of the scanner/printer 94 because a subsequent page can be processed before completion of processing of a previous page.

First and third modes of operation are described now. A right half of the image data of A3 size is processed using the CPU 101 of the main board 11 shown in FIG. 9. The image data (A4 size) is supplied from a VME interface 301 to a FIFO memory 302 through a buffer 303. The FIFO memory 302 supplies the data through a buffer 304 to a static random-access memory (SRAM) 305. The SRAM temporarily stores this data. The operation of the SRAM 305 is in synchronism with that of the pipeline operating unit of the image compression/extension unit. When the SRAM 305 is provided with data for eight lines in the vertical direction of the image, an image compression/extension unit 306 reads the data by vertical eight-by-eight units out of the SRAM 305. The read compressed data are successively written in a DRAM 308 through a DMA controller 307. The DMA controller 307 generates addresses by means of operating an address counter 309. The generated addresses are supplied to the DRAM 308 through a selector 310 with being counted. In the third mode of operation, these addresses are supplied by the CPU 101 of the main board 11 through the VME interface 301 and the selector 310. Further, the data in the DRAM 308 is updated through an interface converting unit 312. As a result, it becomes possible to transmit the compressed data directly to the DRAM 308 while it is also possible to transmit a normal compressed data that is not divided into right and left halves. The compressed data should be compressed at such the compression rate as the DRAM 308 being allowed to store the data of one page of A3 size.

The DRAM 308 is refreshed by a refresh circuit 313 to maintain the data stored therein. To supply the data stored in the DRAM 308 to the printer 94B, the DMA controller 307 reads the data out of the DRAM 308 and supplies the same to the compression/extension unit 306. Either the left half or the right half of the output data of the FIFO memory 302 is selected by a selector and supplied to a latch 315.

The data is then gamma-converted or logarithmically converted by a gamma conversion unit 319. A masking circuit 316 masks the data for computer graphics while a masking circuit 317 masks the data for a natural image. A selector 321 is used for selecting either one of the computer graphic and the natural image depending on the type of the image. The selected one is adjusted by an output gamma adjusting unit 322 and supplied to the printer 94B through a line driver 324. The gamma adjusting unit 322 adjusted in its characteristic by a gamma setting register 323. In addition, the masking circuit 316 is formed of the ROM while the masking circuit 317 is logic to which a black generating table 318 is connected. A timing controller 314 is connected to the peripheries to ensure an initial loading of the values in an initial value data ROM 320. If the printer 94B produces the image in order of planes, the extension is repeated. In this event, the number of extension cycles is equal to the number of the planes (color components). The masking circuits 316 and 317 carry out masking processing depending on the output color.

The right half of the A3 original is processed in the manner described above and the similar operation is repeated for the left half of the original. More particularly, an eight line image data stored in a static RAM 328 through a buffer 325, a FIFO memory 326 and buffer 327 is compressed in an image compression/extension unit 329. The compressed data is written in a DRAM 322 by means of controlling a DMA controller 331, an address controller 335 and a selector 334. In this event, the CPU 101 of the main board 11 may write in the DRAM 322 the compressed data directly from the VME interface through a selector 334 and an interface 330. A refresh circuit 333 refreshes the DRAM 322. Upon printing an image, the data read out of the DRAM 322 is extended by the image compression/extension unit 329 under control of the DMA controller 331. The extended data is supplied to the selector 314 through the SRAM 328, the buffer 327 and FIFO memory 326. The rest is similar to those described above. The first and the third modes of operation are carried out in this way.

Next, the second and the fourth modes of operation is described.

The image data supplied from the scanner 94A after being subjected to a certain processing is received by a line receiver 340. Buffers 341 and 342 take the right and left halves, respectively, of the image and store them in the FIFO memories 303 and 326, respectively. The other operation is similar to those described in conjunction with the first and the third modes of operation. More particularly, for the right half of the image, the image data stored in the FIFO memory 302 is read out of it by eight lines and supplied to the SRAM 305 through the buffer 304. The image compression/extension unit 306 then compresses the image and supplies the compressed image to the DRAM 308.

On the other hand, in the fourth mode of operation, the CPU 101 of the main board 11 is allowed to write data in the DRAM 308 directly through the VME interface 301 and the interface conversion unit 312. However, the compressed data is extended before being passed to the CPU 101 of the main board 11 in the second mode of operation. The compressed image data read out of the 308 in written order under control of the interface conversion unit 312, the DMA controller 307, the address counter 309 and the selector 310. The read data is written in the SRAM 305 by 8×8 unit. At the time when all data of eight lines are written in the SRAM 305, the written data are continuously read out of the SRAM 305 in the direction of a horizontal line. The read data is written in the FIFO memory 302. The data stored in the FIFO memory 302 is read out of it and supplied as the raw image data to the CPU 101 of the main board 11 through the buffer 303 and the VME interface 301 according to a timing of the CPU 101 of the main board 11.

The selector 321 selects either one of the masking circuits 316 and 317 depending on whether a RAM 351 stores a computer graphic or a natural image. A horizontal counter 352 and a vertical counter 353 generate addresses of the processed pixel. These addresses are supplied to the RAM 351 through a selector 355. The selector 321 is controlled according to the data read out of the RAM 351. Attributes are previously written in the RAM 351 by the CPU 101 of the main board 11 through the VME interface 301 and the selector 351. In addition, an interface between the scanner 94A and the printer 94B is controlled by an S/P timing controller 356.

Next, described is how to control switching between two planes of the image.

A vertical counter 363 produces an image valid signal for a valid component of the image in the vertical direction. A delay register 364 is used for setting a top margin of the image. A height register 361 sets a valid height of the image. A comparator 362 compares the actual height of the image with the preset valid height. If the actual height is smaller than the valid height, then the image valid signal is supplied to each unit. A delay register 366 is provided for setting right and left margins of the image in addition to an image valid section. The delay register 366 produces a valid signal when a left edge is reached. A counter controller unit 367 activates a horizontal left width counter 368 in response to the valid signal. The horizontal left width counter 368 functions as a down counter to count the number corresponding to the width. During counting operation, the horizontal left width counter 368 produces an enable signal for the left side of the image. After completion of processing of the left side, the horizontal left width counter 368 supplies an enable signal to a counter controller unit 372. The counter controller unit 372 counts the width by using a width counter 373 for the right side of the image. When the counting operation is ended, this state is notified to a control unit 389. The control unit 389 notifies the selector 314 that there is no image valid width left and clears the output. Upon compressing the image, a write pulse generator 369 generates write pulses in response to the counting result in the width counter 368 within the valid width of the left side of the image. The scanned data regarding to the left side is written into the FIFO memory 326 through a multiplexer 371. The FIFO memory 326 is provided with read pulses of the image compression/extension unit 329 through a gate 381 and the multiplexer 371.

On the other hand, upon extending the image, a read pulse generator 370 receives the left side valid signal supplied from the width counter 368. It is then supplied to the printer 94B through the multiplexer 371 and the FIFO memory 326.

The FIFO memory 326 is also provided with write pulses of the image compression/extension unit 329 through the gate 381 and the multiplexer 371. An extension data is written in the FIFO memory 326 as well.

For the right side of the image, similar operation is carried out to those described above. A write pulse generator 374, a read pulse generator 375, a multiplexer 376 and a gate 382 are similar in operation to the write pulse generator 369, the read pulse generator 370, the multiplexer 371 and the gate 381. The image compression/extension unit 329 notifies a start/stop logic 386 of a state of the internal FIFO memory 302. In addition, a state of a register 385 for detecting peripheral states is also notified to the start/stop logic 386. Further, the start/stop logic is notified of a state of the external FIFO memory 326 through a FIFO controller unit 383. The internal FIFO memory 302 and the external FIFO memory 326 are so controlled as to avoid overflow or underflow thereof by the start/stop logic 386. The start/stop logic 386 is capable of stopping and starting the operation of the pipeline portion of the image compression/extension unit 329 depending on the state of the FIFOs 302 and 326.

Likewise, the operation of the pipeline portion of the image compression/extension unit 306 is stopped or started under control of a state register 387, the start/stop logic 386 and a FIFO controller unit 384. The start/stop processing may be carried out when the internal FIFO memory 302 is going to be overflown because the operation of the pipeline portion during compression of the image is carried out at an excessively high speed; when the internal FIFO memory 302 is going to be underflown because the operation of the pipeline portion during extension of the image is carried out at an excessively high speed; when the external FIFO memory 326 is going to be overflown because the operation of the image compression/extension unit during compression of the image is carried out at an excessively high speed; or when the external FIFO memory 326 is going to be underflown because the operation of the image compression/extension unit 306 during extension of the image is carried out at an excessively high speed.

The external FIFO memory 326 and the internal FIFO memory 302 may be overflown or underflown if the processing speed of the printer 94B is too much faster than that of the image compression/extension unit 306. To overcome this problem, an error countermeasuring unit 399 is provided to temporarily interrupt an image signal at the side of the scanner 94A or the printer 94B. A simple error countermeasuring operation is carried out by means of discarding the image signal by one line as a unit in the scanner 94A and producing a space by one line as a unit in the printer 94B. In this way, the error countermeasuring unit 399 prevents the FIFO memories from being overflown or underflown, interrupting a flow of the image signal. The error countermeasuring unit 399 supplies error information to a control unit 389. The control unit 389 detects the space corresponding to one line, the left and right valid regions. The control unit 389 supplies an error skip signal to the error countermeasuring unit 399 at a boundary of one line. In addition, the control unit 389 controls each unit to clear the input and output data supplied to and from the scanner 94A and the printer 94B when an error is caused. It is noted that the compression or extension is continuously made until the boundary of one horizontal line is reached during error countermeasuring operation in spite that the processing speed of the image compression/extension unit 306 is by far slower than that of the scanner 94A or the printer 94B. This results in error skip and restoration of the discarded signal. When the error countermeasuring operation is carried out during compression of the image, the space or the white line is also compressed to buy compression speed. On the other hand, to carry out error countermeasuring operation during extension of the image requires to discard a portion of the image data that cannot be supplied to the printer 94B due to the slow operating speed of the image compression/extension unit 306.

In this embodiment, the first S/P interface circuit 4-1 comprises an internal CPU 392 that shares processing with the CPU 101 of the main board 11. The first S/P interface circuit 4-1 also comprises a dual-ported random-access memory (DPRAM) 393. One of two ports of the DPRAM is connected to the CPU 101 of the main board 11 through the VME bus interface 301. The other port is connected to the CPU 392 through an internal CPU bus. The CPU 101 of the main board 11 and the internal CPU 392 are provided with information through this DPRAM 393.

The DPRAM 393 thus contributes to avoid interruption, on the VME bus, between accesses from the CPUs 101 and 392. A bus conversion unit 394 is connected to the internal bus of the CPU 392 and interfaces the image compression/extension units 306 and 329. The bus conversion unit 394 is similar in function to the interface conversion units 312 and 330. The bus conversion unit 394 interfaced between various registers in the board through a register interface 395, serving as an interface for the VME bus.

The internal CPU bus is connected to a serial communication unit 390 and a ROM 391 for storing programs for the CPU 392. The serial communication unit 390 is provided with commands for controlling operation of the scanner 94A and the printer 94B. In other words, the CPU 101 of the main board 11 shown in FIG. 9 controls the scanner 94A and the printer 94B either directly or through the internal CPU 392. The commands for controlling includes execution commands, state detection commands and state setting commands. The execution command may be the one for operating the scanner 94A and the printer 94B. The state detection commands are for detecting various states expected to be caused during operation of the system including commands for detection of: presence/absence of the paper in the printer 94B; presence/absence of a cassette therein; a paper size; an amount of toner left therein; and paper jamming. Detection of the currently set modes of operation can also be made using the state detection commands. For example, detected may be the color (monochrome/3 colors/4 colors), the resolution and any other image processing parameters. For the scanner 94A, presence/absence of an original on a platen or burning out of the exposure lamp can be detected.

The state setting commands regarding to the printer 94B may be for setting, for example, the cassette to be used, the mode of operation, the number of copies to be printed and other parameters for the image processing systems. The state setting commands regarding to the scanner 94A may be for setting, for example, a variable power ratio, bilevel/multilevel, a normal color space conversion, a unique color space conversion, a linear density (resolution conversion), a region designation and gamma conversion.

In this embodiment, the scanner 94A has many image processing functions, so that the first S/P interface circuit 4-1 compresses the image rather than processing it. In addition, the first S/P interface circuit 4-1 receives the RGB data from the scanner 94A. On the other hand, an input of the printer 94B is adapted to accept a CMYK (C=cyan, M=magenta, Y=yellow and K=black) signal. The printer 94B has less image processing function, so that the masking operation, gamma conversion, the LOG conversion and CMYK production is carried out by the first S/P interface circuit 4-1.

Description is made in conjunction with image data processing carried out by the scanner 94A and the printer 94B.

In this embodiment, a color image scanner/printer is provided by means of integrally arranging the scanner 94A and the printer 94B. Accordingly, only one system having image processing functions is required for the integrated color image scanner/printer. If the scanner 94A is separated from the printer 94B, a given processing can be achieved by either one of them. In addition, most of the image processing functions are performed by the scanner 94A such as the variable power, the region designation, the color space conversion, the gamma conversion and the color masking processing.

The scanner 94A comprises a color space converting unit and a color masking processing unit. The scanner 94A comprises a normal RGB (RGB of NTSC) as an input of the video interface. The RGB data are supplied to the scanner 94A in order of dots or in parallel. On the other hand, the printer 94B has no image processing unit, so that the data should be given in the form of CMYK data. The RGB components are converted into the CMY components externally. A black (K) component is also produced in external units. The video interface should be provided with the data after being subjected to, externally, the color masking processing and, if necessary, other image processing including the resolution conversion and trimming. In this event, the same operation must be repeated four times in order of planes for each of the C, M, Y and K components. The image could be transmitted only after completion of this four-cycle operation. In addition, it is impossible to interrupt the operation of the scanner/printer.

The video interface is also provided with a horizontal synchronous signal, a vertical synchronous signal and a video clock signal to ensure synchronization with the video data. The video interface has status information indicating, for example, ON/OFF of the power of the scanner/printer, which can be confirmed from outside. In addition, the video interface has a function to interface commands through a serial communication with which the video interface is capable of detecting and setting the states of the scanner 94A and the printer 94B as well as issuing the execution commands upon starting up the scanner 94A and the printer 94B.

5. A Second S/P Interface Circuit of the S/P Server

Figure 22:
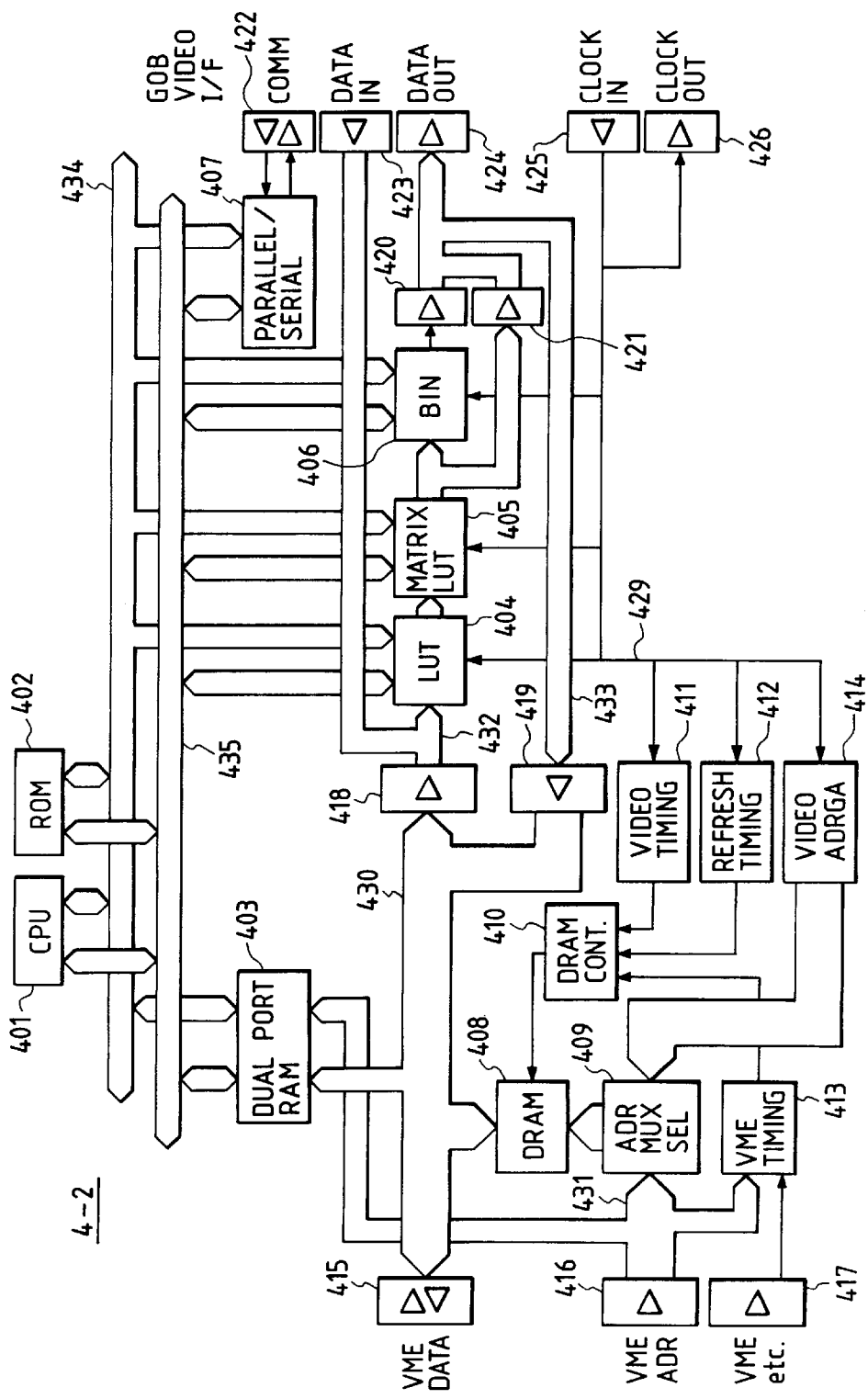
FIG. 22 is a circuit block diagram illustrating a detailed structure of a second S/P interface circuit shown in FIG. 3.

FIG. 22 is a block diagram illustrating a detailed structure of the second S/P interface circuit 4-2 shown in FIG. 3. The second S/P interface circuit 4-2 interfaces data processing between the scanner/printer 95 (a printer 95B and a scanner 95A) of the ink-jet type and the S/P server SP1. This second S/P interface circuit 4-2 is formed as an interface board.

In FIG. 22, a CPU 401 is connected to a VME bus. A DPRAM 403 is also connected to the VME bus. The CPU 401 receives command through the DPRAM 403 from the main board 11 connected to the VME bus and interprets the received commands to control the second S/P interface circuit 4-2. The CPU 401 generates, upon the elapse of a specified time (2 milliseconds in this embodiment), an interruption signal by using an interval timer implemented therein. The CPU 401 is allocated to the task of transmitting and receiving the commands to and from the ink-jet printer 95B and the scanner 95A. In addition, the CPU 401 initiates and modifies various parameters for image processing circuit units 404, 405 and 406.

A ROM 402 is provided for storing programs including a control program (such as a program for supporting the device driver 86) carried out by the CPU 401. The ROM 402 also stores initial values and preset values of the image processing circuit units 404, 405 and 406.

The DPRAM 403 functions as a work-area of the CPU 401 and serves to establish communication between the CPU 101 of the main board 11 and the CPU 401 connected to each other through the VME bus.

The image processing circuit unit 404 is formed as an application-specific integrated circuit (ASIC) for image processing. The image processing circuit unit 404 enables to carrying out gradation conversion by using a look-up table. For example, the image processing circuit unit 404 carries out the LOG conversion to convert the RGB data into the CMYK data. This is achieved by means of previously preparing a conversion table and storing the table in the ROM 402, thereby looking up the conversion table while transferring the contents thereof to the RAM in the image processing circuit unit 404.

The image processing circuit unit 405 is also formed as the ASIC for image processing. The image processing circuit unit 405 enables to carrying out a four-by-five matrix calculation and gradation conversion using the look-up table. This matrix calculation is used for NTSC-RGB color space conversion as the RGB space and the standard color space of the sensor characteristic of the scanner 95A. The matrix calculation is also used for conversion from the CMY(K) data already converted by the image processing circuit unit 404 into a CMYK data suitable for the characteristic of the printer 95B. The latter one is referred to as the masking. In addition, the image processing circuit unit 405 is capable of adjusting the color balance by using the look-up table. These operations can be achieved by means of previously creating tables as in the case of the image processing circuit unit 404. The tables are stored in the ROM and selected/used depending on the applications.

The image processing circuit unit 406 is formed as the ASIC for image processing and renders the data binary. In this embodiment, a thresholding is used as the algorithm to obtain a binary image. A parallel-to-serial converting unit 407 converts a parallel data of eight bits, supplied from the CPU 401, into a serial data for communicating with the scanner 95A and the printer 95B. A DRAM 408 for storing image is suitable for the band format adapted to the number of the pixels in a head of the printer 95B. A data passes through the scanner 95A or the printer 95B in response to clock signals during each cycle of scanning and it is thus impossible to interrupt the operation thereof, so that the buffering of the data of one band is required. With this respect, the DRAM 408 is so constructed as to buffer the image data of one band to be scanned by the scanner 95A or printed by the printer 95B. In addition, the RAM 408 is used for converting the scanning formats, i.e., converting from accesses made in the raster format from the VME bus into accesses in the vertical direction made by the scanner 95A (printer 95B) or vise versa.

An address selector to the DRAM or a multiplexer 409 can access the DRAM 408 through either the VME bus or the scanner 95A (printer 95B). The multiplexer 409 thus switches the address therefrom. In addition, the address for the DRAM 408 is supplied thereto with being divided into a ROW address and a COLUMN address, so that the multiplexer 409 multiplexes these divided addresses.

A timing controller 410 for the DRAM 408 produces various control signals for controlling the DRAM 408. For example, the timing controller produces row address strobe (RAS), column address strobe (CAS) and a write enable (WE) signal. A timing circuit 411 generates a timing signal for accessing the scanner 95A and the printer 95B. In other words, the timing circuit 411 regulates the timing of access according to image clocks and synchronization signals supplied from the scanner 95A and the printer 95B. A refresh timing control unit 412 regulates the timing of refresh of the DRAM 408. The refresh timing control unit 412 performs control operation to avoid interference between accesses to the scanner 95A and to the printer 95B.

A VME timing control unit 413 processes a control signal that is used for accessing the DRAM 408 from the VME bus. More particularly, the VME bus decodes AM codes, decodes the addresses of the high order or carries out an interruption operation. An access address generating unit 414 generates addresses for accessing the scanner 95A and the printer 95B. The scanner 95A and the printer 95B cannot be accessed by a normal rasterization. Accordingly, the access address generating unit 414 is required to generate unique and specific addresses for accessing the scanner 95A and the printer 95B through the VME bus. These addresses can be obtained by means of changing the page orientation of the scan from portrait (vertical) to landscape (horizontal) or vice versa.

VME bus interface data buffers 415 and 416 provided for access. The VME bus interface data buffer 415 accesses the image data in 32 bits and commands in 8 bits while the VME bus interface data buffer 416 accesses the image data in 16-bit address space and the commands in 16-bit address space. A reference numeral 417 represents a buffer for accessing data and addresses other than those for the VME bus interface.

An entrance buffer 418 communicates with the input of the image processing unit. The entrance buffer 418 allows an access to the DRAM through the VME buffer with the data of 32 bits. However, the image processing unit carries out its operation with the data of 8 bits. With this respect, the RGBX data of 32 bits is converted into serial data of 8 bits in sequence of R, G, B and X. An exit buffer 419 communicated with the output of the image processing unit. The exit buffer 419 takes together the color-order data line of 8 bits for each and forms into the data of 32 bits. A post-binary buffer 420 stores the binary data obtained by the image processing circuit unit 406. It is noted that the data obtained as a result of rendering the data binary is represented by one bit. Accordingly, the post-binary buffer 420 extends one bit into eight bits. For example, the post-binary buffer 420 extends "0" into "0x00" and "1" into "0xFF", where "0x" represent a hexadecimal.

A buffer 421 is used in a case of bypassing the operation to render the data binary carried out by the image processing circuit unit 406. Either one of the outputs of the buffers 420 and 421 is selected to change between the bilevel and the multilevel. A reference numeral 422 represents a buffer for a communication unit of the interfaces of the scanner 95A and the printer 95B. A reference numeral 423 represents a buffer for input data to the interfaces of the scanner 95A and the printer 95B. A reference numeral 424 represents a buffer for output data of the interfaces of the scanner 95A and the printer 95B. A reference numeral 425 represents an input buffer for clock and control signals of the interfaces of the scanner 95A and the printer 95B. A reference numeral 426 represents an output buffer for the clock and control signals of the interfaces of the scanner 95A and the printer 95B. A reference numeral 429 represents a clock input line.

Reference numerals 430, 432 and 433 represent image data buses of 32 bits, 8 bits and 8 bits, respectively, while reference numeral 431 represents an address bus of 24 bits. Reference numerals 434 and 435 represent a local address bus of 16 bits and a local data bus of 8 bits. Printing operation of the printer 95B is now described.

Operation upon Printing

Parameters required for printing operation are written in the DPRAM 403 from the main board 11 through the VME bus. The CPU 401 reads these parameters out of the DPRAM 403 and interprets them to carry out control operation. For example, to print an image represented by the RGB data, the CPU 401 sets a table having a characteristic that will not change the LUT data of the image processing circuit unit 404. The CPU 401 then sets a coefficient for use in converting the NTSC-RGB into BJ-RGB (printer's RGB) in the coefficient table of the matrix of the image processing circuit unit 405. In addition, the CPU 401 controls gates of the buffers 420 and 421 to pass through the rendering operation, which otherwise is carried out by the image processing circuit unit 406.

The CPU 401 sets various parameters such as the size of the data. These parameters are supplied to the printer 95B through the parallel-to-serial conversion unit 407. Next, the image data of one band is transferred from the main board 11 to the memory 408 through the VME bus. This image data is stored in the memory 408 in the form of RGBX as a result of the 32-bit access from the VME bus. R, G and B represents color components of the image data, i.e., red, green and blue while B represents a control data including the information for generating a black component. The commands for printing are given through the DPRAM 403. The CPU 401 notifies the printer 95B of an indication to start printing operation. In response to a return of the start signal from the printer control unit in the printer 95B, access to the memory 408 is started by using the timing generating unit 411. In this event, the data is read out of the memory 408 in the direction along the ink-jet of the printer 95B. To read the data is carried out according to the addresses generated by the address generating unit 414. The data read out of the memory 408 are converted into data of 8 bits in sequence of R, G, B and X. The converted data is supplied to the image processing unit. The image processing unit processes the image by using the predetermined parameters. The NTSC-RGB data is converted into the RGB color space used in the printer 95B. The color space data is supplied to the printer 95B through the buffer 421 and the interface 424. After completion of the data processing for one band, the data of the subsequent band is received through the VME bus and the above mentioned operation is repeated. When the number of repetitions reaches to a predetermined value, this state corresponds to completion of processing of the data for one page. It is described now how to scan the image on the original using the scanner 95A by means of the control programs stored in the ROM 402.

Operation upon scanning

Parameters required for scanning operation are written in the DPRAM 403 from the main board 11 through the VME bus. The CPU 401 reads these parameters out of the DPRAM 403 and interprets them to carry out control operation. For example, when the scanner 95B is subjected to scanning of an RGB bitmap image of 1024×1024 pixels, starting from the point represented by 512×512, the CPU 401 sets a table having a characteristic that will not change the LUT data of the image processing circuit unit 404. The CPU 401 then sets a coefficient for use in converting the BJ-RGB into the NTSC-RGB in the coefficient table of the matrix of the image processing circuit unit 405. In addition, the CPU 401 controls gates of the buffers 420 and 421 to pass through the operation to render the data binary, which otherwise is carried out by the image processing circuit unit 406. The CPU 401 sets the size of the scanned image to 1024×1024 and sets the starting position to 512×512. These parameters are supplied to the scanner 95A through the parallel-to-serial conversion unit 407. The CPU 401 then notifies the scanner 95A of a command for starting the scanning operation. The image data obtained through a scanner reading portion of the scanner 95A is supplied to the image processing circuit units 404, 405 and 406 through the interface 423. These image processing circuit units carry out the image processing by using the predetermined parameters. The processed image is stored in the memory 408 as the data in the 32-bit RGBX format through the buffer 419. The memory 408 thus stores the data of RGBX. However, the scanner 95A scans in this embodiment the image consisting of R, G and B components, so that X is considered to be a useless data. Each of the R, G and B components is bilevel but only one byte is assigned per pixel. To convert this one-byte-one-pixel data into a normal data required for the bitmap image, a package may be formed with eight pixels represented by one byte. The R, G and B components may then be arranged in raster-line order. Such an operation may be carried out by the main board 11. The image data of one band is transferred from the main board 11 to the memory 408 through the VME bus. The above mentioned operation is repeated and when the number of repetitions reaches to a predetermined value, this state corresponds to completion of processing of the data for one page.

6. Entire Operation of the S/P Server 6-1 Entire Operational Flow

An entire operation of the system according to the present invention is described more in detail especially in view of the whole system control program 93 (FIGS. 2A and 2B).

Figure 23:
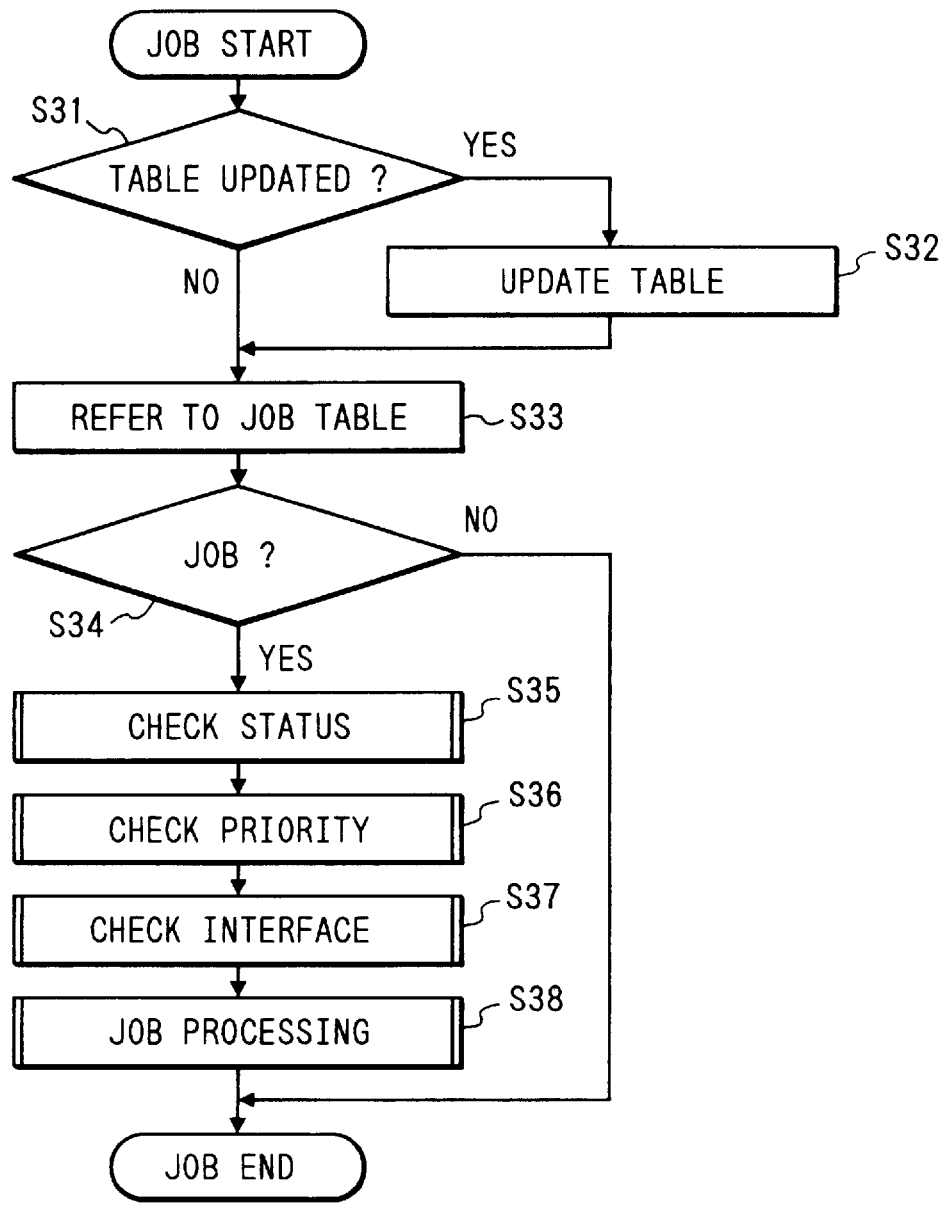
FIGS. 23 through 29 are flow charts illustrating various steps of a whole system control program controlling processing carried out by the S/P server according to the present invention.

The whole system control program 93 continuously monitors whether an event is occurred and carries out a routine shown in FIG. 23 when an event is occurred.

The whole system control program 93 can communicate with, in the network server SP1, the TCP/IP program 82, the communication program 83, the PDL interpreter program 84, the scanner control program 85 and the device driver 86. The whole system control program 93 receives various events from these programs. For example, the whole system control program 93 receives, from the communication program 83, events indicating arrival of a job and end of data transmission. The PDL interpreter program 84 supplies to the whole system control program 93 events indicating end of received data processing, end of image data plotting, end of page plotting and end of printing job. The scanner control program 85 supplies to the whole system control program 93 events indicating request for image data transference, end of image input processing, end of page printing and indicating the error or normal state such as paper runout, ink runout, paper jamming and power off.

FIG. 23 is a flow chart illustrating an example of steps of a job execution processing carried out by the S/P server according to the present invention.

This control flow is carried out when no event is supplied to the whole system control program 93 and a predetermined time is elapsed during idling state of the system. If no job is contained in a job table, the system goes back to the idling state.

The control enters this routine from step S31 when an event indicating arrival of a job is supplied from the communication program 83, when an event indicating page end or document end is supplied either one of the PDL interpreter program 84 and the scanner control program 85, or when an event indicating an error is supplied from the device driver 86. The whole system control program 93 updates at step S32 jobs in the job table (described below in conjunction with FIGS. 33A through 33J). In this event, the whole system control program 93 may add or remove a job to or from the job table. To update the table when an error is caused is described later. At step S33, the whole system control program 93 looks up the job tables. Subsequently, the whole system control program 93 determines at step S34 whether there is a job. If there is no job to be executed, the whole system control program 93 returns to the idling state. On the other hand, if a job to be executed is present, the whole system control program 93 carries out step S35 to select a few candidates of the executable jobs. At step S36, the whole system control program 93 selects one job from the candidates according to the priority thereof. At step S37, the whole system control program 93 determines whether the interface for the selected one job is enabled. When the interface can be used for that job, the whole system control program 93 carries out the job at step S38 and ends the processing.

Figure 24:
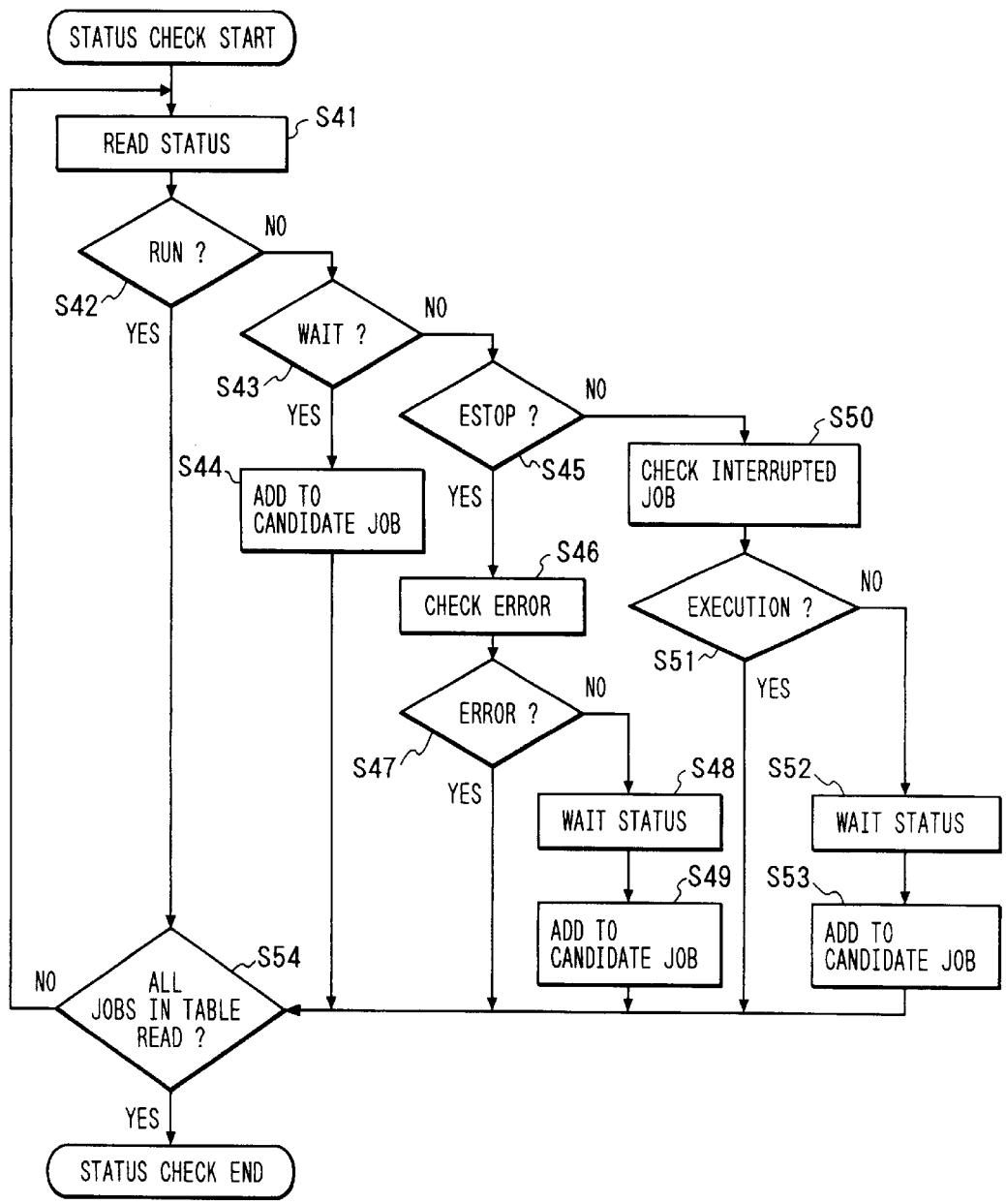

Referring to FIG. 24, description is made in conjunction with a status check processing operation carried out by the S/P server according to the present invention.

FIG. 24 is a flow chart illustrating an example of steps of a status check processing carried out by the S/P server according to the present invention.

First, at step S41, the whole system control program 93 reads the status of one job out of the job table. At step S42, the whole system control program 93 determines whether the status of the job in question is in RUN. If the step S42 is positive, step S54 is carried out to determine all jobs in the job table are read. If there is any job left, the whole system control program 93 returns to the step S41 to read the status of the remaining job. If the step S42 is negative, the whole system control program 93 carries out step S43 to determine whether the status of the job is in WAIT. If the step S43 is positive, then a subsequent step S44 is carried out to picks up this job as a candidate of an executable job. The step S44 succeeds to the step S54. If the step S43 is negative, the whole system control program 93 determines at step S45 whether the status of the job is in ESTOP. The status ESTOP of the job indicates that this job is interrupted due to an error. Accordingly, if the step S45 is positive, the whole system control program 93 checks at step S46 whether the error causing the interruption of the job is solved. At step S47, the whole system control program 93 determines whether the error state is continued yet. If the step S47 is positive, this job is not considered as the candidate of the executable job and the control proceeds the step S54. If the step S47 is negative because the error has already been solved, then the whole system control program 93 changes the status of the job in the job table from ESTOP to WAIT. Subsequently, the whole system control program 93 picks up this job at step S49 as the candidate of the executable job.

A negative result at the step S45 indicates that the job is in the STOP state with being interrupted by other job. Accordingly, the whole system control program 93 checks at step S50 the status of the interrupting job. Subsequently, the whole system control program 93 checks at step S51 whether the interrupting job is being executed. If the step S51 is affirmative, the whole system control program 93 proceeds the step S54 without picking up the interrupting job as the candidate of the executable job. On the other hand, if the step S51 is negative, the whole system control program 93 carries out step S52 to change the status of the interrupting job from STOP to WAIT. The whole system control program 93 then picks up the interrupting job, at step S53, as the candidate of the executable job. Finally, when all jobs are read out of the job table at the step S54, the whole system control program 93 escapes from this status check routine. In this way, a plurality of candidates of the executable jobs are selected.

Figure 25:
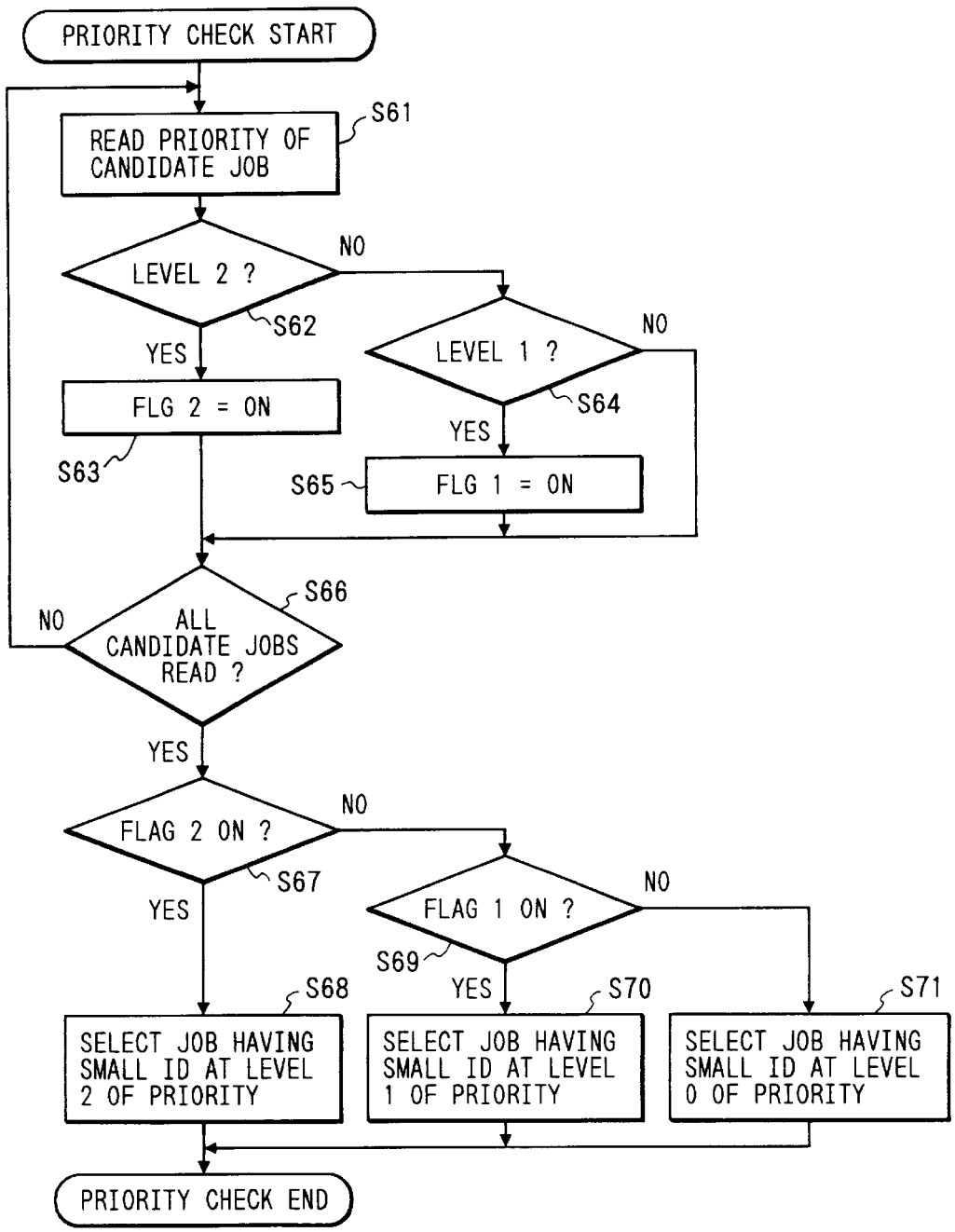

Referring to a flow chart shown in FIG. 25, described is a priority check processing operation carried out by the S/P server according to the present invention.

FIG. 25 is a flow chart illustrating an example of steps of a priority check processing operation carried out by the S/P server according to the present invention. In this embodiment, the whole system control program 93 narrows the candidates down to one job according to the priority thereof.

At step S61, the whole system control program 93 reads the priority of one of the jobs listed as the candidates of the executable jobs. At step S62, the whole system control program 93 determines whether the priority is labelled with LEVEL 2. If the step S62 is positive, the whole system control program 93 carries out step S63 to set a flag FLG 2 indicating presence of the job in the LEVEL 2. If the step S62 is negative, step S64 is carried out to determine whether the priority of the job is labelled with LEVEL 1. If the step S64 is positive, step S65 is carried out. At the step S65, the whole system control program 93 sets a flag FLG 1 indicating presence of the job in the LEVEL 1. If the step S64 is negative, the whole system control program 93 determines that the priority of the job in question is labelled with LEVEL 0. In other words, the LEVEL 0 corresponds to where no flag is set.

When the priority of one job is determined, the whole system control program 93 determines whether all jobs are checked. If not, the control returns to the step S61 to determine the priority of the subsequent job. When all jobs are checked, the whole system control program 93 carries out step S67 to check the flag FLG 2. If the whole system control program 93 determines that the flag FLG 2 is set, step S68 is carried out to select the job having smaller ID at the LEVEL 2 of the priority (the one that a request of the job is accepted earlier). If the step S67 is negative, the whole system control program 93 checks the flag FLG 1. According to the result of the step S69, either one of steps S70 and S71 is executed. At the steps S70 and S71, the whole system control program 93 selects the job having smaller ID at the LEVEL 1 and the LEVEL 0, respectively, of the priority. Thus, the check of the priority is completed.

In the above mentioned manner, the whole system control program 93 narrows the candidates down to one executable job. However, the selected job can not necessarily be executed actually depending on the state of the interface. Thus, the whole system control program 93 then checks the relation between the job and the interface.

Figure 26:
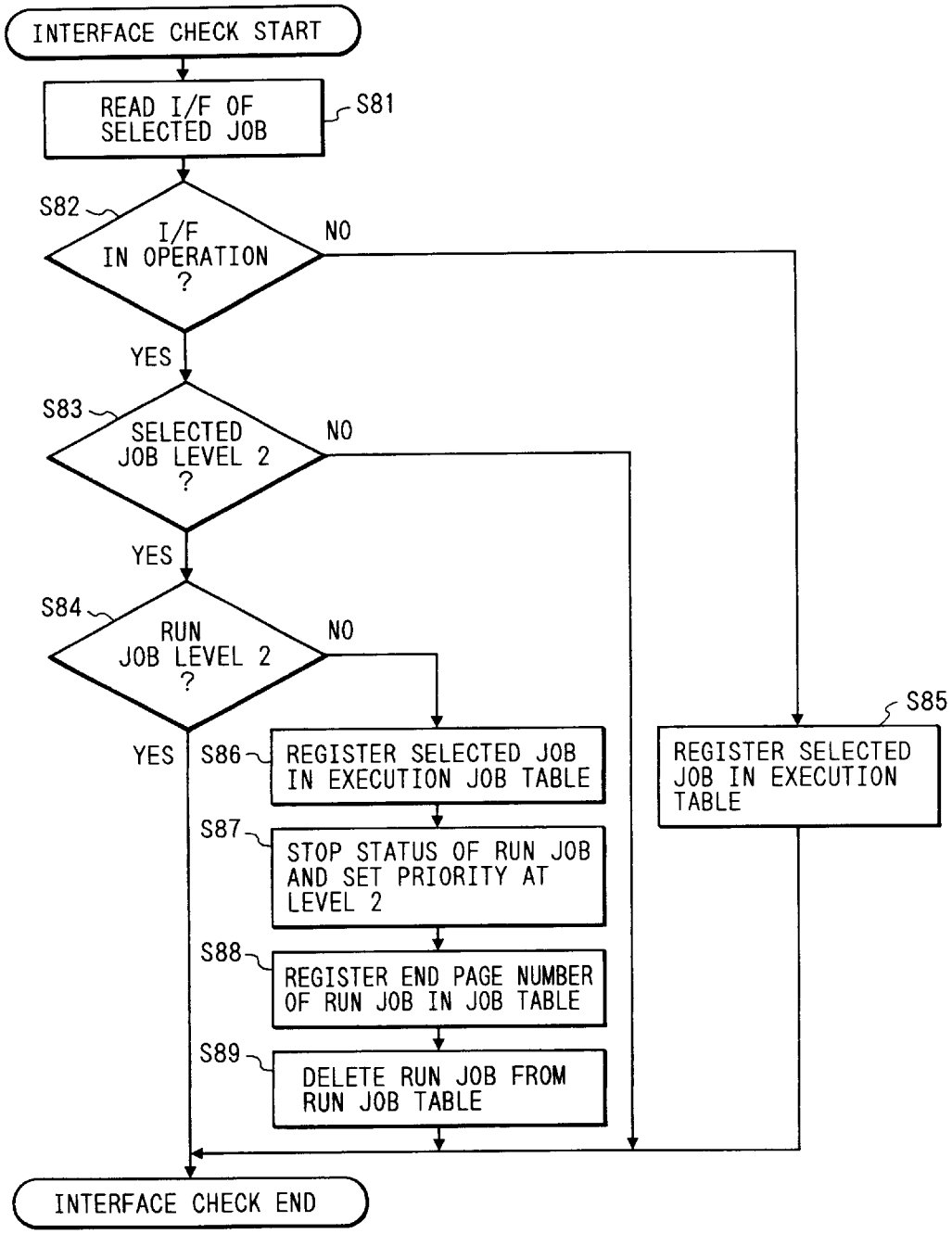

Referring to FIG. 26, description is made regarding to an interface check processing operation carried out by the S/P server according to the-present invention.

FIG. 26 is a flow chart illustrating an example of steps of an interface check processing operation carried out by the S/P server according to the present invention.

At step S81, the whole system control program 93 reads out of the job table the interface associated with the selected job. At step S82, the whole system control program 93 checks the state of the interface in question. If the step S82 is negative, step S85 is carried out where the job is registered in an execution job table. The execution job table is a table indicating the jobs to be executed actually and can be run in a multiprocessing. Thus, it is possible to register a plurality of jobs in the single execution job table. At step S86 described later, this execution job table is looked up to execute the job.

If the step S82 is positive indicating that the interface is occupied, step S83 is carried out to check the priority of the job, If the priority of the job is not labelled with the LEVEL 2, then it is impossible to interrupt the current job. Accordingly, the whole system control program 93 exits from the routine without registering the job in the execution job table. If the step S83 is positive indicating that the priority of that job is in the LEVEL 2, the whole system control program 93 determines at step S84 whether the job of which status is in RUN has the priority of LEVEL 2. If the priority of the job is LEVEL 2, then it is impossible to interrupt the current job. Accordingly, the whole system control program 93 exits from the routine without registering the job in the execution job table.

On the other hand, if the priority of the running job is in LEVEL 1 or LEVEL 0, the running job is interrupted and the job selected later is executed. In such a case, the whole system control program 93 carries out step S86 to register the job selected at the step S84 into the execution job table. At step S87, the whole system control program 93 changes the status of the running job into STOP and the priority thereof into LEVEL 2. This change is made to ensure execution of the interrupted job in preference to any other jobs when being restored.

At step S88, the whole system control program 93 writes the number of the end page into the job table to memorize that to which page the running job has processed. Subsequently, step S89 is carried out to delete the running job from the execution job table. As a result, the running job is not executed and the status becomes STOP. This status is continued until the job is executed again. The whole system control program 93 then escapes from the interface check processing routine.

Figure 27:
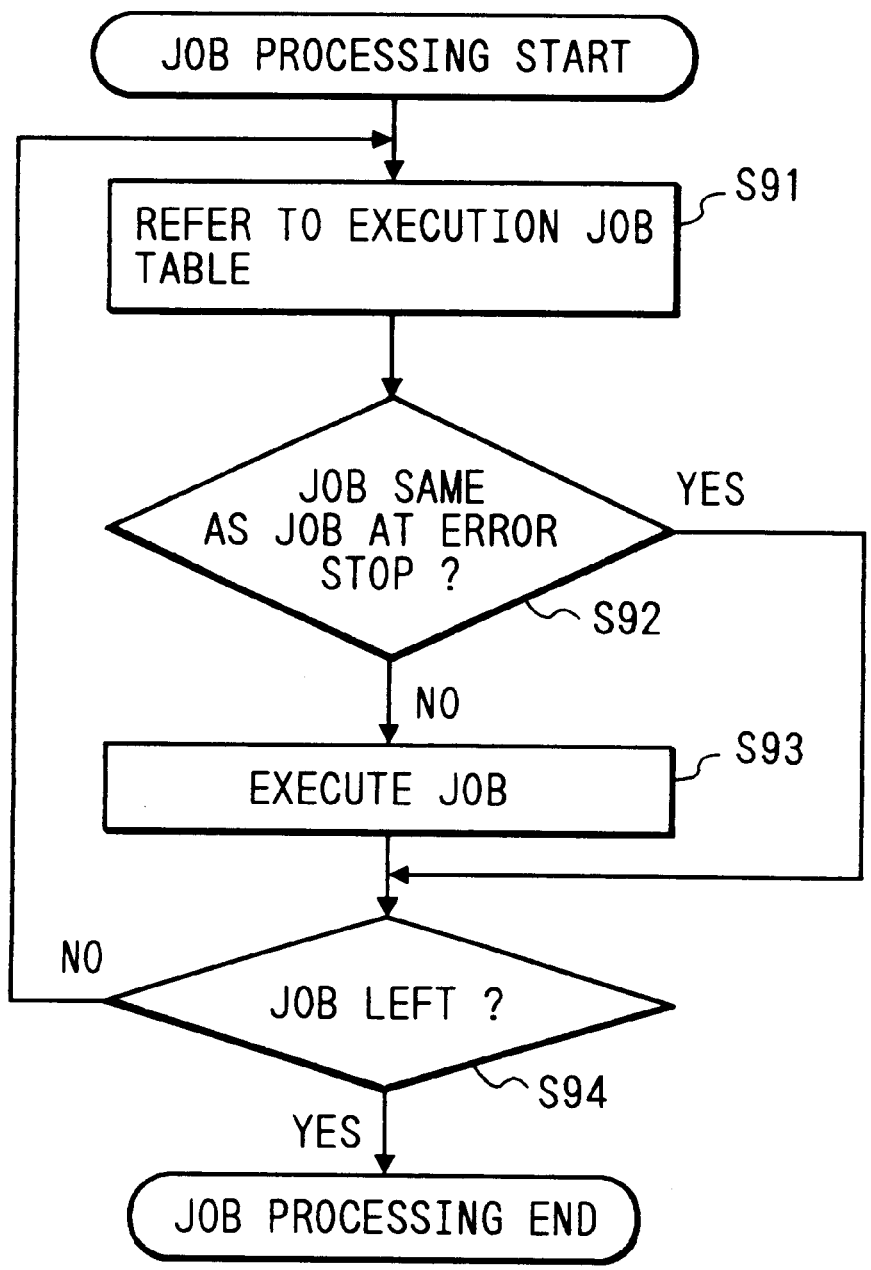

Described with reference to FIG. 27 is a job execution processing operation carried out by the S/P server according to the present invention.

FIG. 27 is a flow chart illustrating an example of steps of a job execution processing operation carried out by the S/P server according to the present invention.

First, at step S91, the whole system control program 93 reads the job to be executed by means of looking up the execution job table. At step S92, the whole system control program 93 checks whether the type of the job to be executed is same as that of the job in the status ESTOP stopped due to an error. In other words, the whole system control program 93 checks whether the job to be executed uses the same device as the job in the status ESTOP. If the same device is allocated, the job to be executed cannot be brought into run. Accordingly, the whole system control program 93 carries out step S94 to determine whether all entries of the execution job table are read. If not, the step S91 is again carried out to execute the subsequent job. If the step S92 is positive, the whole system control program 93 carries out step S93 to run the job. To run the job actually, the whole system control program 93 changes the status thereof from WAIT to RUN to reserve the interface therefor. On the contrary, to stop or interrupt execution of the job, the whole system control program 93 releases the interface.

If the step S94 is negative indicating that no job to be executed is present, the whole system control program 93 escapes from this routine.

If any error is caused during execution of the job, the S/P server SP1 executes the executable in preference to the interrupted one rather than to wait resuming of the troubled periphery from where the error is caused. (Details of the executable job is described later.) The job executed to service the periphery where an error is caused (hereinafter, referred to as an error job) is stored regarding to information necessary for restarting the job. The error job may be registered in the job table as a waiting job, which makes it possible to restart the job when it is restored from the trouble. Whether the error job is registered such that it can be restarted after recovery depends on the degree of the error or the settings of the S/P server.

Figure 28:
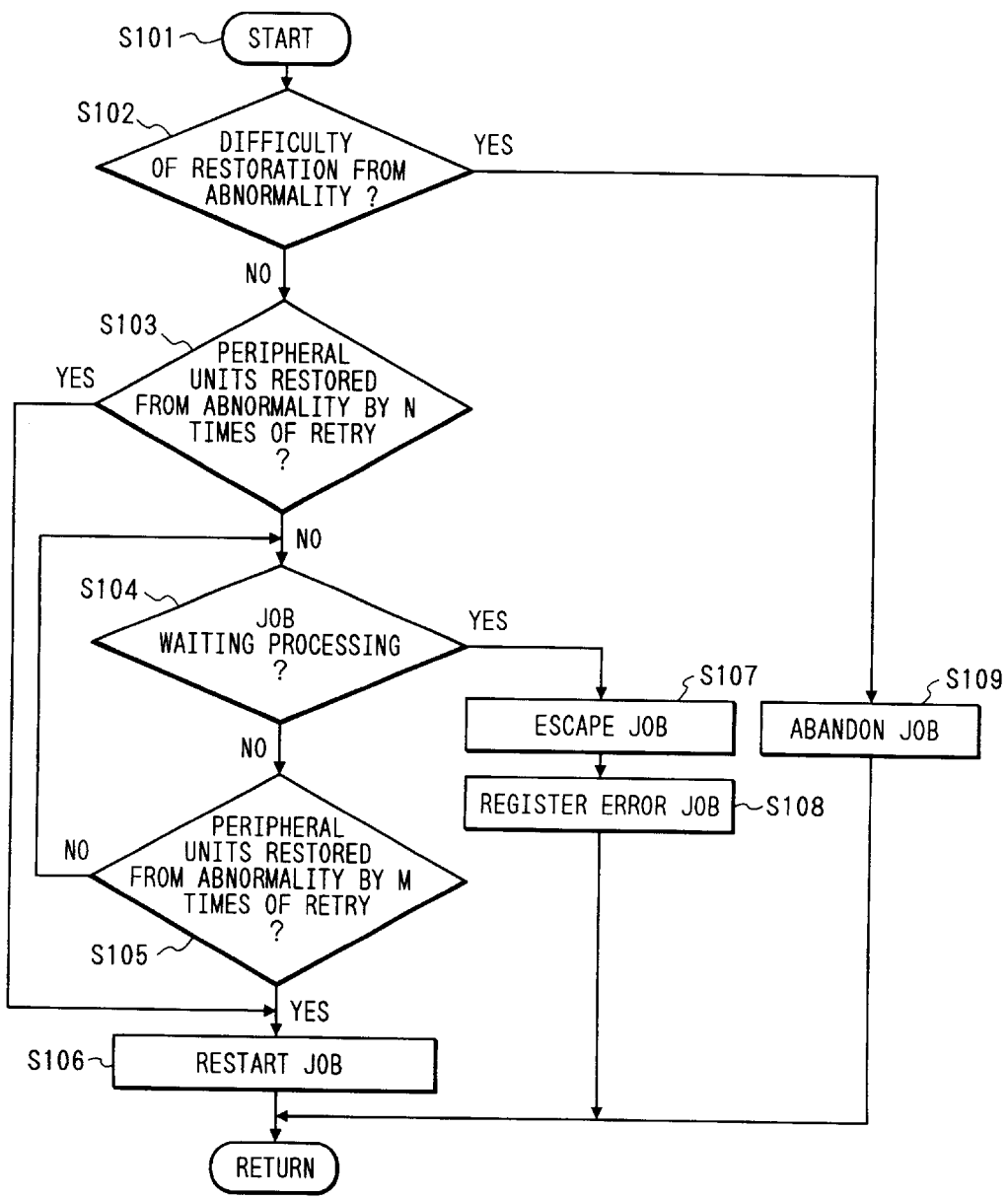

Referring to a flow chart shown in FIG. 28, description is made regarding to an error caused job processing operation.

For example, it is assumed that the host computer ST1 requests of the S/P server SP1 the print job and executes it for printing the data by the color scanner/printer 94, that the host computer ST2 requests of the whole system control program 93 the print job and is in the waiting state, and that the host computer ST3 requests of the whole system control program 93 the scan job and is in the waiting state. It is also assumed that an error is caused in the printer during execution of the printing job. Then, the step S31 in FIG. 23 proceeds the step S32 and the routine shown in FIG. 28 is then executed as a job table updating processing. In this event, the S/P server SP1 determines at step S102 whether it is difficult to restore from the abnormality. If the step S102 is positive and it is difficult to restore from the abnormality or trouble caused in the color scanner/printer 94, the S/P server SP1 immediately abandons the error job.

If the step S102 is negative and it is considered that the trouble caused in the color scanner/printer 94 is expected to be restored, the S/P server SP1 carries out a retry processing (FIG. 29) on the color scanner/printer 94. The retry operation is carried out N predetermined times (N is a positive integer larger than one; for example, N is equal in number to five). If it is determined at step S103 that the color scanner/printer 94 is restored from the abnormality before the retry operation is carried out N times (success in retry), the S/P server SP1 restarts the job at step S106. On the contrary, if the color scanner/printer 94 is not restored from the abnormality when the retry operation is repeated N times (failure in retry), the S/P server SP1 checks at step S104 whether there is any other job that can be executed. If not, the S/P server SP1 carries out retry at step S105 M times (M is a positive integer that is not equal to N; for example, M is equal in number to one). If the S/P server SP1 succeeds in retry, then the job is restarted. On the contrary, if the Step S104 is positive, the S/P server SP1 escapes the error job at step S107. Subsequently, the S/P server SP1 registers at step S108 the error job in the job table as the job (ESTOP) interrupted during being executed due to cause of an error.

In this embodiment, to escape the job corresponds to processing of storing information necessary for restarting the job, such as information regarding to the state of the S/P server SP1 upon execution of the error job, into, for example, a storage device (such as a hard disk), a memory in the S/P server SP1 or a program in the S/P server SP1.

Figure 29:
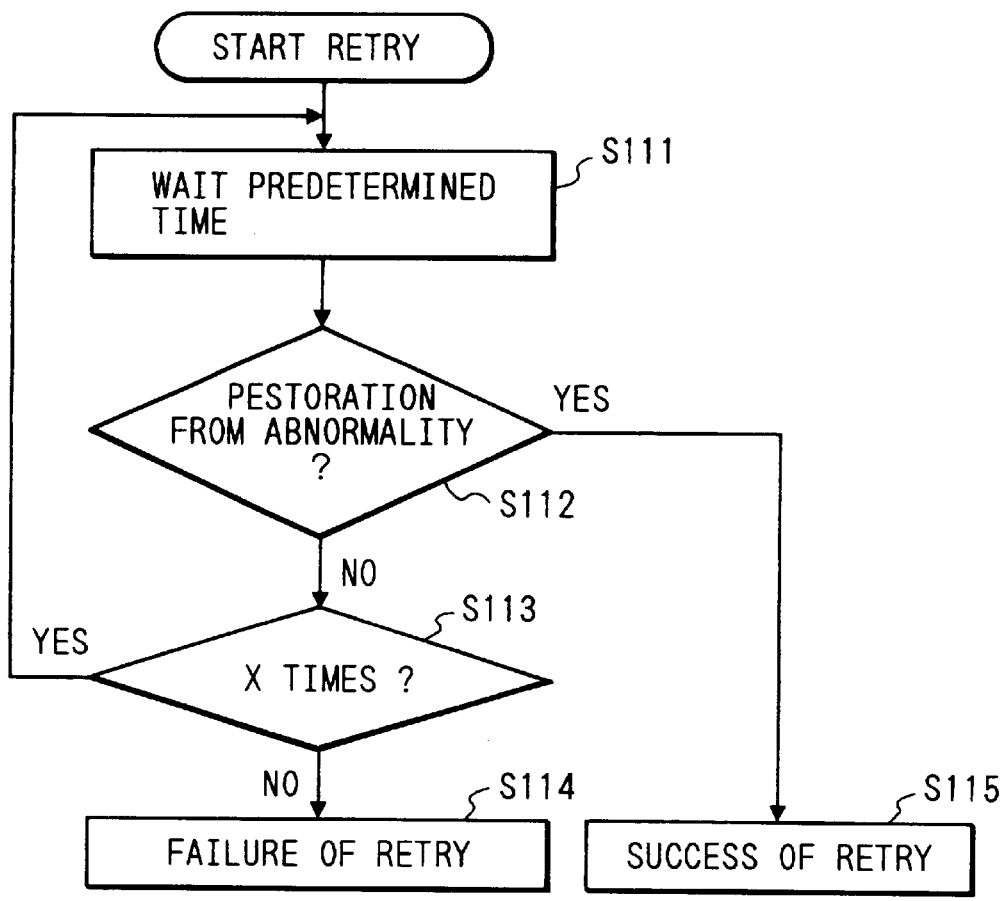

FIG. 29 is a flow chart illustrating an example of steps of a retry processing routine carried out by the S/P server SP1 according to the present invention.

When entering this routine, the S/P server SP1 waits for a predetermined time (e.g., 30 seconds) at step S111. After this time interval is elapsed, the S/P server SP1 checks at step S112 whether the troubled periphery is restored from the abnormality. If not, the same operation is repeated X times (for example, X is equal in number to five) at step S113. If the troubled periphery is restored from the abnormality before the retry operation is carried out X times, then the retry results in success (step S115). If not, the retry results in failure (step S114).

6-2 Printing Operation

Figure 30:
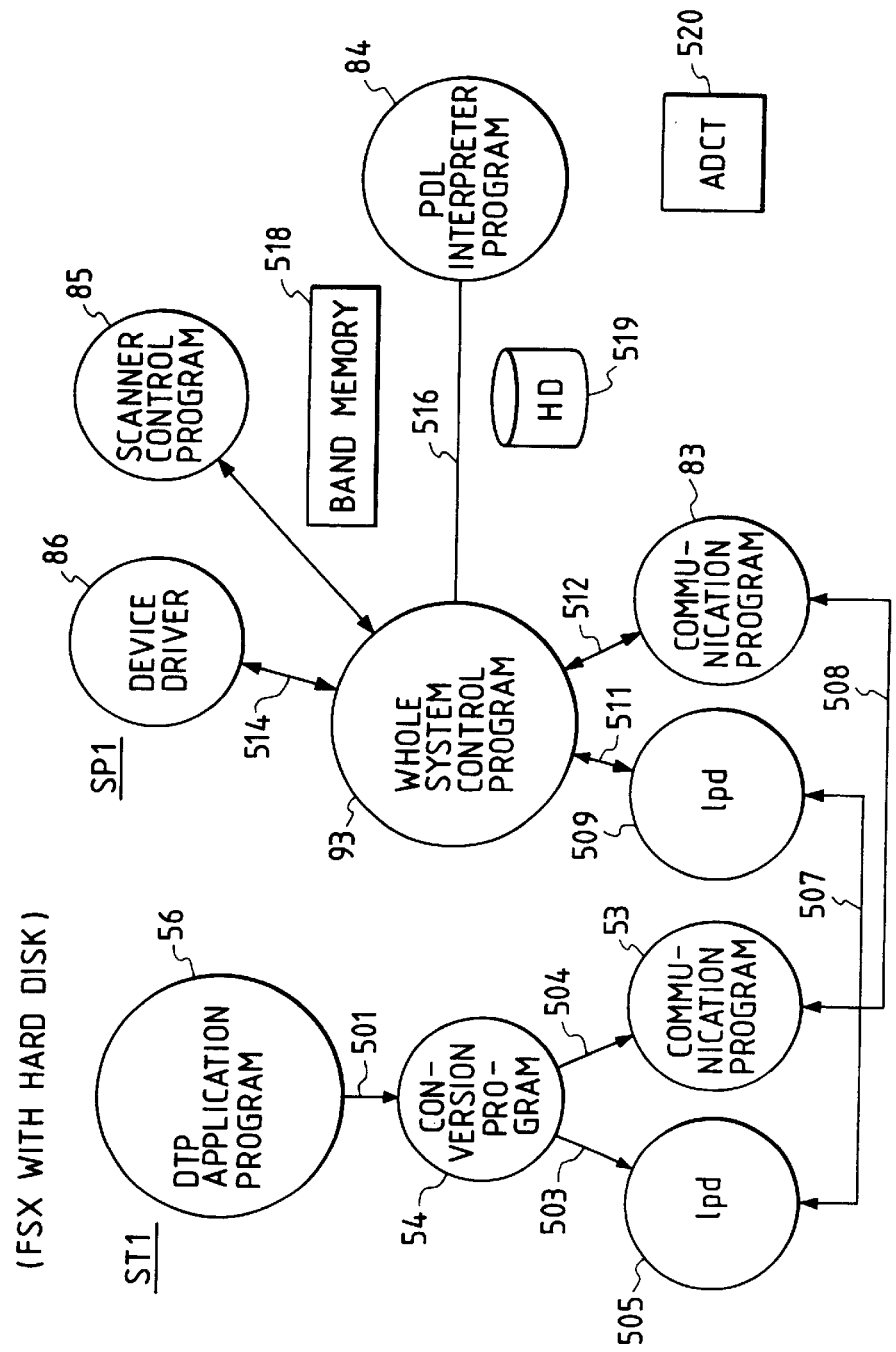
FIG. 30 is a graphical representation for use in describing various stages of data processing carried out by a color laser scanner/printer and the S/P server according to the present invention.

Referring to FIG. 30, described is a printing operation carried out by the S/P server according to the present invention, especially in view of the software operation.

In a flow of data from the host computer to the designated S/P server (network server) SP1, the application program 56 for desktop publishing (DTP) is first executed by the host computer to produce documents such as reports, brochures, and manuals. The data format of this document depends on the type of the host computer and the application program used therein. Accordingly, the data format should be converted into the format that can be interpreted by the S/P server SP1. The conversion program used for this purpose is the conversion program 54. The application program of the DTP (hereinafter, also referred to as the DTP application) 56 supplies to the conversion program 54 the data based on the system of the host computer. The conversion program 54 converts the received file into, for example, the CaPSL codes. In addition, the file converted into the CaPSL codes is supplied to a communication program lpd 505 or the communication program 53.

The communication program is for connecting and communicating the host computer(s) with the S/P server SP1 through the network. In this embodiment, either one of the above mentioned communication programs is prepared.

First, operation with the communication program 53 is described.

The program dominating the communication in the S/P server SP1 that corresponds to the communication program 53 is the communication program 83. With this program, the TCP/IP program is used. Major roles of the communication program 53 upon printing are: to establish communication between the communication program 83 through the lower layer (TCP/IP) and to transmit the CaPSL data file created by the conversion program 54 to the S/P server SP1.

The communication program 83 has several roles such as to ensure optimum printing by means of transmitting and receiving information required for printing through a link. The communication program 83 receives the data supplied from the communication program 53 and notifies the whole system control program 93 of the arrival of the data. In this event, the transmitted CaPSL data and information associated therewith are stored in a reception buffer temporarily. In addition, the communication program 83 serves to transmit, if any error is caused in the S/P server SP1, information regarding to the error to the communication program 53.

Now, described is a flow of data from the communication program 83 to print it.

The document data produced by the DTP application program 56 has already been sent to the S/P server SP1 during the above mentioned operations. Subsequently, the communication program 83 supplies to the whole system control program 93 an event indicating arrival of the job (for example, printing out from a color laser copying machine). The whole system control program 93 is a program of an event-driving type and constantly waits events supplied from the communication program 83, the device driver 86 and the PDL interpreter program 84. In response to reception of an event, the whole system control program 93 determines from where the event is supplied and checks the content of the event to carry out a suitable processing. The whole system control program 93 is assumed to be provided with an event indicating "arrival of the job" from the communication program 83. In this event, the whole system control program 93 interprets the event and, if the hard disk 519 is connected thereto, spools the document data in the reception buffer temporarily into the hard disk. If two or more jobs are present, the whole system control program 93 executes the job in an optimum way, considering the contents of the job, the states of the printer and the scanner, the priority of the job and so on.

If no hard disk 519 is provided, the whole system control program 93 notifies the PDL interpreter program of the address where the data is stored and the size to indicate that the printing operation should be started immediately because it is impossible to spool the data. The following description is made in assumption that the hard disk 519 is present. The whole system control program 93 determines the contents of the job and notifies the PDL interpreter program 84 of the file name, thereby to request execution of the job.

The PDL interpreter program 84 reads the CaPSL data out of the spooled file, interprets it and plots graphic patterns, characters and images in a band memory 518. If the CaPSL data contains a compressed and coded image data, the PDL interpreter program 84 extends the image data by means of a compression/extension unit. The extended data is then plotted in the band memory. After completion of plotting for one band, the PDL interpreter program 84 issues an event indicating "one band plotting completed" to the whole system control program 93. The whole system control program 93 issues, in response to reception of the event supplied from the PDL interpreter program 84, produces a request of "one band reception command" and supplies it to the device driver 86.

A flow of data from the band memory 103 to the compression memory 17 is now described in view of the operation of the device driver 86.

The device driver 86 transfers, in response to the reception of the "one band reception command", the expanded data stored in the band memory 103 to the line buffer 219 (FIG. 19). As mentioned above, the expanded data stored in the line buffer 219 is then transferred to the real time compression/extension unit 218 in block-order. The real time compression/extension unit 218 compresses the image data received in block-order and successively stores them into the compression memory 17. The DMA controller 217 contributes to generating addresses for the compression memory 17 and generating a write signal.

After completion of compression of the data of one band, the device driver 86 transmits to the whole system control program 93 an event indicating "one band output completed". In response to this event, the whole system control program 93 supplies a "one band plotting request" to the PDL interpreter program 84. In this way, compression is repeated for storing the compressed/expanded image into the compression memory 17 during the band-based plotting. When the data of the last band is stored in the band memory, the PDL interpreter program 84 supplies an event indicating "one page plotting completed" to the whole system control program 93. In response to this event, the whole system control program 93 supplies a "one page discharge request" to the device driver 86.

In response to the "one page discharge request", the device driver 86 makes the system to carry out following operations to printing the extended image of the one page stored in the compression memory 17.

The CPU 211 turns on the DPRAM 214 and initiates the real time compression/extension unit 218 and the DMA controller 217. The CPU 211 then communicates with the designated printer 94B to send thereto and receive therefrom commands. The CPU 211 supplies commands for starting the extension to the real time compression/extension unit 218. The real time compression/extension unit 218 accesses the DMA controller 217. The DMA controller 217 produces address and read signals. The compressed data is supplied to the real time compression/extension unit 218 from the compression memory 17 and is extended therein. The extended data are supplied to the line buffer 219 in block-order. The line buffer 219 converts the block-ordered data into a raster-ordered data. The raster-ordered data is supplied to the printer 94B through the video I/F 220a. In practice, when the image of one page is produced and printed out, the device driver 86 supplies an event indicating "one page discharge completed" to the whole system control program 93. In response to this, the whole system control program 93 supplies a "second page plot command" to the PDL interpreter program 84. In this way, the document consisting of a plurality of pages is processed and printed out.

When the data of the last band of the last page is completely plotted, the PDL interpreter program supplies an event indicating "document end" to the whole system control program 93. In response to this, the whole system control program 93 supplies the "one page discharge command" to the device driver 86. The device driver 86 carries out, in response to this command, printing operation and supplies the event indicating "one page discharge completed" to the whole system control program 93. The whole system control program 93 supplies, if necessary, an event indicating "print end" to the communication program 83. In response to this, the communication program 83 notifies the communication program 53 in the host computer of end of the printing.

As mentioned above, when the paper in the printer 94B is jammed or run out the device driver 86 supplies an event indicating "error occurrence" to the whole system control program 93. The whole system control program 93 notifies of this the PDL interpreter program 84 and the communication program 83. The PDL interpreter program 84 carries out processing upon occurrence of errors such as to escape the program state. The communication program 83 notifies the communication program 53 in the host computer of occurrence of the error and the contents of it. Two approaches can be available to check if the error is restored. One is to inquire of the device driver by every predetermined interval from the whole system control program 93, to which the device driver 86 answers. The other is to monitor the error restoration from the whole system control program 93, thereby issuing an event indicating "error restoration" upon the abnormal state is restored to the whole system control program 93.

Description is made regarding to processing of print data output of the host computer to, for example, the ink-jet color scanner/printer 95 in conjunction with a difference from the above mentioned operation.

The procedures up to the expansion into the band memory are similar to those described above. To print the data read out of the band memory 103, the device driver 86 controls the interface board in response to the "one band reception command" to print the data by the designated ink-jet color printer 95B. The image data of one band, expanded in the band memory 103 of the main board 11, is transferred to the band memory 408 (FIG. 22). The data stored in the band memory 408 is read out of it in a scan format suitable for the printer head of the ink-jet printer 95B. The read data is supplied to the image processing units 404, 405 and 406 through the buffer 418. In this event, processing is carried out according to predetermined parameters. In general, the processing is directed to convert the NTSC-RBG data stored in the band memory into the RGB data suitable for the ink-jet printer 95B. The converted data is supplied to the printer engine of the ink-jet printer 95B through the interface 424. The CPU 401 is allocated to the task of controlling the ink-jet printer 95B by means of interpreting the commands supplied from the CPU 101. A reference numeral 403 represents the dual-ported RAM.

The above mentioned processing is repeated from the first band to the last band. When the data of the last band is processed, the PDL interpreter program 84 supplies an event indicating "document end" to the whole system control program 93 and completes the printing operation. At that time, the whole system control program 93 supplies, if necessary, the event indicating "print end" to the communication program 83. The communication program 83 notifies the communication program 53 in the host computer of completion of printing.

Procedures performed when an error is occurred is similar to those described in conjunction with the printer 94B.

6-3 Scanning Operation

Operation of the scanners 94A and 95A is described with reference to a data processing path diagram shown in FIG. 31.

Figure 31:
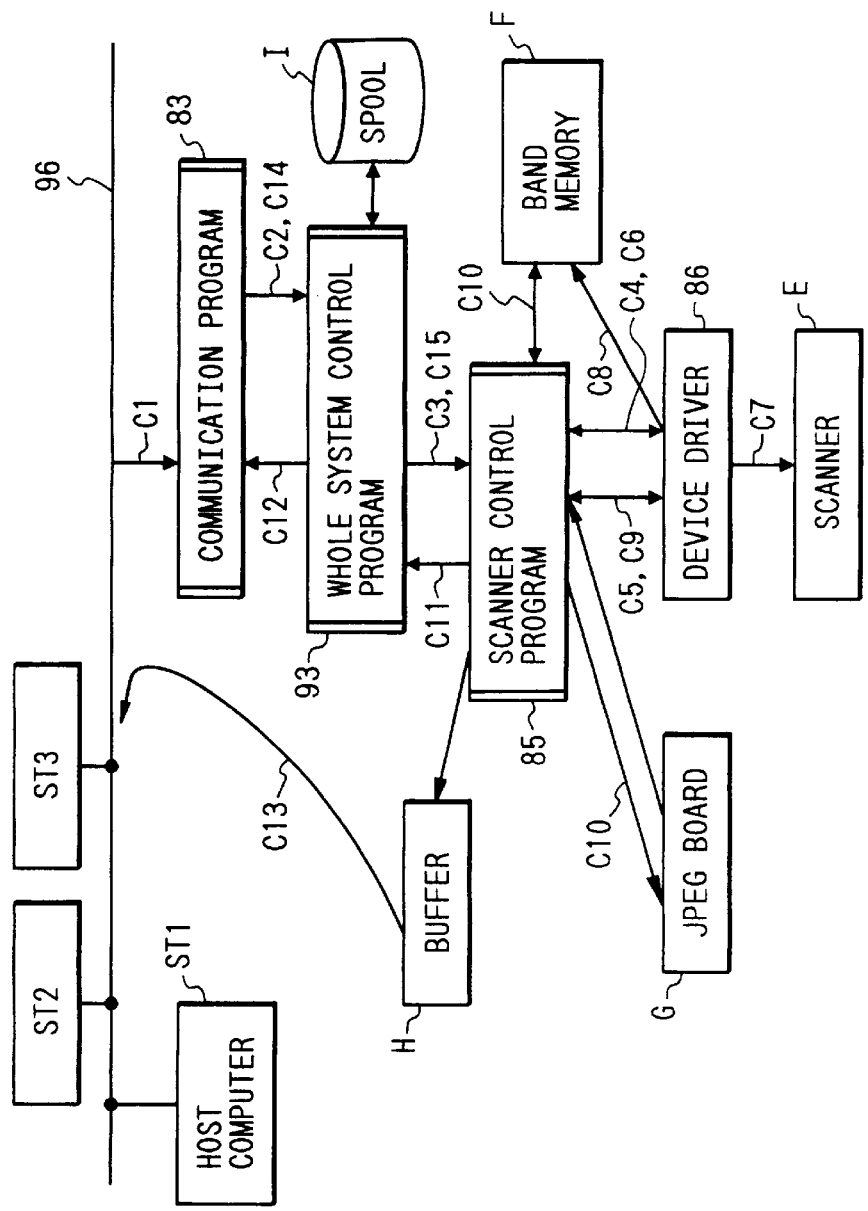
FIG. 31 is a data flow diagram for use in describing operation of a scanner.

FIG. 31 is a data processing path diagram for use in describing operation of the scanners 94A and 95A. The S/P server treats a task in a slightly different way in cases where the whole image is partitioned into two or more bands to be scanned and where the whole image is scanned at once. Thus, description is made for both cases.

To scan the image with being partitioned into two or more bands, a scan command C1 supplied from the host computer ST1 serving as the client device is received by the communication program 83 through the TCP/IP program 82. The communication program 83 notifies the whole system control program 93 of arrival of the scan command C2 to the whole system control program 93. The whole system control program 93 creates, if the device has a spool I, a spool file according to the received scan command C2 and stores it. The whole system control program 93 notifies the scanner control program 85 of a file name C3 of the spool file. If the device has no spool I, the whole system control program 93 supplies a scanner command C3 directly to the scanner control program 85. The scanner control program 85 interprets the scanner command C3 and supplies a scanner condition set command C4 to the device driver 86 to drive the designated scanner. The scanner condition set command is for setting conditions of the scanner such as the resolution. The device driver 86 is a function present corresponding to each of the scanner control program 85. The device driver 86 that set the scanner condition returns a return value C5 to the scanner control program 85. In response to this, the scanner control program 85 supplies a scan start command C6 to the device driver 86 to drive the designated scanner. The device driver 86 operates a scanner E to scan the image data and writes it in a band memory F. When the image data of one band is written in the band memory, the device driver 86 returns the return value C9 indicating completion of scanning to the scanner control program 85. In response to this, the scanner control program 85 carries out image processing on the image data stored in the band memory F. For example, the scanner control program 85 compresses the image data by using a JPEG compression board and plots the compressed data into a buffer area H.

When all data in the band memory F are processed, the scanner control program 85 supplies a transference request C11 to the whole system control program 93. At the same time, the scanner control program 85 supplies the scan start command C6 to the device driver 86 to operate the scanner. This scan is so controlled by the scanner control program 85 that the scanning operation is restarted from the end point of the last scanning.

On the other hand, the whole system control program 93 supplies a transference request C12 to the communication program 83 in response to the transference request 11. In response to reception of the transference request C12, the communication program 83 supplies the processed image data stored in the buffer area H to the designated host computer serving as the client device. In this event, it is possible to transfer the image data even when the scanner is under operation with being controlled by the device driver 86. This is because the whole system control program 93 is different from the scanner control program 85 that is a function in the device driver 86.

The communication program 83 supplies, upon completion of transference, a transference end signal C14 to the whole system control program 93. In response to this signal, the whole system control program 93 supplies a transference end C15 to the scanner control program 85. The scanner control program 85 carries out image processing on the image data stored in the band memory F when both of the transference end C15 and the return value C9 are received from the device driver 86 indicating that the scanning operation is completed. The scanner control program 85 when writes the processed data into the buffer area H. To repeat the above mentioned processing allows transmission of the image data to the host computer ST1. Of course, it is possible to send the image data any other host computer(s) such as the host computer ST2 or ST3 only by means of designation.

Upon confirmation of completion of the all image data, the scanner control program 85 notifies the communication program 83 of this completion through the whole system control program 93.

Alternatively, to scan the whole image at once, the scan command C1 supplied from the host computer ST1 serving as the client device is received by the communication program 83. The communication program 83 notifies the whole system control program 93 of arrival of the scan command C2 to the whole system control program 93. The whole system control program 93 creates, if the device has a spool I, a spool file according to the received scan command C2 and stores it. The whole system control program 93 notifies the scanner control program 85 of the file name C3 of the spool file. If the device has no spool I, the whole system control program 93 supplies a scanner command C3 directly to the scanner control program 85. The scanner control program 85 interprets the scanner command C3 and supplies the scanner condition set command C4 to the device driver 86 to drive the designated scanner. The scanner condition set command is for setting conditions of the scanner such as the resolution. The device driver 86 that set the scanner condition returns the return value C5 to the scanner control program 85. In response to this, the scanner control program 85 supplies the scan start command C6 to the device driver 86 to drive the designated scanner. It is assumed that the scanning operation of the scanner E described here cannot be interrupted until completion of scanning. The device driver 86 operates the scanner E by using a command C10 and carries out image processing on the scanned image data. For example, the scanner control program 85 compresses the image data by using a JPEG compression board and plots the compressed data into a buffer area H. It is also possible to write the raw image data without being compressed into the buffer H. When the buffer H is filled with the data, the scanner control program 85 supplies the transference request C11 to the whole system control program 93. The whole system control program 93 supplies the transference request C12 to the communication program 83 in response to the transference request 11. In response to reception of the transference request C12, the communication program 83 supplies the processed image data stored in the buffer area H to the designated host computer ST1. Of course, it is possible to send the image data any other host computer(s) such as the host computer ST2 or ST3 only by means of designation.

In addition, it is also possible to allocate an arbitrary printer to print the image by means of designating the printer such that it can be stored as a file in the hard disk I as a result of designation of the S/P server.

The communication program 83 supplies, upon completion of transference, the transference end signal C14 to the whole system control program 93. In response to this signal, the whole system control program 93 supplies the transference end C15 to the scanner control program 85. The scanner control program 85 carries out image processing on the image data stored in the band memory F when the transference end C15 is received from the device driver 86. The scanner control program 85 when writes the processed data into the buffer area H. To repeat the above mentioned processing allows transmission of the image data to the host computer ST1 or the like.

Upon confirmation of completion of the all image data, the scanner control program 85 notifies the communication program 83 of this completion through the whole system control program 93.

6-4 An Example of Print Job Execution

A specific job processing operation carried out by the server according to the present invention is described with reference to FIGS. 32 and 33A through 33J.

FIG. 32 is a timing chart indicating transitions of job processing states in the S/P server according to the present invention. In the figure, the abscissa represents the time. Reference numerals 804 through 813 correspond to the timing when the job table is checked while reference numerals 800 through 803 correspond to the timing when an event of the job given by the communication program 83 enters the whole system control program 93. The timings 804 through 813 correspond to the timing when the job table is checked.

FIGS. 33A through 33J are views illustrating contents of job tables generated during job processing carried out by the S/P server according to the present invention. FIGS. 33A through 33J show the job tables corresponding to the timings 804 through 813, respectively, in FIG. 32. Each job table has entries of which contents are for just before the check. A job CLCP is for producing a document from the printer of the color laser copying machine (CLC). A job CLCS is for scanning the original by the scanner of the color laser copying machine (CLC). A job BJP is for producing the document to the printer of the ink-jet color copying machine. A job BJS is for scanning the original by the scanner of the ink-jet color copying machine. A job PDLP is for supplying the document to a printer having a commercially available interpreter for the page description languages. A job BITP is for supplying the document to a commercially available bitmap printer. Besides, it is also provided with a job for scanning the original by a commercially available scanner.

To manage the jobs, the job tables as shown in FIGS. 33A through 33J are used. Each job table has entries assigned for: an ID for identifying the jobs, the status indicating the state of the job, the priority, a type of job, an end page, and an interrupted job ID.

The IDs are represented by serial numbers and can be considered as indicating the order of the job requests accepted. The status may be: RUN indicating that the job is running; WAIT indicating that the job is waiting processing; STOP indicating the job is stopped due to interruption; and ESTOP indicating that an error is caused and the job is not restored. The priority is one of LEVEL 0 through LEVEL 2. The LEVEL 0 corresponds to "no designation" and this level is set during a normal operation. The LEVEL 1 corresponds to "interruption with priority by one job as a unit" and the job at this level is processed in preference to others when several jobs are in the waiting state. The LEVEL 2 corresponds to "interruption by one page as a unit" and the job at this level is processed if any other job is under execution by interrupting the running job at the end of the page. The entry INTERFACE represents the hardware used by the job. This entry is so provided as to allow the jobs to use a common hardware. The job CLCP is for producing a document from the printer of the color laser copying machine (CLC). The job CLCS is for scanning the original by the scanner of the color laser copying machine (CLC). The job BJP is for producing the document to the printer of the ink-jet color copying machine. The job BJS is for scanning the original by the scanner of the ink-jet color copying machine. The job PDLP is for supplying the document to a printer having a commercially available interpreter for the page description languages. The job BITP is for supplying the document to a commercially available bitmap printer. Besides, it is also provided with the job for scanning the original by a commercially available scanner. The entry end page is for recording the number of pages already processed by the job. This entry is used to determine from which page the processing should be restarted after being restored from the error, if caused. In addition, the entry of Interrupted Job ID is used for determining whether the processing of the interrupting job is completed. If completed, the job in STOP status is restarted.

The whole system control program 93 determines the optimum job to be executed by means of looking up the job table where the above mentioned information is stored.

More particularly, an event of the job is given at a timing 800. This job is a job 1 (CLCP) for producing a document to the printer of the color laser copying machine (CLC). The number of pages to be produced is equal to three and the priority is in LEVEL 0. Used as the interface is BMEM. In the job table JOBT, a number "25" is assigned as the ID of this job as shown in FIG. 33A. The status is in WAIT and the end page is "0" because this job is not processed yet.

When the job table is checked at a timing 804, the job having the ID 25 is selected and executed. Accordingly, the status of the job having the ID 25 is changed into RUN. A new job is given at a timing 801. After completion of processing of the first page of the job having the ID 25, the whole system control program 93 looks up the job table again. The job table at that time is shown in FIG. 33B. The first page of the job having the ID 25 has produced and this job is waiting the subsequent processing for the second page. The entry of the end page is changed from 0 to 1. An ID number of "26" is assigned to the incoming job, of which status is in WAIT and the priority is in LEVEL 1. The interface used is the BMEM and the job is BJP. The whole system control program 93 executes processing for the second page of the job having the ID 25 according to this job table JOBT.

In this event, a paper is jammed in the printer during printing the second page, so that the job having the ID 25 is interrupted. The whole system control program 93 looks up the job table JOBT and search the job to be executed next. The job table JOBT then is as shown in FIG. 33C. The status of the ID 25 is changed into ESTOP and the priority thereof is in LEVEL 2 to ensure execution of this job in preference to that of any other jobs after restoration from the error. The end page is still indicating one. Accordingly, the whole system control program 93 executes the job having the ID 26. When this job completes the processing for the first page, the whole system control program 93 checks the job table JOBT at a timing 807. The job table at that time is as shown in FIG. 33D. The job having the ID 25 is not restored from the error, so that it is not executed. Accordingly, the whole system control program 93 requests of the PDL interpreter program 84 that the second page of the job having the ID 26 should be processed.

During the job having the ID 26 is processing the second page, a new event of job is supplied to the whole system control program 93. This job is for scanning an original having two pages by the scanner of the ink-jet color copying machine. When the job having the ID 26 completes to process the second page, the whole system control program 93 checks the job table JOBT. The job table JOBT then is as shown in FIG. 33E.

The ID 25 remains without being changed because it is not yet restored from the error. The job having the ID 26 completes processing for the second page, so that the entry of the end page is changed into 2. In addition, an ID 27 is assigned to the incoming job. The priority of the job having the ID 27 is in LEVEL 2. Accordingly, the whole system control program 93 interrupts the currently running job having the ID 26 to execute the job having the ID 27. The status of the job having the ID 26 is changed into STOP and the priority thereof is in LEVEL 2.

During the scanner control program 85 is scanning the first page of the original, the whole system control program 93 is provided with a new event of job at a timing 803. After completion of scanning the first page, the whole system control program 93 checks the job table JOBT at a timing 809. The job table JOBT at that time is as shown in FIG. 33F. The job having the ID 25 is still in ESTOP status because it is not restored from the error. The ID 26 is in STOP status and the interrupting job has the ID 27, so that the whole system control program 93 checks the job of the ID 27. The status of the ID 27 job is still in RUN, so that this job cannot be restarted. The incoming job is labelled with an ID 28. The job having the ID 28 is for transmitting data to a commercially available printer through the centronics interface. This job is allowed to be executed simultaneously with the currently running job. Accordingly, the whole system control program 93 simultaneously executes the job having the ID 28 and the job having the ID 27 that is now directed to scan the second page.

Subsequently, the whole system control program 93 checks the job table JOBT (at a timing 810). The job table JOBT at that time is as shown in FIG. 33G. The error of the job having the ID 25 is skipped and released before the whole system control program 93 checks the job table JOBT at the timing 810. Accordingly, the status of this job is changed into WAIT.

The status of the job having the ID 26 is also changed into WAIT because execution of the interrupting job having the ID 27 is completed. The job having the ID 28 is still in the RUN status. The whole system control program 93 executes the job having the ID 25 or ID 26 because the interface BMEM is in free. Both jobs are in the same condition, i.e., in WAIT status and in LEVEL 2 priority. Thus, the job having the ID 25 that has accepted earlier is executed first. In this event, the end page of the job having the ID 25 is the first page, so that the whole system control program 93 should request of the PDL interpreter program 84 to start processing from the second page.

The job table JOBT at a timing 811 is as shown in FIG. 33H. The status of the jobs having the ID 25 and ID 28 is in RUN while the job having the ID 26 is in WAIT status. The priority of the job having the ID 26 is in LEVEL 2, so that this job could interrupt the currently running job. However, the job having the ID 25 is executed with the priority in LEVEL 2. Thus, the job of ID 26 cannot interrupt the job of ID 25.

At a timing 812, the whole system control program 93 checks the job table JOBT. The job table JOBT at that time is as shown in FIG. 33I. The job having the ID 25 has already been completed and thus deleted from the job table JOBT. Accordingly, the whole system control program 93 executes the job having the ID 26 from the third page.

Figures 33J, 34:
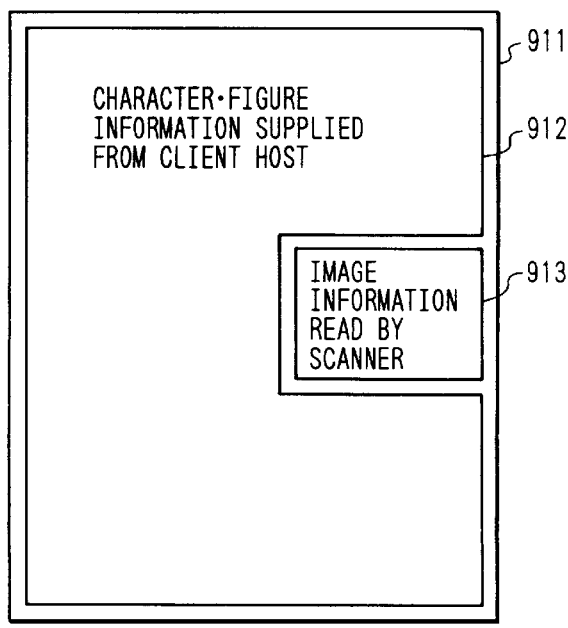

When the whole system control program 93 checks the job table JOBT at a timing 813, the job having the ID 28 is running as shown in FIG. 33J. Accordingly, the whole system control program 93 executes no other job.

As mentioned above, the whole system control program 93 manages the jobs in an optimum way by means of looking up the job table JOBT.

While the above mentioned description has thus been made in conjunction with transmission of the commands for printing and scanning operation from the host computer to the S/P server SP1, another feature of the present invention lies in synthesis of the image described in the PDL with the image scanned by the scanner within the S/P server SP1.

7. Operation upon Image Synthesis

To obtain the synthesized image of this type is not described with reference to FIG. 34. In the figure, an image 912 described in the page description language is synthesized with an image 913 scanned by the scanner 94A or 95A as a synthesized image 911. In this embodiment, the synthesized image can be obtained through any one of three approaches.

(1) Synthesis within the Host Computer

A host computer comprising a PDL interpreter can synthesize the scanned image received by the host computer after the above mentioned scanning operation with an image described in the PDL. In this event, the host computer should comprise a memory having a capacity available to store at least the scanned image and the synthesized image. It is noted that this approach requires relatively long operating time. The data corresponding to the scanned image is received through the LAN 96 and synthesized with the described image, following which the synthesized image is transmitted to the printer. Accordingly, just to print the synthesized image takes a long time. This is especially true when the data is transmitted in the form of the raw image data.

(2) Filing the Scanned Image within the S/P Server

As mentioned above, the S/P server can be designated as the destination of the data when the scanning operation is carried out by the S/P server under control of the host computer. This designation results in registration of the scanned image in the S/P server as a file.

The text image described in the PDL may be synthesized with the image obtained by using a scanner or the like (hereinafter, referred to as a natural image) by means of producing from the host computer a PDL data that uses special commands. The commands are: a command for specifying a position where the natural image should be synthesized, and a command for specifying an image data file representing the natural image. Typically, the image data file is supplied from the host computer to the printer separately from the PDL data (as disclosed in, for example, U.S. patent application Ser. No. 08/112,376). On the contrary, the present embodiment provides the PDL data containing the command for specifying a position where the natural image should be synthesized and the command for specifying an image data file representing the natural image. By transmitting this PDL data from the host computer, it becomes possible to obtain the synthesized image without sending from the host computer the image data file representing the natural image.

The main board 11 performs a unique, featureful operation upon creating a synthesized image. More particularly, after PDL expansion of the image into the band memory, the main board 11 reads the natural image out of the hard disk and overwrites it on the band memory if the band memory in question contains the region to be used for synthesizing the natural image with.

Other operation of the main board is similar to those carried out to print the PDL data. A detailed description thereof is thus omitted.

(3) Direct Synthesis within the S/P Server

The above mentioned method (2) can effect, if the hard disk is poor, only when a large natural image is compressed into a small compressed image. With this respect, the method (3) makes the host computer send the PDL data containing the command for specifying a position where the natural image should be synthesized and the command for instructing scanning operation by the scanner. The instructing command contains the scan parameters shown in FIG. 8.

A unique operation of the main board 11 achieved by the method (3) is described. As mentioned above, after PDL expansion of the data into the band memory, the image of one band scanned by the scanner is overwritten on the band memory. The resultant image data of one band may be transmitted to the host computer or supplied to the printer (S/P interface circuits 4-1 and 4-2). This operation is repeated for one page. If the designated scanner and the designated printer are connected to the same S/P interface circuit 4-1 or 4-2, the S/P interface circuit 4-1 or 4-2 in question produces the scanned image of one band and then receives the synthesized image of the same band. (Scanning of the data of one band is carried out alternatively with printing in the scanner/printer 95.) Two different images are stored in the compression memory of the S/P interface circuit 4-1. These images are subjected to address management separately.

8. Others

Figures 35, 35A:
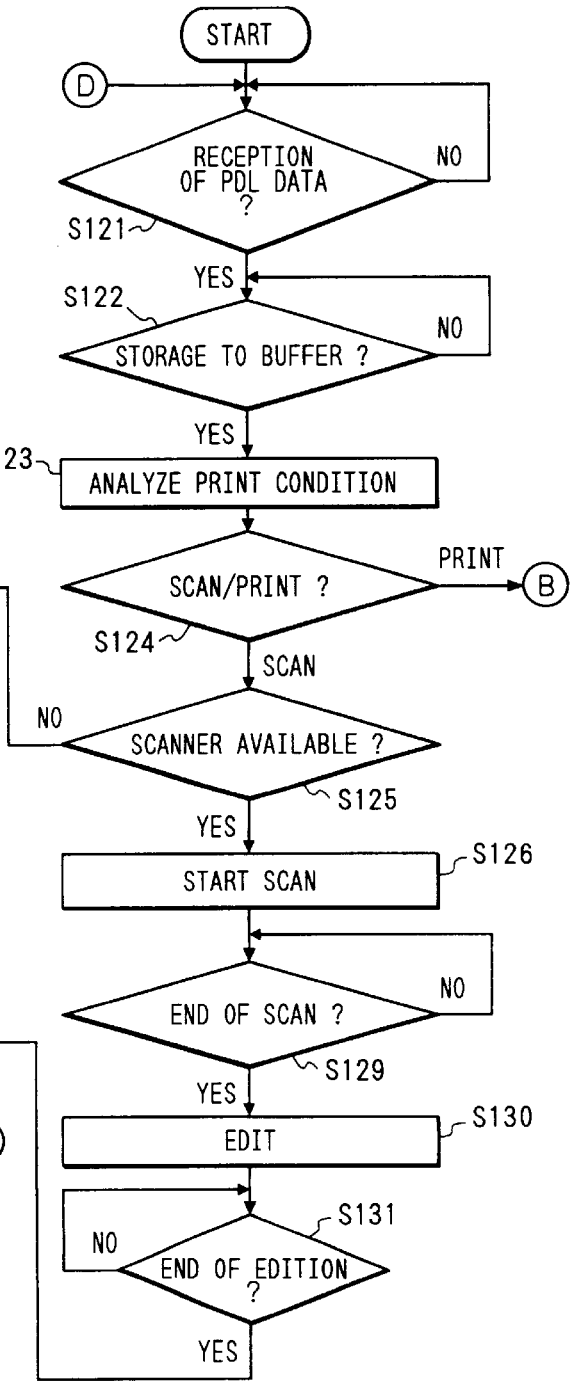
FIG. 35 is comprised of FIGS. 35A and 35B showing flow charts of an example of control procedures carried out by the S/P server according to the present invention.
Figure 35B:
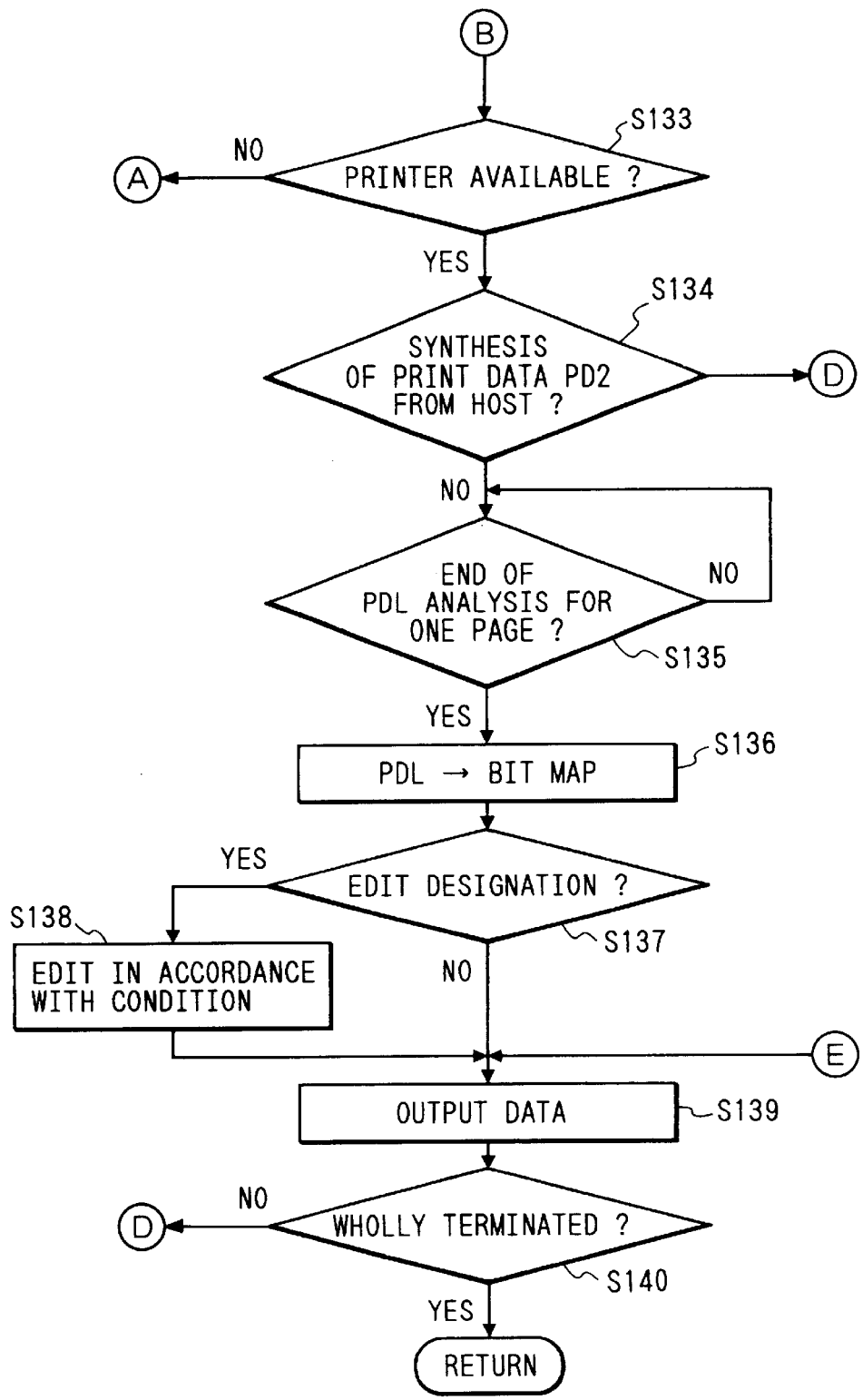

FIGS. 35A and 35B are flow charts illustrating simply another control routine carried out by the server according to the present invention. This routine is carried out by the CPU 101 shown in FIG. 9 to print the PDL data supplied from the host computer out of the designated printer.

On receiving at step S121 the PDL data from any one of the host computers connected to the LAN 96, the CPU 101 stores temporarily at step S122 the received PDL data in a buffer memory in the DRAM 102. The CPU 101 analyzes at step S123 print condition according to the PDL data stored. Subsequently, the CPU 101 determines at step S124 whether the one to be printed is the PDL data supplied from the host computer or a command to scan an image data. If scanning is required, the CPU 101 determines at step S 125, through the interface to the scanner connected thereto, whether the scanner is available. If the step S125 is negative, the CPU 11 notifies the host computer of it at step S127. The control returns when a next command is received at step S128. On the other hand, if the step S125 is positive, the scanning operation is started at step S126. When the scanning is ended at step S129, the scanned image is edited at step S130, if desired, through trimming, masking or color conversion. When completion of edition is detected at step S131, the CPU 101 determines at step S132 whether the scanned data should be synthesized with the PDL data supplied from the host computer. If the step S132 is negative, the CPU 101 carries out step S139 to start processing for supplying the scanned image to the designated printer or the like. The CPU 101 determines at step S140 whether all printing operation is completed. A positive result of the step S140 goes on return while a negative result passes the control to the step S121 to carry out each step again.

On the other hand, if the step S132 is positive, the CPU 101 determines at step S133 whether the designated printer or the like is available. When the step S133 is negative, the CPU 101 carries out the step S127 and notifies the host computer of this state. If the step S133 is affirmative, the CPU 101 determines at step S134 whether synthesis with a PDL data supplied from other host computer is indicated. If the step S134 is positive, the CPU 101 notifies the other host computer of this state and returns to the step S121. If the step S134 is negative, the CPU 101 analyzes the PDL for one page. When this PDL analysis is ended at step S135, the CPU 101 converts the PDL into a bitmap at step S136. Subsequently, the CPU 101 determines at step S137 whether any edition is designated. If the step S137 is positive, the CPU 101 carries out step S138 to edit, for example, the scanned data SD already scanned and the printer data PD. In this embodiment, the steps S136 through S138 are repeatedly carried out for each band. The CPU 101 then produces at the step S139 the data through the designated printer or the like. The CPU 101 determines at the step S140 whether all printing operation is completed. A positive result of the step S140 goes on return while a negative result passes the control to the step S121 to carry out each step again.

While the present embodiment has thus been described in conjunction with a case where either one of the scanned data SD scanned by the scanner and the print data PD supplied from the host computer or a combination data thereof (the scanned data SD plus the print data PD) is produced through the designated printer, a more complicated data (a scanned data SD1 plus a scanned data SD2; a print data PD1 plus a print data PD2; and the scanned data SD1 plus the print data PD1 plus the print data PD2 etc.) may be produced through the designated printer.

Figure 36B:
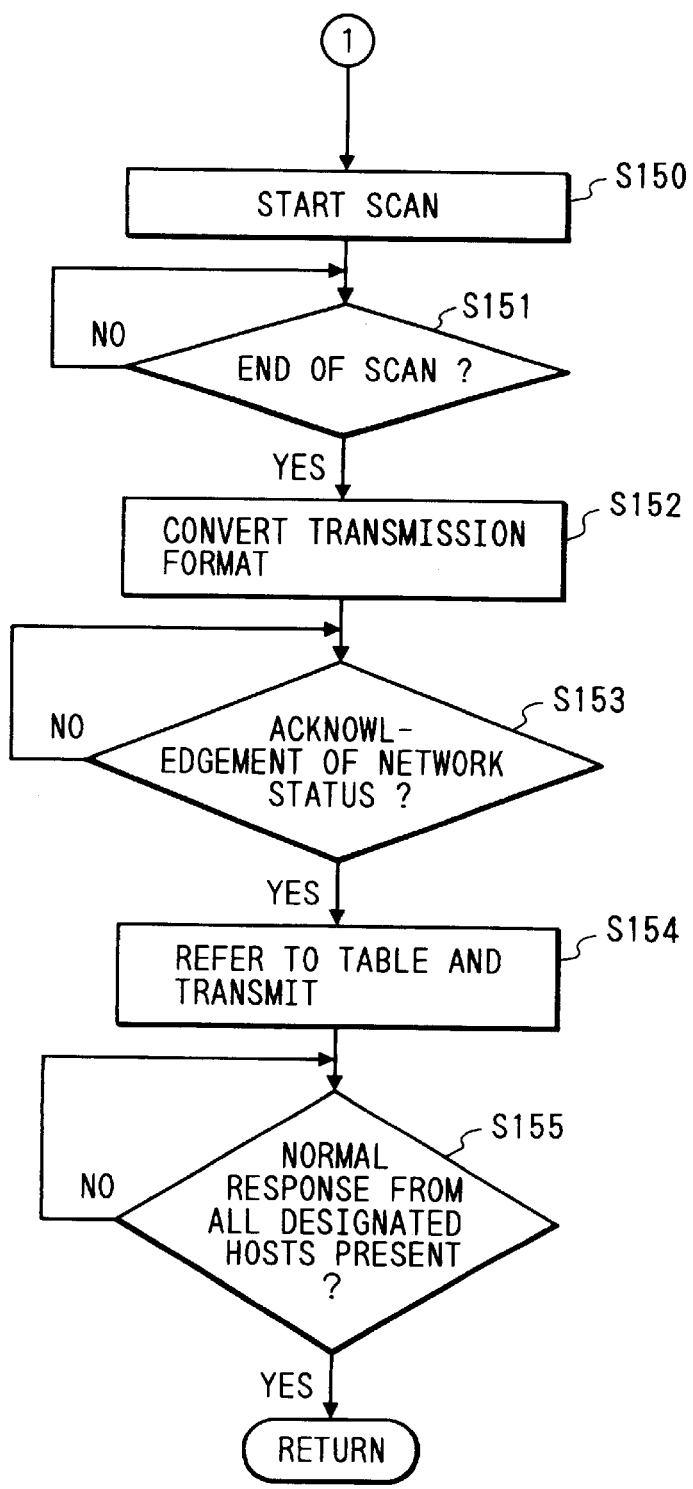
FIG. 36 is comprised of FIGS. 36A and 36B showing flow charts of another example of control procudures carried out by the S/P server according to the present invention.

FIGS. 36A and 36B are flow charts illustrating simply an example of yet another control routine carried out by the server according to the present invention. This routine is carried out by the CPU 101 shown in FIG. 9 to supply to the designated host computer the image information (scanned data SD) designated according to an indication supplied from the host computer.

On receiving at step S121 the PDL data from any one of the host computers connected to the LAN 96, the CPU 101 analyzes at step S142 a host name. At step S143, the CPU 101 determines whether a return host is designated. If the step S143 is positive, the CPU 101 registers at step S145 in a multiple return host name table a plurality of host names designated (i.e., the names of the host computers receiving the scanner command including the own host). If the step S143 is negative, the CPU 101 registers at step S144 the name of the own host in a return host name table. Subsequently, the CPU 101 analyzes the scanner designation at step S146 and checks at step S147 through the interface whether the designated scanner is available. If the step S147 is negative indicating that the scanner is disabled (due to, for example, turning off the power), the CPU 101 notifies at step S149 the host computer of this scanner condition. The CPU 101 is in a ready state while waiting a next command. When it receives the next command at step S149, the control returns.

On the other hand, if the step S147 is positive indicating that the designated scanner is available, the CPU 101 starts scanning of the original at step S150. Upon completion of scanning at step S151, the CPU 101 converts at step S152 the scanned data into a data of a transmission format. The CPU 101 then confirms the network status to each host computer. Subsequently, the CPU 101 transmits at step S154 the converted PDL data through the LAN 96 while looking up the tables registered at the steps S144 and S145. Then the CPU 101 waits at step S155 for reception of a normal response from all designated host computers. Upon reception of the normal response, the CPU 101 escapes from this routine.

The above embodiment has thus been described in conjunction that the host computer designated as the destination of the scanned data SD is assumed to be in a communication enabling state. However, a buffer storage may be provided for spooling the scanned data in a external storage device, provided that a network board (of which specification differs by each of the host computers) attached to the designated host computer can drive the external storage device. The presence or absence of the scanned data may be informed upon starting up the host computer. Alternatively, the scanned data may be stored temporarily in a hard disk or the like connected to the CPU board until the designated host computer comes back to an enabling state. In the latter case, the scanned data SD may be transmitted to the designated host computer while looking up the tables at the moment when the communication between the host computer becomes possible. In addition, if a plurality of scanners are controlled by the system according to the present invention, the scanned data SD1, SD2, . . . , SDN scanned by the respective scanners may be transferred to the designated host computers. As a result of this, it becomes possible to process image information (such as color image information) that cannot be processed by applications on the host computer issuing the scanning request. Otherwise, host computer may be capable of processing such image information only at a slow speed. In such a case, the destination can be arbitrarily changed to facilitate the image information by using various applications implemented in the host computer(s) capable of processing the same.

The scanner/printer server SP1 may be provided previously with user names and passwords for the users by a manager or an owner. In other words, the user names and the passwords may be registered in a hard disk to identify users and prevent unauthorized entry into confidential files. In addition, varying levels of access can be assigned to different uses depending on the passwords, thereby adding, changing or modifying the environment of the available devices connected to the scanner/printer server SP1, i.e., the color printers 94B and 95B as well as the color scanners 94A and 95A.

Figure 37:
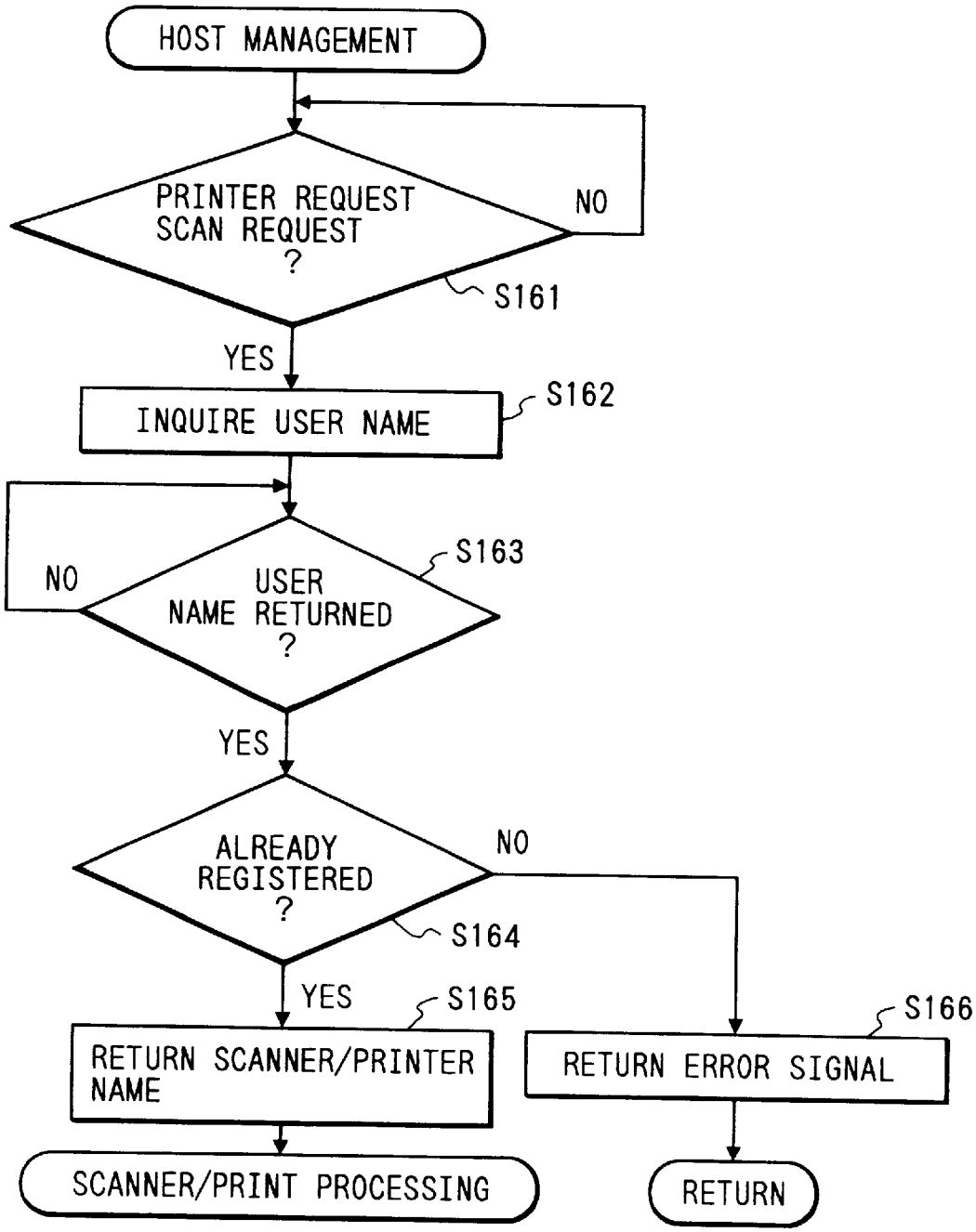
FIG. 37 is an exemplified flow chart of a user identifying processing procedures carried out by the S/P server according to an embodiment of the present invention.

Referring to FIG. 37, described is a control operation for permitting access by monitoring the user of the password for the scanner/printer server (S/P server).

When the host computer ST1 supplies a request of printing to the S/P server SP1 at step S161, the S/P server SP1 inquires at step S162 the password through the network 96 of the host computer ST1 issuing the printing request. A user returns his password through a keyboard or the like of the host computer ST1 to the S/P server SP1 (step S163). In response to this, the S/P server SP1 determines at step S164 whether there is a password registered in a password table in the hard disk that coincides with the returned password. If the step S164 is negative, the S/P server SP1 returns an error signal to the host computer ST1 (step S166). As a result of this, a user whose password is not registered in the table is restricted to use the color printers 94B and 95B, or even cannot gain access beyond a barrier.

On the other hand, if the step S164 is positive, the S/P server SP1 returns to the host computer ST1 printer information with a list of printer names available by the user in question (step S165). When the user selects the color printer 95B and transmits a print start command through an input device of the host computer ST1, the S/P server SP1 analyzes the print command given by the host computer ST1. The S/P server SP1 then initialize the designated printer 95B to print the information.

Likewise, an image may be scanned by using a scanner software (application program) at the host computer ST1. When the host computer ST1 supplies a request of scanning to the S/P server SP1 at the step S161, the S/P server SP1 inquires at the step S162 the password through the network 96 of the host computer ST1 issuing the scanning request. A user returns his password through a keyboard or the like of the host computer ST1 to the S/P server SP1 (step S163). In response to this, the S/P server SP1 determines at the step S164 whether there is a password registered in a password table in the hard disk that coincides with the returned password. If the step S164 is negative, the S/P server SP1 returns an error signal to the host computer ST1 (step S166). As a result of this, a user whose password is not registered in the table is restricted to use the color scanner 94A and 95A, or even cannot gain access beyond a barrier.

On the other hand, if the step S164 is positive, the S/P server SP1 returns to the host computer ST1 printer information with a list of printer names available by the user in question (step S165). When the user selects the color scanner 94A and transmits a scan start command through an input device of the host computer ST1, the S/P server SP1 analyzes the scan command given by the host computer ST1. The S/P server SP1 then initializes the designated scanner 94B to scan the image.

If the host computer is a device capable of carrying out login with the user name and the pass word received, the user name may be registered in the S/P server SP1 to make the S/P server SP1 function as the registration of the password. As a result, a group of uses may be specified who can gain access to the S/P server SP1 with a simple password. In such a case, the host computer ST1 answers the user name given during login in response to the inquiry from the user. The remaining operations are similar to those described above.

Next, a spooler processing carried out in the above mentioned embodiment is described in detail.

Figure 38:
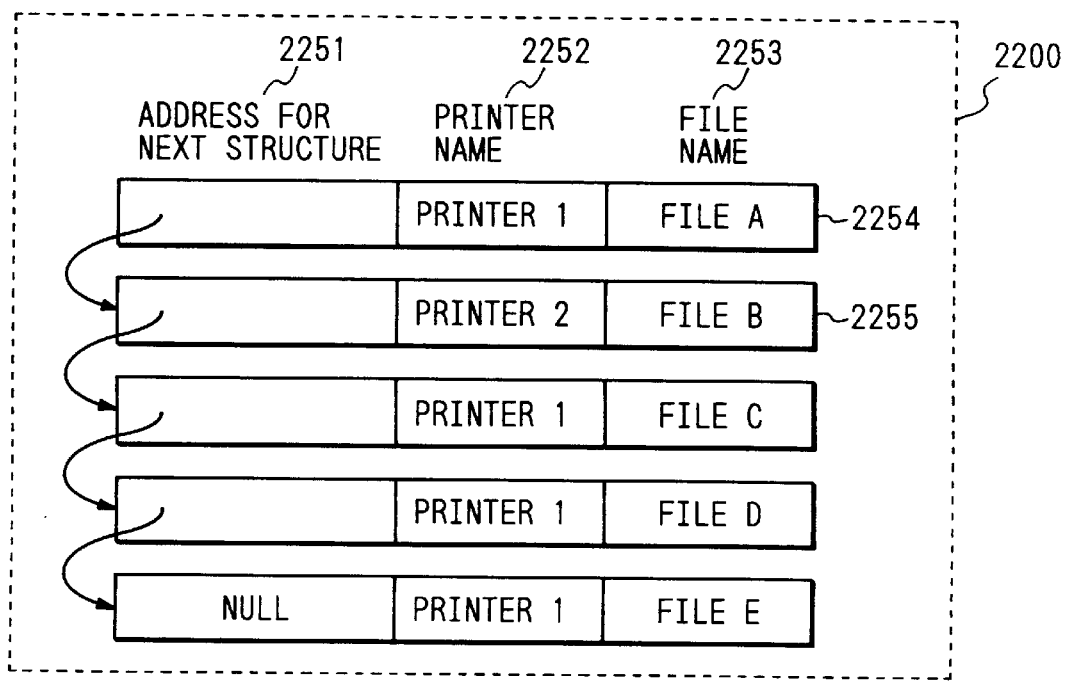
FIG. 38 is a view showing an exemplified structure of management data in a spooler.

FIG. 38 is a view showing an exemplified structure of a management data in a spooler when the hard disk shown in FIG. 3 is used.

In the figure, a data structure is generally designated by a reference numeral 2200. The data structure comprises addresses for the subsequent structure 2251, printer names 2252 and file names 2253. Print tasks 2254 and 2255 are stored in the data structure 2200 in acceptance order. Each of the print tasks 2254 and 2255 is formed of the print information (control data (destination printer, control commands), print files and so on) received by the S/P server SP1.

In the so constructed S/P server SP1, when it is notified of the scanning function processing condition or the printing function processing condition of the designated input/output device (in this embodiment, the first color printer 94B and the second color printer 95B) from the communication program of the server SP1 with the data received from the respective host computers ST1 through STN stored in the hard disk for every designated input/output device and when a destination input/output device changing command is supplied from the host computer, the S/P server SP1 analyzes the input/output device changing command returned from each host to change the input/output device designated by the host and stored in the data storing means into a desired input/output device. In addition, when the condition of the designated input/output device is sensed and it is found that an error is caused in the data received from the host computer, the input/output device may be changed automatically into other input/output device where no error is caused. In such a case, the input/output processing designating the disabled device can be compensated with the data processing in the desired input/output device.

More specifically, each print task is managed by a pointer created by the received print command. The content of the subsequent print tasks can be read by means of referring the address 2251. For example, it corresponds to, in the host computer ST1, the file name 2253 follows an output command having a file name "File A" in the first color printer 94B while the file name 2253 follows an output command having a file name "File B" in the second color printer 95B and the file name 2253 continuously receives an output command of "File C, D and E". The commands stored in the hard disk are processed from the top.

Referring to a flow chart illustrated in FIG. 39, described is a print task processing operation carried out by the server according to the present invention.

FIG. 39 is a flow chart showing an example of print task processing procedures carried out, using spooling, by the S/P server SP1 according to the present invention.

On receiving the printing command supplied from the host computer, the S/P server SP1 creates in the spooler in the hard disk the data structure 2200 shown in FIG. 38. When the data structure 2200 is created, the S/P server SP1 determines at step S171 whether a file referred to for printing is queued in the spooler. If the step S171 is negative indicating that no file is queued in the spooler, the S/P server SP1 reads at step S172 the printer name 2252 produced by the data structure that the spooler is referring to. The S/P server SP1 then checks flags indicating operating state of the designated printer and determines at step S173 whether a normal printing operation can be achieved. If a flag indicative of a print disabled state is set, the S/P server SP1 carries out step S177. On the other hand, if the step S173 is positive, the S/P server SP1 produces at step S174 the print command of the referring structure directed to be produced with the designated printer. Subsequently, the S/P server SP1 determines at step S175 whether a normal end signal is received from the printer. If an abnormal signal is received, the S/P server SP1 returns at step S176 an error signal to the host computer issuing the print command in question. The S/P server SP1 then inquires of the host computer change of the printing destination. Subsequently, the S/P server SP1 determines at step S177 whether a command for changing the destination printer is received from the host computer. If the step S177 is positive, the S/P server SP1 rewrites at step S178 the printer name of the print task in question queued in the spooler and then returns to the step S171.

On the other hand, if the step S175 is positive and the step S177 is negative, the S/P server SP1 proceeds a pointer for use in referring the data structure 2200 to the subsequent print task of the linking data structure. Thus, the S/P server SP1 proceeds at step S179 the next spool and clears the produced print task, following which the S/P server SP1 returns to the step S171.

The above mentioned embodiment has thus been described in conjunction with a case where the print task is given as an example for describing automatic changing of the destination printer to a printer operable normally according only to a change command supplied from the host computer by means of finding a printer operable normally. However, the present invention can equally be applied to a case where a plurality of scanners are connected to the server SP1 as the input/output devices. For example, when the command supplied from the host is the image input command and when an accident (such as failure of a scanning motor, failure of an image scanning unit, burning out of the exposure lamp and so on) causing one scanner disabled during its scanning operation, this status may be notified the host computer. If the change command for changing the destination scanner is supplied from the host computer in response to this notification, the S/P server SP1 changes the destination scanner to a desired scanner to ensure the subsequent image input processing.

In addition, if the print task is present in each printer, a command having a printer name corresponding to each print task may be executed in order that the print tasks are registered in the spooler. For example, if a paper is jammed in the first printer 94B when the print task exclusively dedicated for the first color printer 94B produces the file name 2252 "File A" while the print task exclusively dedicated for the second color printer 95B produces the file name 2253 "File B", the print task of the first color printer 94B returns the error signal to the host computer. When the host computer designates that the file A should be printed by using the second color printer 95B, the server SP1 changes the portion of the file A corresponding to the printer name of the print command 2254 into the second color printer 95B and links it to the end of the data structure 2200 with the pointer. If the print task exclusively dedicated for the second color printer 95B is under the operation of printing the file B, the operation may be shifted to printing of the file A just after the preceding operation is completed.

In addition, it may be formed such that output priorities of the file A with the printer name changed can be designed.

Next, the additional information X shown in FIG. 16 is described in detail.

The S/P server SP1 analyzes the image data and the additional information supplied from the main board 11. The S/P interface circuits 4-1 and 4-2 carries out data processing optimum for the received image data. The data is produced after being processed in this way, so that the output results from the input/output device such as the printers 94A and 95B will be improved in quality.

First, to generate the additional information is described. The above mentioned PDL interpreter program 84 identifies during expansion of the PDL data into the bitmap, for every band memory, an area where the natural image is plotted an area where the characters and lines (text) are plotted. The PDL interpreter program 84 stores the identification result in a bit 0 of the additional information X for every pixel (FIG. 16). Subsequently, the PDL interpreter program 84 determines, according to the contents of each pixel, whether the pixel in question is black and whether it is for a character or a graphic pattern. The PDL interpreter program 84 then plots the identification result for the pixel in question in a bit 2 of the additional information X and stops the processing.

Described now is an example of image processing carried out by the S/P interface circuits 4-1 and 4-2 by using the additional information X.

As mentioned above, in the S/P interface circuit 4-1, the image data RGB supplied from the main board 11 through the VME bus is compressed and stored for one page.

In the figure, an image compression/extension unit 2420 divides the image data plotted in an image memory 2404 by an image generating unit 2403 into blocks of 8×8. A block containing many pixels for a character or a graphic pattern is compressed according to a compression technique with which edges of the characters and graphic patterns are reserved. On the other hand, a block containing many pixels for an image is compressed according to a compression technique with which the higher compression rate can be achieved, more or less sacrificing the edges. The compressed data are stored in the compression memory. When the data for one page is compressed and stored in a compression memory 2421, the image compression/extension unit 2421 extends the compressed data and send the extended data to an image printing unit 2422. The image printing unit 2422 prints the extended image data.

As mentioned above, the image data generated by the image generating unit 2403 is first stored in the image memory 2404 and then read out of it. The read data is compressed and temporarily stored in the compression memory 2421. Accordingly, it is not necessarily required to provide the image memory 4204 and an additional information memory having memory capacities enough for storing the data for one page. For example, the memory capacity may be reduced to 1/16 as compared when one page is stored.

In general, extension of the compressed image data results in poor quality of the resultant image due to the edges are tint. Otherwise, higher compression rate cannot be achieved. In addition, to provide the compression memory 2421 increases the number of memories required. However, according to the present invention, it is possible to compress the characters and graphic patterns with their edges reserved and compress the images at the higher compression rate with the edges being sacrificed more or less because the information whether the pixels are for images or not is stored in the additional information memory 2405. As a result, it becomes possible to achieve the high compression rate with the quality of the image less or not degraded. In other words, the present embodiment is based on a method to temporarily store the compressed data by using the additional information stored in the additional information memory 2405, thereby providing a printing result of high quality using memories having the smaller capacity.

While the above mentioned description has thus been made in conjunction with an example where the compression method can be selected for every one block of 8×8, the compression method may be changed depending on the area of the natural image (or the area occupied by characters and lines) for every one band.

In this embodiment, the compression method is changed by means of changing the compression parameters. However, any one of suitable compression methods can be used. For example, the images can be compressed by means of reducing the number of colors used for the characters and graphic patterns; determining the images, characters and graphic patterns in the print data; compressing the images by a normal JPEG compression; converting the colors used for the characters and graphic patterns into codes consisting of a few bits; and describing the characters and graphic patterns using the codes. As a result, it becomes possible to print the document containing the characters and graphic patterns without degrading the quality of the resultant image.

Next, description is made regarding to the masking processing carried out by the S/P interface circuit 4-1 by using the additional information X.

As mentioned above, in the S/P interface circuit 4-1, the compressed data is extended and subjected to processing such as the masking before being supplied to the printer 95B. The additional information X is stored in the memory 351 shown in FIG. 21C. Depending on the content of the bit 2 of the additional information X, the S/P interface circuit 4-1 determines whether the pixel in question is for the natural image or for the character-line image. If it is for the natural image, a masking for the natural image (using the masking circuit 317 shown in FIG. 21C) is carried out. On the other hand, if it is for the character-line image, the S/P interface circuit 4-1 carries out a masking for the character-line image (using the masking circuit 316 shown in FIG. 21C.

In the masking circuit 316, if the bit 0 of the additional information X indicates that the pixel in question is black, a black (K) is created from the RGB data of the pixel even when the bit 2 of the additional information represents the character-line image.

In addition, it is possible to apply color conversion allowing sharp edges and configurations of the black regions for a document containing many characters and graphic patterns. On the other hand, it is possible to use color conversion to reduce the black regions for a document containing relatively many images.

Further, error diffusion algorithm can be used advantageously for printing a document containing relatively many characters and graphic patterns. With the error diffusion algorithm, boundaries and lines are contrasted relatively clearly. On the other hand, a dither matrix is also applicable to represent a continuous-tone image because the time required for digitization becomes relatively shorter with this method.

As mentioned above, the S/P interface circuit 4-2 also carries out masking processing. Accordingly, the masking processing (the image processing circuit unit 405 in FIG. 22) based on the additional information X may be selectively applied.

In addition, in the S/P interface circuit 4-2, the image processing circuit 406 (FIG. 22) renders the image binary. In this embodiment, the additional information X is referred to by means of this operation to obtain binary images.

The S/P interface circuits 4-1 and 4-2 are connected to the scanner/printers 94 and 95 through cables. The ROM in the S/P interface circuit 4-1 or 4-2 may be previously provided with the data for every one type of the scanner/printer. In such a case, the type of the associated scanner/printer may be detected through the cable and data depending on it may be written in any other bit in the additional information X.

For example, the ink-jet printers differ from each other in ink-jet characteristic depending on the nozzle used. To carry out a head-shading operation and correct the difference, information regarding to the head may be received from the printer 95B. The S/P interface circuit may select one of shading patterns according to the information and perform suitable shading correction for every one pixel.

As mentioned above, in the present embodiment, it is possible to carry out image processing in the S/P server SP1 using the scanner/printers 94, 95 having no advanced image edition processing function. As a result, it becomes possible to produce color images at low costs that contain sharp black characters on a colorful background.

As mentioned above, according to the present embodiment, the scanners 94A and 95A can be controlled by the commands (PDL data) within the page description language systems. As a result, the host computer is not required to control the scanners 94A, 95A and printers 94B, 95B separately, which reduces the burden imposed on the host computer.

In addition, it is possible to register as a file in the S/P server the characters, lines and images obtained by expanding the PDL data and images scanned by the scanner 94A or 95A. Accordingly, the host computer is capable of storing necessary data without having a memory of large capacity.

Further, it is possible to synthesize the characters, lines and images obtained by means of expanding the PDL data with the image scanned by the scanner using the commands in the PDL system without producing the image scanned by the scanner from the host computer. The synthesized image can be registered in the S/P server as a file and can be printed or supplied to an arbitrary host computer connected in the network.

Moreover, the image registered as the file in the S/P server can be synthesized with the characters, lines and images obtained by means of expanding the PDL data and the resultant image may be registered, if necessary, as a file in the server. The registered image may be printed or supplied to an arbitrary host computer connected in the network.

For example, a plurality of images based on the PDL data independently supplied from two or more host computers may be synthesized together.

In addition, the synthesized image can be compressed and transmitted to the host computer, so that the transmission time is reduced.

In particular, when synthesis of the data described in the page description language supplied from the host through the network with the image data scanned by the scanner, the synthesizing means synthesizes the bitmap data converted by the processing means with the image data scanned by the scanner. The synthesized image can be transmitted to the host. Accordingly, it becomes possible for the host to obtain during a short period the synthesized image data of large capacity synthesized in the server and to use readily the same data.

In addition, it is possible to readily synthesize the image data that is memorized only in such a memory that could not be achieved by memory resources in a host.

It should be understood that the present invention is not limited to the particular embodiment shown and described above, and various changes and modifications may be made without departing from the spirit and scope of the appended claims.

What is claimed is:

1. A control apparatus, connected to a host apparatus, for controlling a scanner and a printer, said control apparatus comprising:
    a receiver for receiving print data from the host apparatus, wherein the print data includes a first type of command for describing an image and a second type of command for causing the scanner connected to said control apparatus to scan an original image and for causing said control apparatus to synthesize the original image with the image described by the first type of command;
    an interpreter for interpreting the print data received by said receiver and converting the interpreted print data into image data;
    a memory for storing the image data converted by said interpreter;
    an output unit for outputting the image data stored in said memory to the printer; and
    a transmitter for transmitting the image data stored in said memory to an external apparatus,
    wherein said interpreter comprises:
        a discriminator for discriminating whether the print data includes the second type of command;
        a controller for causing the scanner to scan an original image in response to the second type of command when said discriminator discriminates that the print data includes the second type of command; and
        a storage unit for writing data of the original image output from the scanner into said memory in response to the second type of command.

2. A control apparatus according to claim 1,
    wherein said discriminator discriminates whether the print data received by said receiver includes first designation data for designating a first apparatus to which image data converted from the print data is to be output, and
    wherein said output unit outputs the image data to the first apparatus.

3. A control apparatus according to claim 2,
    wherein said discriminator discriminates whether the print data includes second designation data for designating a second apparatus to which image data converted from the print data is to be output when the first apparatus can not receive the image data from said control apparatus, and
    wherein said output unit outputs the image data to the second apparatus.

4. A control apparatus according to claim 2,
    wherein said discriminator discriminates whether the print data includes format designation data for designating a format of the image data to be output to the first apparatus, and
    wherein said output unit outputs the image data in the designated format to the first apparatus.

5. A control apparatus according to claim 1, wherein said control apparatus is connected to the host apparatus through a network.

6. A method for controlling a scanner and a printer, comprising the steps of:

receiving print data from a host apparatus, wherein the print data includes a first type of command for describing an image and a second type of command for causing the scanner to scan an original image and for causing the control apparatus to synthesize the original image with the image described by the first type of command;

interpreting the received print data and converting the interpreted print data into image data;

storing the converted image data in a memory;

outputting the image data stored in the memory to the printer; and transmitting the image data stored in the memory to an external apparatus, wherein said interpreting step comprises the steps of:

discriminating whether the print data includes the second type of command;

causing the scanner to scan an original image in response to the second type of command when said discriminating step discriminates that the print data includes the second type of command; and writing data of the original image output from the scanner into the memory in response to the second type of command.

7. A method according to claim 6, further comprising the step of discriminating whether the received print data includes first designation data for designating a first apparatus to which image data converted from the print data is to be output, wherein said outputting step outputs the image data to the first apparatus.

8. A method according to claim 7, further comprising the step of discriminating whether the print data includes second designation data for designating a second apparatus to which image data converted from the print data is to be output when the first apparatus can not receive the image data, wherein said outputting step includes outputting the image data to the second apparatus.

9. A method according to claim 7, further comprising the step of discriminating whether the print data includes format designation data for designating a format of the image data to be output to the first apparatus, wherein said outputting step includes outputting the image data in the designated format to the first apparatus.

10. A method according to claim 6, wherein the print data is received from the host apparatus through a network.

11. A system comprising a host apparatus and a scanner/printer control apparatus, said host apparatus comprising:

a generator for generating print data, wherein the print data includes a first type of command for describing an image and a second type of command for causing a scanner connected to said scanner/printer control apparatus to scan an original image, and wherein the generator generates the print data including the second type of command when the image described by the first type of command is to be synthesized with the original image; and a transmitter for transmitting the print data generated by the generator to said scanner/printer control apparatus, and said scanner/printer control apparatus comprising:

a receiver for receiving the print data transmitted by the transmitter;

an interpreter for interpreting the print data received by the receiver and converting the interpreted print data into image data;

a memory for storing the image data converted by the interpreter;

an output unit for outputting the image data stored in the memory to the printer; and a transmitter for transmitting the image data stored in the memory to an external apparatus, wherein the interpreter comprises:

a discriminator for discriminating whether the print data includes the second type of command;

a controller for causing the scanner to scan an original image in response to the second type of command when the discriminator discriminates that the print data includes the second type of command; and a storage unit for writing data of the original image output from the scanner into the memory in response to the second type of command.

12. A system according to claim 11, wherein said host apparatus further comprises a sender for sending, to said scanner/printer control apparatus, first designation data for designating a first apparatus to which image data converted in the scanner/printer control apparatus from the print data is to be output, wherein the discriminator discriminates whether the print data includes the first designation data, and wherein the output unit outputs the image data to the first apparatus.

13. A system according to claim 12, wherein the sender sends, to said scanner/printer control apparatus, second designation data for designating a second apparatus to which image data converted in said scanner/printer control apparatus from the print data is to be output when the first apparatus can not receive the image data from the scanner/printer control apparatus, wherein the discriminator discriminates whether the print data includes the second designation data, and wherein the output unit outputs the image data to the second apparatus.

14. A system according to claim 12, wherein the sender sends, to said scanner/printer control apparatus, format designation data for designating a format of the image data to be output to the first apparatus, wherein the discriminator discriminates whether the print data includes the third designation data, and wherein the output unit outputs the image data in the designated format to the first apparatus.

15. A system according to claim 11, wherein said host apparatus and said scanner/printer control apparatus are connected to each other through a network.

16. A computer-readable memory medium storing a program for implementing a method in a control apparatus, connected to a host apparatus, for controlling a scanner and a printer, the program comprising:

code for receiving print data from the host apparatus, wherein the print data includes a first type of command for describing an image and a second type of command for causing the scanner connected to the control apparatus to scan an original image and for causing the control apparatus to synthesize the original image with the image described by the first type of command;

code for interpreting the print data received by said code for receiving and converting the interpreted print data into image data;

code for storing the image data converted by said code for interpreting in a memory;

code for outputting the image data stored by said code for storing to the printer; and code for transmitting the image data stored in the memory to an external apparatus, wherein said code for interpreting comprises:
  code for discriminating whether the print data includes the second type of command;
  code for causing the scanner to scan an original image in response to the second type of command when said code for discriminating discriminates that the print data includes the second type of command; and
  code for writing data of the original image output from the scanner into the memory in response to the second type of command.

17. A memory medium according to claim 16, wherein said code for discriminating discriminates whether the print data received by said code for receiving includes first designation data for designating a first apparatus to which image data converted from the print data is to be output, and wherein said code for outputting outputs the image data to the first apparatus.

18. A memory medium according to claim 17, wherein said code for discriminating discriminates whether the print data includes second designation data for designating a second apparatus to which image data converted from the print data is to be output when the first apparatus can not receive the image data from the control apparatus, and wherein said code for outputting outputs the image data to the second apparatus.

19. A memory medium according to claim 17, wherein said code for discriminating discriminates whether the print data includes format designation data for designating a format of the image data to be output to the first apparatus, and wherein said code for outputting outputs the image data in the designated format to the first apparatus.

20. A memory medium according to claim 16, wherein the control apparatus is connected to the host apparatus through a network.

* * * * *

UNITED STATES PATENT AND TRADEMARK OFFICE
CERTIFICATE OF CORRECTION

PATENT NO. : 6,804,016 B2
DATED : October 12, 2004
INVENTOR(S) : Yasuhiko Hashimoto et al.

It is certified that error appears in the above-identified patent and that said Letters Patent is hereby corrected as shown below:

<u>Title page,</u>
Item [57], ABSTRACT,
Line 2, "including" should read -- comprising --.

<u>Column 1,</u>
Line 22, "received" should read -- receive --.

<u>Column 3,</u>
Line 1, "rest" should read -- restored --; and
Line 2, "the" should read -- in the --.

<u>Column 5,</u>
Line 28, "disable" should read -- disabled --.

<u>Column 8,</u>
Line 36, "may" should read -- may be --.

<u>Column 10,</u>
Line 3, "Operation" should read -- The operation --.

<u>Column 21,</u>
Line 15, "regarding" should read -- with regard --.

<u>Column 23,</u>
Line 23, "requires" should read -- needs --;
Line 24, "starts" should read -- starts an --;
Lines 41 and 42, "in a" should read -- in the --;
Lines 43 and 52, "of the" should read -- of a --;
Line 58, "the" should read -- a --; and
Line 61, "disk," should read -- disk, a --; and "expect" should read -- except --.

<u>Column 24,</u>
Line 9, "once" should read -- first --.

<u>Column 25,</u>
Line 20, "reached to" should read -- reaching --.

<u>Column 26,</u>
Line 34, "As a" should read -- As the --; and
Line 54, "with being" should be deleted.

UNITED STATES PATENT AND TRADEMARK OFFICE
CERTIFICATE OF CORRECTION

PATENT NO. : 6,804,016 B2
DATED : October 12, 2004
INVENTOR(S) : Yasuhiko Hashimoto et al.

It is certified that error appears in the above-identified patent and that said Letters Patent is hereby corrected as shown below:

Column 27,
Line 44, "regarding" should read -- with regard --.

Column 31,
Line 30, "regarding" should read -- with regard --.

Column 33,
Lines 20 and 24, "regarding" should read -- with regard --.

Column 36,
Line 15, "represent" should read -- represents --.

Column 37,
Line 15, "to a" should read -- a --.

Column 39,
Line 4, "picks" should read -- pick --.

Column 41,
Line 45, "regarding" should read -- with regard --.

Column 45,
Line 15, "regarding" should read -- with regard --.

Column 46,
Line 44, "with" should be deleted;
Line 58, "when" should read -- then --; and
Line 64, "the all" should read -- all the --.

Column 47,
Line 54, "when" should read -- then --; and
Line 58, "the all" should read -- all the --.

Column 49,
Lines 46 and 64, "During" should read -- When --.

Column 53,
Line 52, "a" should read -- an --.

UNITED STATES PATENT AND TRADEMARK OFFICE
CERTIFICATE OF CORRECTION

PATENT NO. : 6,804,016 B2
DATED : October 12, 2004
INVENTOR(S) : Yasuhiko Hashimoto et al.

It is certified that error appears in the above-identified patent and that said Letters Patent is hereby corrected as shown below:

Column 57,
Line 48, "send" should read -- sends --;
Line 61, "are" should read -- being --;
Line 62, "tint." should read -- tinted. --; and
Line 63, "to provide" should read -- providing --.

Column 58,
Line 30, "regarding" should read -- with regard --.

Column 59,
Line 17, "regarding" should read -- with regard --.

Signed and Sealed this

Eighth Day of November, 2005

JON W. DUDAS
*Director of the United States Patent and Trademark Office*